(12) United States Patent
Sugimoto

(10) Patent No.: US 10,358,186 B2
(45) Date of Patent: Jul. 23, 2019

(54) BICYCLE SPROCKET AND BICYCLE SPROCKET ASSEMBLY

(71) Applicant: SHIMANO INC., Sakai (JP)

(72) Inventor: Akinobu Sugimoto, Sakai (JP)

(73) Assignee: SHIMANO INC., Sakai (JP)

( * ) Notice: Subject to any disclaimer, the term of this patent is extended or adjusted under 35 U.S.C. 154(b) by 200 days.

(21) Appl. No.: 15/381,524

(22) Filed: Dec. 16, 2016

(65) Prior Publication Data

US 2018/0170479 A1   Jun. 21, 2018

(51) Int. Cl.
*B62M 9/10* (2006.01)
*B62M 9/12* (2006.01)
*F16H 55/30* (2006.01)

(52) U.S. Cl.
CPC .............. *B62M 9/10* (2013.01); *B62M 9/105* (2013.01); *B62M 9/12* (2013.01); *F16H 55/30* (2013.01)

(58) Field of Classification Search
CPC .......... B62M 9/10; B62M 9/00; B62M 9/105; B62M 9/02; F16H 55/30
USPC ......................................................... 474/160
See application file for complete search history.

(56) References Cited

U.S. PATENT DOCUMENTS

| | | | | |
|---|---|---|---|---|
| 619,537 A | * | 2/1899 | Bufford .................... | F16H 55/30 474/156 |
| 3,498,148 A | * | 3/1970 | Palermo ..................... | F16H 7/00 474/154 |
| 3,956,943 A | * | 5/1976 | Yamasaki ................. | B62M 9/10 474/148 |
| 4,174,642 A | * | 11/1979 | Martin ..................... | F16H 55/30 474/152 |
| 4,268,259 A | * | 5/1981 | Segawa .................... | F16H 55/30 474/160 |
| 4,330,286 A | * | 5/1982 | Nagano .................... | F16H 55/30 474/152 |
| 4,384,865 A | * | 5/1983 | Ueno ........................ | B62M 9/10 474/160 |
| 5,066,264 A | * | 11/1991 | Romano ................... | B62M 9/10 474/152 |
| 5,192,249 A | * | 3/1993 | Nagano .................... | B62M 9/10 474/160 |
| 5,205,794 A | * | 4/1993 | Browning ................ | B62M 9/14 474/160 |
| 5,273,495 A | * | 12/1993 | Nagano .................... | B62M 9/00 474/144 |

(Continued)

FOREIGN PATENT DOCUMENTS

| | | |
|---|---|---|
| JP | 49-80736 | 8/1974 |
| JP | 52-79653 U1 | 6/1977 |

(Continued)

*Primary Examiner* — Henry Y Liu
(74) *Attorney, Agent, or Firm* — Mori & Ward, LLP

(57) ABSTRACT

A bicycle sprocket comprises a sprocket body, sprocket teeth, and at least one shifting facilitation area. The sprocket teeth include at least one first tooth and at least one second tooth. The at least one first tooth includes a first tooth center plane defined to bisect a first maximum axial width. The at least one second tooth includes a second tooth center plane defined to bisect a second maximum axial width. The second tooth center plane is offset from the first tooth center plane in an axial direction. The at least one shifting facilitation area is configured to facilitate a shifting operation of the bicycle chain.

34 Claims, 46 Drawing Sheets

(56) References Cited

U.S. PATENT DOCUMENTS

| | | | | |
|---|---|---|---|---|
| 5,569,107 A * | 10/1996 | Mu | ............... | B62M 9/10 474/160 |
| 5,876,159 A * | 3/1999 | Tseng | ............... | B23F 19/10 409/131 |
| 5,971,878 A * | 10/1999 | Leng | ............... | F16H 55/30 474/160 |
| 6,203,462 B1 * | 3/2001 | Takamori | ............... | B62M 9/02 474/156 |
| 6,340,338 B1 * | 1/2002 | Kamada | ............... | B62M 9/10 474/152 |
| 6,572,500 B2 * | 6/2003 | Tetsuka | ............... | B62M 9/10 474/160 |
| 6,575,861 B2 * | 6/2003 | Markley | ............... | F16G 13/04 474/152 |
| 7,258,638 B2 * | 8/2007 | Valle | ............... | B62M 9/105 474/152 |
| 7,585,240 B2 * | 9/2009 | Kamada | ............... | B62M 9/10 474/148 |
| 8,550,944 B2 * | 10/2013 | Esquibel | ............... | B62M 9/10 474/160 |
| 9,182,027 B2 * | 11/2015 | Reiter | ............... | B62M 9/105 |
| 9,540,070 B2 * | 1/2017 | Watarai | ............... | B62M 9/02 |
| 9,669,899 B2 * | 6/2017 | Barefoot | ............... | B62M 9/00 |
| 9,701,364 B2 * | 7/2017 | Sugimoto | ............... | B62M 1/36 |
| 9,873,481 B2 * | 1/2018 | Braedt | ............... | B62M 9/10 |
| 2002/0086753 A1 * | 7/2002 | Yahata | ............... | B62M 9/105 474/160 |
| 2010/0081531 A1 * | 4/2010 | Esquibel | ............... | B62M 9/10 474/160 |
| 2010/0137086 A1 * | 6/2010 | Lin | ............... | B62M 9/105 474/160 |
| 2013/0072334 A1 * | 3/2013 | Braedt | ............... | B62M 9/10 474/156 |
| 2013/0139642 A1 * | 6/2013 | Reiter | ............... | B62M 9/105 74/594.2 |
| 2014/0338494 A1 * | 11/2014 | Sugimoto | ............... | B62M 1/36 74/594.2 |
| 2016/0101825 A1 * | 4/2016 | Braedt | ............... | B62M 9/12 474/160 |
| 2016/0347409 A1 * | 12/2016 | Watarai | ............... | B62M 9/02 |
| 2018/0112764 A1 * | 4/2018 | Sugimoto | ............... | B62M 1/36 |
| 2018/0251189 A1 * | 9/2018 | Kamada | ............... | F16H 55/30 |
| 2018/0290712 A1 * | 10/2018 | Taniguchi | ............... | B62M 9/12 |

FOREIGN PATENT DOCUMENTS

| | | |
|---|---|---|
| JP | 52-79654 U1 | 6/1977 |
| JP | 52-79655 U1 | 6/1977 |
| JP | 54-10670 Y2 | 6/1977 |
| JP | 53-13757 U1 | 2/1978 |
| JP | 55-28615 Y2 | 3/1979 |
| JP | 55-28616 Y2 | 3/1979 |
| JP | 3009904 B2 | 11/1991 |

* cited by examiner

BICYCLE SPROCKET AND BICYCLE SPROCKET ASSEMBLY

BACKGROUND OF THE INVENTION

Field of the Invention

The present invention relates to a bicycle sprocket and a bicycle sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle sprocket comprises a sprocket body, sprocket teeth, and at least one shifting facilitation area. The sprocket teeth are provided on an outer periphery of the sprocket body. The sprocket teeth include at least one first tooth and at least one second tooth. The at least one first tooth is provided on the outer periphery of the sprocket body to engage with an opposed pair of outer link plates of a bicycle chain. The at least one first tooth has a first maximum axial width defined in an axial direction parallel to a rotational center axis of the bicycle sprocket. The at least one first tooth includes a first tooth center plane defined to bisect the first maximum axial width. The first tooth center plane is perpendicular to the rotational center axis. The at least one second tooth is provided on the outer periphery of the sprocket body to engage with an opposed pair of inner link plates of the bicycle chain. The at least one second tooth has a second maximum axial width defined in the axial direction. The at least one second tooth includes a second tooth center plane defined to bisect the second maximum axial width. The second tooth center plane is perpendicular to the rotational center axis and is offset from the first tooth center plane in the axial direction. The at least one shifting facilitation area is configured to facilitate a shifting operation of the bicycle chain.

With the bicycle sprocket according to the first aspect, it is possible to improve chain-holding performance of the bicycle sprocket with improving chain-shifting performance in the shifting operation.

In accordance with a second aspect of the present invention, the bicycle sprocket according to the first aspect is configured so that the at least one shifting facilitation area is configured to facilitate a first shifting operation in which the bicycle chain is shifted from an additional sprocket adjacent to the bicycle sprocket in the axial direction without another sprocket between the bicycle sprocket and the additional sprocket toward the bicycle sprocket.

With the bicycle sprocket according to the second aspect, it is possible to improve the chain-holding performance of the bicycle sprocket with improving chain-shifting performance in the first shifting operation.

In accordance with a third aspect of the present invention, the bicycle sprocket according to the first or second aspect is configured so that the at least one shifting facilitation area is configured to facilitate a second shifting operation in which the bicycle chain is shifted from the bicycle sprocket toward an additional sprocket adjacent to the bicycle sprocket in the axial direction without another sprocket between the bicycle sprocket and the additional sprocket.

With the bicycle sprocket according to the third aspect, it is possible to improve the chain-holding performance of the bicycle sprocket with improving chain-shifting performance in the second shifting operation.

In accordance with a fourth aspect of the present invention, the bicycle sprocket according to any one of the first to third aspects further comprises a first shifting facilitation projection provided in the at least one shifting facilitation area to facilitate the shifting operation.

With the bicycle sprocket according to the fourth aspect, it is possible to further facilitate the shifting operation.

In accordance with a fifth aspect of the present invention, the bicycle sprocket according to the fourth aspect further comprises an additional shifting facilitation projection provided in the at least one shifting facilitation area to facilitate the shifting operation.

With the bicycle sprocket according to the fifth aspect, it is possible to further facilitate the shifting operation.

In accordance with a sixth aspect of the present invention, the bicycle sprocket according to the fourth or fifth aspect further comprises a second shifting facilitation projection provided in the at least one shifting facilitation area to facilitate a second shifting operation in which the bicycle chain is shifted from the bicycle sprocket toward an additional sprocket adjacent to the bicycle sprocket in the axial direction without another sprocket between the bicycle sprocket and the additional sprocket.

With the bicycle sprocket according to the sixth aspect, it is possible to further facilitate the second shifting operation.

In accordance with a seventh aspect of the present invention, the bicycle sprocket according to any one of the first to sixth aspects is configured so that the at least one first tooth includes first teeth provided on the outer periphery of the sprocket body to engage with the opposed pair of outer link plates of the bicycle chain.

With the bicycle sprocket according to the seventh aspect, it is possible to further improve the chain-holding performance of the bicycle sprocket.

In accordance with an eighth aspect of the present invention, the bicycle sprocket according to any one of the first to seventh aspects is configured so that the sprocket teeth include a receiving tooth provided on the outer periphery of the sprocket body to engage with the opposed pair of outer link plates of the bicycle chain. The receiving tooth has a receiving maximum axial width defined in the axial direction. The receiving tooth includes a receiving tooth center plane defined to bisect the receiving maximum axial width, the receiving tooth center plane being perpendicular to the rotational center axis. The receiving tooth center plane is offset from the second tooth center plane away from the first tooth center plane in the axial direction.

With the bicycle sprocket according to the eighth aspect, it is possible to further improve the chain-holding performance of the bicycle sprocket in a state where a chain line of the bicycle chain extending from the bicycle sprocket is inclined relative to the bicycle sprocket.

In accordance with a ninth aspect of the present invention, the bicycle sprocket according to the eighth aspect is configured so that the receiving tooth center plane is closer to an additional sprocket adjacent to the bicycle sprocket in the axial direction without another sprocket between the bicycle sprocket and the additional sprocket than the second tooth center plane.

With the bicycle sprocket according to the ninth aspect, it is possible to further improve the chain-holding performance of the bicycle sprocket in the state where the chain line of the bicycle chain extending from the bicycle sprocket is inclined relative to the bicycle sprocket.

In accordance with a tenth aspect of the present invention, the bicycle sprocket according to the eighth or ninth aspect is configured so that the sprocket teeth include a derailing tooth provided on the outer periphery of the sprocket body to first derail the bicycle chain from the bicycle sprocket in the shifting operation. The derailing tooth is provided on an upstream side of the receiving tooth in a driving rotational direction in which the bicycle sprocket is rotated about the rotational center axis during pedaling.

With the bicycle sprocket according to the tenth aspect, it is possible to further improve the chain-shifting performance in the shifting operation.

In accordance with an eleventh aspect of the present invention, the bicycle sprocket according to the tenth aspect is configured so that the derailing tooth is adjacent to the receiving tooth without another tooth between the derailing tooth and the receiving tooth in the driving rotational direction.

With the bicycle sprocket according to the eleventh aspect, it is possible to make the shifting facilitation area compact.

In accordance with a twelfth aspect of the present invention, the bicycle sprocket according to the tenth or eleventh aspect is configured so that the derailing tooth has a derailing maximum axial width defined in the axial direction. The derailing tooth includes a derailing tooth center plane and a derailing tooth-tip. The derailing tooth center plane is defined to bisect the derailing maximum axial width and perpendicular to the rotational center axis. The derailing tooth-tip has a derailing-tip center plane perpendicular to the rotational center axis. The derailing-tip center plane is offset from the derailing tooth center plane toward the first tooth center plane in the axial direction.

With the bicycle sprocket according to the twelfth aspect, it is possible to further improve the chain-shifting performance in the shifting operation.

In accordance with a thirteenth aspect of the present invention, the bicycle sprocket according to any one of the tenth to twelfth aspects is configured so that the sprocket teeth include tooth bottoms provided on the outer periphery of the sprocket body. The at least one first tooth has a first tooth radial length defined radially outward from a root circle defined by the tooth bottoms. The at least one second tooth has a second tooth radial length defined radially outward from the root circle. The derailing tooth has a derailing tooth radial length defined radially outward from the root circle. The derailing tooth radial length is smaller than at least one of the first tooth radial length and the second tooth radial length.

With the bicycle sprocket according to the thirteenth aspect, it is possible to further improve the chain-shifting performance in a first shifting operation in which the bicycle chain is shifted from the bicycle sprocket toward the additional sprocket.

In accordance with a fourteenth aspect of the present invention, the bicycle sprocket according to any one of the eighth to thirteenth aspects is configured so that the sprocket teeth include tooth bottoms provided on the outer periphery of the sprocket body. The at least one first tooth has a first tooth radial length defined radially outward from a root circle defined by the tooth bottoms. The at least one second tooth has a second tooth radial length defined radially outward from the root circle. The receiving tooth has a receiving tooth radial length defined radially outward from the root circle. The receiving tooth radial length is smaller than at least one of the first tooth radial length and the second tooth radial length.

With the bicycle sprocket according to the fourteenth aspect, it is possible to further improve the chain-shifting performance in a second shifting operation in which the bicycle chain is shifted from the additional sprocket toward the bicycle sprocket.

In accordance with a fifteenth aspect of the present invention, the bicycle sprocket according to any one of the first to fourteenth aspects is configured so that the at least one second tooth includes second teeth provided on the outer periphery of the sprocket body to engage with the opposed pair of inner link plates of the bicycle chain.

With the bicycle sprocket according to the fifteenth aspect, it is possible to further improve the chain-holding performance of the bicycle sprocket.

In accordance with a sixteenth aspect of the present invention, a bicycle sprocket assembly comprises the bicycle sprocket according to any one of the first to fifteenth aspects and the additional sprocket. The bicycle sprocket has a first pitch-circle diameter. The additional sprocket is provided to be spaced apart from the bicycle sprocket in the axial direction. The additional sprocket has a second pitch-circle diameter smaller than the first pitch-circle diameter of the bicycle sprocket.

With the bicycle sprocket assembly according to the sixteenth aspect, it is possible to provide the bicycle sprocket assembly which improves chain-holding performance of the bicycle sprocket with improving chain-shifting performance in the shifting operation.

In accordance with a seventeenth aspect of the present invention, the bicycle sprocket assembly according to the sixteenth aspect is configured so that the first tooth center plane of the at least one first tooth is offset from the second tooth center plane away from the additional sprocket in the axial direction.

With the bicycle sprocket assembly according to the seventeenth aspect, it is possible to further improve the chain-holding performance of the bicycle sprocket in the state where a chain line of the bicycle chain extending from the bicycle sprocket is inclined relative to the bicycle sprocket.

In accordance with an eighteenth aspect of the present invention, the bicycle sprocket assembly according to the sixteenth or seventeenth aspect is configured so that the at least one first tooth includes first teeth provided on the outer periphery of the sprocket body to engage with the opposed pair of outer link plates of the bicycle chain. The at least one second tooth includes second teeth provided on the outer periphery of the sprocket body to engage with the opposed pair of inner link plates of the bicycle chain. The first teeth and the second teeth are alternatingly arranged in a circumferential direction defined about the rotational center axis.

With the bicycle sprocket assembly according to the eighteenth aspect, it is possible to further improve the chain-holding performance of the bicycle sprocket in the state where the chain line of the bicycle chain extending from the bicycle sprocket is inclined relative to the bicycle sprocket.

In accordance with a nineteenth aspect of the present invention, the bicycle sprocket assembly according to any one of the sixteenth to eighteenth aspect is configured so that the at least one first tooth includes a first tooth-tip having a first-tip center plane perpendicular to the rotational center axis. The first-tip center plane is offset from the first tooth center plane toward the additional sprocket in the axial direction.

With the bicycle sprocket assembly according to the nineteenth aspect, it is possible to further improve the chain-holding performance of the bicycle sprocket in the state where the chain line of the bicycle chain extending from the bicycle sprocket is inclined relative to the bicycle sprocket.

In accordance with a twentieth aspect of the present invention, the bicycle sprocket assembly according to any one of the sixteenth to nineteenth aspect is configured so that the first tooth center plane of the at least one first tooth is offset from the second tooth center plane toward the additional sprocket in the axial direction.

With the bicycle sprocket assembly according to the twentieth aspect, it is possible to further improve the chain-holding performance of the bicycle sprocket in the state where the chain line of the bicycle chain extending from the bicycle sprocket is inclined relative to the bicycle sprocket.

In accordance with a twenty-first aspect of the present invention, the bicycle sprocket assembly according to any one of the sixteenth to twentieth aspects is configured so that the at least one first tooth includes at least one first inward tooth and at least one first outward tooth. The at least one first inward tooth is provided on the outer periphery of the sprocket body to engage with the opposed pair of outer link plates of the bicycle chain. The at least one first inward tooth has the first tooth center plane. The at least one first outward tooth is provided on the outer periphery of the sprocket body to engage with the opposed pair of outer link plates of the bicycle chain. The at least one first outward tooth has the first tooth center plane. The at least one first inward tooth and the at least one first outward tooth are alternatingly arranged in a circumferential direction defined about the rotational center axis. The first tooth center plane of the at least one first inward tooth is offset from the first tooth center plane of the at least one first outward tooth toward the additional sprocket in the axial direction.

With the bicycle sprocket assembly according to the twenty-first aspect, it is possible to further improve the chain-holding performance of the bicycle sprocket in the state where the chain line of the bicycle chain extending from the bicycle sprocket is inclined relative to the bicycle sprocket.

In accordance with a twenty-second aspect of the present invention, the bicycle sprocket assembly according to any one of the sixteenth to twenty-first aspects is configured so that the additional sprocket includes an additional sprocket body and additional sprocket teeth. The additional sprocket teeth are provided on an outer periphery of the additional sprocket body. The additional sprocket teeth include at least one third tooth, at least one fourth tooth, and at least one fifth tooth. The at least one third tooth is provided on an outer periphery of the additional sprocket body to engage with the opposed pair of inner link plates of the bicycle chain. The at least one third tooth having a third maximum axial width defined in the axial direction. The at least one third tooth has a third tooth center plane defined to bisect the third maximum axial width. The third tooth center plane is perpendicular to the rotational center axis. The at least one fourth tooth is provided on the outer periphery of the additional sprocket body to engage with the opposed pair of outer link plates of the bicycle chain. The at least one fourth tooth has a fourth maximum axial width defined in the axial direction. The at least one fourth tooth has a fourth tooth center plane defined to bisect the fourth maximum axial width. The fourth tooth center plane is perpendicular to the rotational center axis and is offset from the third tooth center plane in the axial direction. The at least one fifth tooth is provided on the outer periphery of the additional sprocket body to engage with the opposed pair of outer link plates of the bicycle chain. The at least one fifth tooth has a fifth maximum axial width defined in the axial direction. The at least one fifth tooth has a fifth tooth center plane defined to bisect the fifth maximum axial width. The fifth tooth center plane is perpendicular to the rotational center axis and offset from the third tooth center plane in the axial direction.

With the bicycle sprocket assembly according to the twenty-second aspect, it is possible to improve chain-holding performance of the additional sprocket.

In accordance with a twenty-third aspect of the present invention, the bicycle sprocket assembly according to the twenty-second aspect is configured so that the third tooth center plane is provided between the fourth tooth center plane and the fifth tooth center plane in the axial direction.

With the bicycle sprocket assembly according to the twenty-third aspect, it is possible to further improve the chain-holding performance of the bicycle sprocket in the state where the chain line of the bicycle chain extending from the bicycle sprocket is inclined relative to the bicycle sprocket.

In accordance with a twenty-fourth aspect of the present invention, the bicycle sprocket assembly according to the twenty-third aspect is configured so that the bicycle sprocket further comprises a shifting facilitation projection provided in the at least one shifting facilitation area to facilitate the shifting operation. One of the at least one fourth tooth and the at least one fifth tooth is spaced apart from the shifting facilitation projection by a reference distance corresponding to an even number of chain pitch of the bicycle chain With the bicycle sprocket assembly according to the twenty-fourth aspect, it is possible to further facilitate a first shifting operation in which the bicycle chain is shifted from the additional sprocket toward the bicycle sprocket.

In accordance with a twenty-fifth aspect of the present invention, the bicycle sprocket assembly according to the twenty-fourth aspect is configured so that the reference distance corresponds to four chain pitches of the bicycle chain.

With the bicycle sprocket assembly according to the twenty-fifth aspect, it is possible to certainly facilitate a first shifting operation in which the bicycle chain is shifted from the additional sprocket toward the bicycle sprocket.

In accordance with a twenty-sixth aspect of the present invention, the bicycle sprocket assembly according to any one of the twenty-third to twenty-fifth aspects is configured so that the at least one fourth tooth includes fourth teeth provided on the outer periphery of the additional sprocket body to engage with the opposed pair of outer link plates of the bicycle chain. The at least one fifth tooth includes fifth teeth provided on the outer periphery of the additional sprocket body to engage with the opposed pair of outer link plates of the bicycle chain. The fourth teeth and the fifth teeth are alternatingly arranged in a circumferential direction defined about the rotational center axis.

With the bicycle sprocket assembly according to the twenty-sixth aspect, it ispossible to further improve chain-holding performance of the additional sprocket.

In accordance with a twenty-seventh aspect of the present invention, the bicycle sprocket assembly according to any one of the twenty-second to twenty-sixth aspects is configured so that the at least one third tooth includes third teeth provided on the outer periphery of the additional sprocket body to engage with the opposed pair of inner link plates of the bicycle chain. The at least one fourth tooth includes fourth teeth provided on the outer periphery of the additional sprocket body to engage with the opposed pair of outer link plates of the bicycle chain. The at least one fifth tooth includes fifth teeth provided on the outer periphery of the additional sprocket body to engage with the opposed pair of outer link plates of the bicycle chain. The fourth teeth and the fifth teeth are alternatingly arranged in a circumferential direction defined about the rotational center axis. The third teeth are respectively provided between the fourth teeth and the fifth teeth in the circumferential direction.

With the bicycle sprocket assembly according to the twenty-seventh aspect, it is possible to further improve chain-holding performance of the additional sprocket.

In accordance with a twenty-eighth aspect of the present invention, the bicycle sprocket assembly according to the twenty-seventh aspect is configured so that each of the fourth tooth center plane and the fifth tooth center plane is offset from the third tooth center plane toward the bicycle sprocket in the axial direction.

With the bicycle sprocket assembly according to the twenty-eighth aspect, it is possible to further improve chain-holding performance of the additional sprocket.

In accordance with a twenty-ninth aspect of the present invention, a bicycle sprocket assembly comprises a first sprocket and a second sprocket. The first sprocket comprises a first sprocket body and first sprocket teeth. The first sprocket teeth are provided on an outer periphery of the first sprocket body. The first sprocket teeth include at least one first chain-engagement tooth and at least one second chain-engagement tooth. The at least one first chain-engagement tooth is provided on the outer periphery of the first sprocket body to engage with an opposed pair of outer link plates of a bicycle chain. The at least one first chain-engagement tooth has a first chain-engagement axial width defined in an axial direction parallel to a rotational center axis of the bicycle sprocket. The at least one first chain-engagement tooth has a first axial center plane defined to bisect the first chain-engagement axial width. The first axial center plane is perpendicular to the rotational center axis. The at least one second chain-engagement tooth provided on the outer periphery of the first sprocket body to engage with an opposed pair of inner link plates of the bicycle chain. The at least one second chain-engagement tooth has a second chain-engagement axial width defined in the axial direction. The at least one second chain-engagement tooth has a second axial center plane defined to bisect the second chain-engagement axial width. The second axial center plane is perpendicular to the rotational center axis and offset from the first tooth center plane in the axial direction. The second sprocket comprises a second sprocket body and second sprocket teeth. The second sprocket teeth are provided on an outer periphery of the second sprocket body. The second sprocket teeth include at least one third chain-engagement tooth and at least one fourth chain-engagement tooth. The at least one third chain-engagement tooth is provided on the outer periphery of the second sprocket body to engage with the opposed pair of inner link plates of the bicycle chain. The at least one third chain-engagement tooth has an inner link plate engaging width defined in the axial direction. The at least one fourth chain-engagement tooth is provided on the outer periphery of the second sprocket body to engage with the opposed pair of outer link plates of the bicycle chain. The at least one fourth chain-engagement tooth has an outer link plate engaging width defined in the axial direction. The inner link plate engaging width is smaller than the outer link plate engaging width.

With the bicycle sprocket assembly according to the twenty-ninth aspect, it is possible to improve chain-holding performance of the bicycle sprocket assembly.

In accordance with a thirtieth aspect of the present invention, the bicycle sprocket assembly according to the twenty-ninth aspect is configured so that the outer link plate engaging width is larger than an inner link space defined between the opposed pair of inner link plates of the bicycle chain and is smaller than an outer link space defined between the opposed pair of outer link plates of the bicycle chain. The inner link plate engaging width is smaller than the inner link space.

With the bicycle sprocket assembly according to the thirtieth aspect, it is possible to further improve chain-holding performance of the bicycle sprocket assembly.

In accordance with a thirty-first aspect of the present invention, a bicycle sprocket assembly comprises a larger sprocket and a smaller sprocket. The larger sprocket comprises a first pitch-circle diameter, a larger sprocket body, and first chain-driving teeth. The first chain-driving teeth are provided on an outer periphery of the larger sprocket body. The first chain-driving teeth include at least one first offset tooth and at least one second offset tooth. The at least one first offset tooth is provided on the outer periphery of the larger sprocket body to engage with an opposed pair of outer link plates of a bicycle chain. The at least one first offset tooth has a first maximum width defined in an axial direction parallel to a rotational center axis of the bicycle sprocket assembly. The at least one first offset tooth includes a first-offset-tooth center plane defined to bisect the first maximum width. The first-offset-tooth center plane is perpendicular to the rotational center axis. The at least one second offset tooth is provided on the outer periphery of the larger sprocket body to engage with an opposed pair of inner link plates of the bicycle chain. The at least one second offset tooth has a second maximum width defined in the axial direction. The at least one second offset tooth includes a second-offset-tooth center plane defined to bisect the second maximum width. The second-offset-tooth center plane is perpendicular to the rotational center axis and is offset from the first-offset-tooth center plane in the axial direction. The smaller sprocket comprises a second pitch-circle diameter, a smaller sprocket body, and second chain-driving teeth. The second pitch-circle diameter is smaller than the first pitch-circle diameter. The second chain-driving teeth are provided on an outer periphery of the smaller sprocket body. The second chain-driving teeth include at least one third offset tooth, at least one fourth offset tooth, and at least one fifth offset tooth. The at least one third offset tooth is provided on the outer periphery of the smaller sprocket body to engage with the opposed pair of the outer link plates. The at least one third offset tooth has a third maximum width defined in the axial direction. The at least one third offset tooth includes a third-offset-tooth center plane defined to bisect the third maximum width. The third-offset-tooth center plane is perpendicular to the rotational center axis. The at least one fourth offset tooth is provided on the outer periphery of the smaller sprocket body to engage with the opposed pair of the inner link plates. The at least one fourth offset tooth has a fourth maximum width defined in the axial direction. The at least one fourth offset tooth includes a fourth-offset-tooth center plane defined to bisect the fourth maximum width. The fourth-offset-tooth center plane is perpendicular to the rotational center axis and is offset from the third-offset-tooth center plane in the axial direction. The at least one fifth offset tooth is provided on the outer periphery of the smaller sprocket body to engage with the opposed pair of the outer link plates. The at least one fifth offset tooth has a fifth maximum width defined in the axial direction. The at least one fifth offset tooth includes a fifth-offset-tooth center plane defined to bisect the fifth maximum width. The fifth-offset-tooth center plane is perpendicular to the rotational center axis and is offset from the third-offset-tooth center plane away from the fourth-offset-tooth center plane in the axial direction.

With the bicycle sprocket assembly according to the thirty-first aspect, it is possible to improve chain-holding performance of the larger sprocket in a state where a chain line of the bicycle chain extending from the larger sprocket is inclined relative to the larger sprocket. Furthermore, it is possible to improve chain-holding performance of the smaller sprocket in a state where a chain line of the bicycle chain extending from the smaller sprocket is inclined relative to the smaller sprocket. Accordingly, it is possible to improve chain-holding performance of the bicycle sprocket assembly.

In accordance with a thirty-second aspect of the present invention, the bicycle sprocket assembly according to the thirty-first aspect is configured so that the second-offset-tooth center plane is closer to the smaller sprocket than the first-offset-tooth center plane in the axial direction.

With the bicycle sprocket assembly according to the thirty-second aspect, it is possible to further improve the chain-holding performance of the bicycle sprocket assembly.

In accordance with a thirty-third aspect of the present invention, the bicycle sprocket assembly according to the thirty-first or thirty-second aspect is configured so that the larger sprocket body has a sprocket body center plane. The second-offset-tooth center plane coincides with the sprocket body center plane.

With the bicycle sprocket assembly according to the thirty-third aspect, it is possible to further improve the chain-holding performance of the bicycle sprocket assembly.

In accordance with a thirty-fourth aspect of the present invention, the bicycle sprocket assembly according to the thirty-first aspect is configured so that the first-offset-tooth center plane is closer to the smaller sprocket than the second-offset-tooth center plane in the axial direction.

With the bicycle sprocket assembly according to the thirty-fourth aspect, it is possible to further improve the chain-holding performance of the bicycle sprocket assembly.

In accordance with a thirty-fifth aspect of the present invention, the bicycle sprocket assembly according to the thirty-first or thirty-fourth aspect is configured so that the larger sprocket body has a sprocket body center plane. The second-offset-tooth center plane coincides with the sprocket body center plane.

With the bicycle sprocket assembly according to the thirty-fifth aspect, it is possible to further improve the chain-holding performance of the bicycle sprocket assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
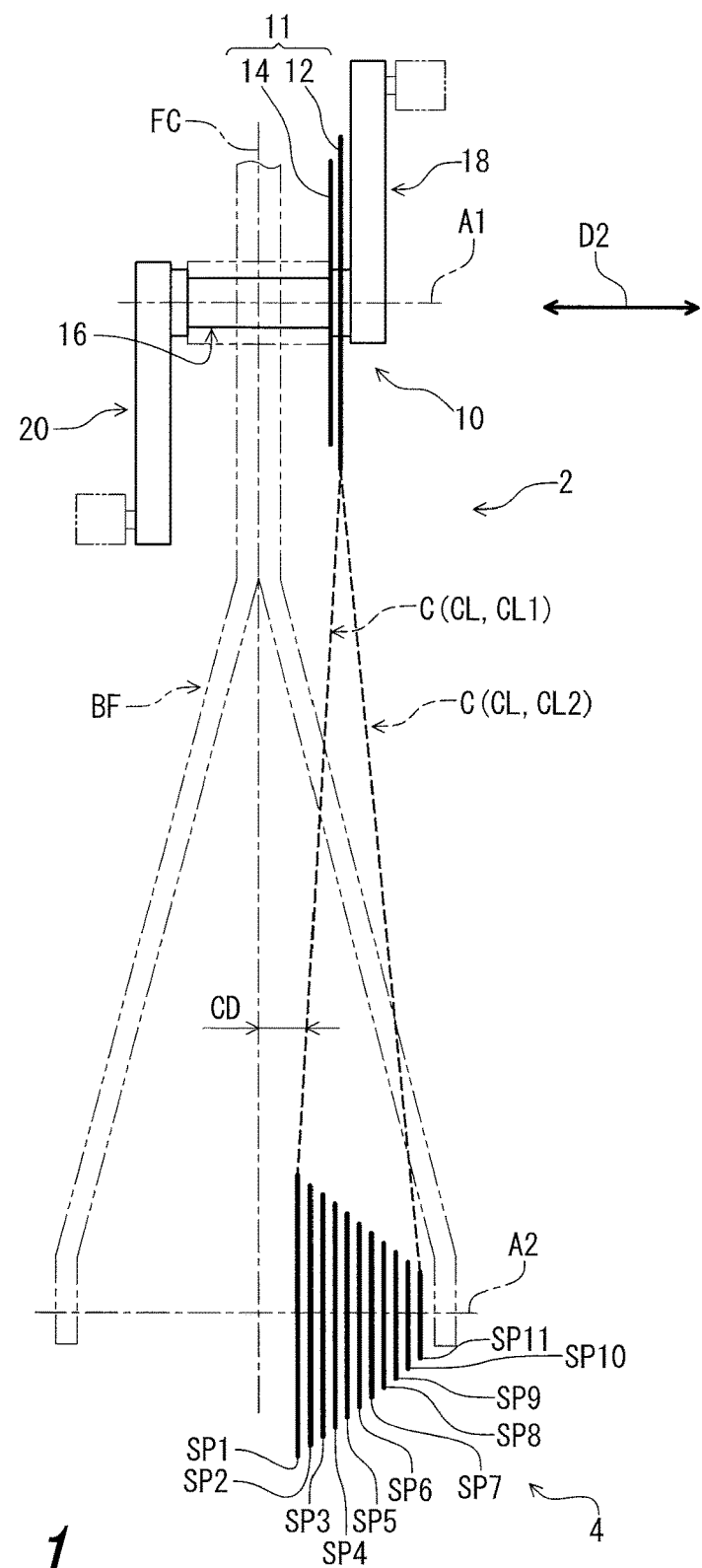
FIG. 1 is a schematic diagram of a drive train including a bicycle crank assembly in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle drive train 2 including a bicycle crank assembly 10 in accordance with a first embodiment is illustrated. The bicycle crank assembly 10 includes a bicycle sprocket assembly 11. The bicycle sprocket assembly 11 comprises a bicycle sprocket 12 and an additional sprocket 14. The bicycle crank assembly 10 further includes a crank axle 16, a crank arm 18, and an additional crank arm 20. The crank arm 18 is a right crank arm. The additional crank arm 20 is a left crank arm. The crank arm 18 and the additional crank arm 20 are secured to the crank axle 16. In this embodiment, the bicycle sprocket assembly 11 is a front sprocket assembly. However, structures of the bicycle sprocket assembly 11 can be applied to the multiple rear sprocket assembly 4.

The bicycle drive train 2 includes a multiple rear sprocket assembly 4. The multiple rear sprocket assembly 4 includes bicycle rear sprockets. The bicycle rear sprockets includes eleven rear sprockets SP1 to SP11. The bicycle rear sprocket SP1 can also be referred to as a largest rear sprocket SP1. The bicycle rear sprocket SP11 can also be referred to as a smallest rear sprocket SP11. Namely, the multiple rear sprocket assembly 4 comprises the largest rear sprocket SP1 and the smallest rear sprocket SP11. The largest rear sprocket SP1 corresponds to a low-gear sprocket and has a largest outer diameter in the multiple rear sprocket assembly 4. The smallest rear sprocket SP11 corresponds to a top-gear sprocket and has a smallest outer diameter in the multiple rear sprocket assembly 4.

In the present application, the following directional terms "front", "rear", "forward", "rearward", "left", "right", "transverse", "upward" and "downward" as well as any other similar directional teams refer to those directions which are determined on the basis of a user (e.g., a rider) who sits on a saddle (not shown) of a bicycle with facing a handlebar (not shown). Accordingly, these terms, as utilized to describe the bicycle sprocket assembly 11, should be interpreted relative to the bicycle equipped with the bicycle sprocket assembly 11 as used in an upright riding position on a horizontal surface.

As seen in FIG. 1, the bicycle sprocket assembly 11 has a rotational center axis A1 and is rotatable relative to a bicycle frame BF about the rotational center axis A1. Namely, the bicycle sprocket 12 and the additional sprocket 14 have the rotational center axis A1. The bicycle crank assembly is rotatable relative to the bicycle frame BF about the rotational center axis A1. The multiple rear sprocket assembly 4 has a rotational center axis A2. The multiple rear sprocket assembly 4 is rotatable about the rotational center axis A2 relative to the bicycle frame BF. A bicycle chain C extends between the bicycle sprocket assembly 11 and the multiple rear sprocket assembly 4. The bicycle sprocket assembly 11 and the multiple rear sprocket assembly 4 are engaged with the bicycle chain C to transmit a rotational driving force from the bicycle sprocket assembly 11 to the multiple rear sprocket assembly 4 via the bicycle chain C.

The bicycle chain C extends between the bicycle sprocket assembly 11 and the multiple rear sprocket assembly 4 to define a chain line CL indicated with a broken line. A first chain line CL1 is inclined relative to the bicycle sprocket 12 to decrease a distance CD from the bicycle sprocket assembly 11 (e.g., the bicycle sprocket 12 or the additional sprocket 14) to the multiple rear sprocket assembly 4 (e.g., the rear sprocket SP1). A second chain line CL2 is inclined relative to the bicycle sprocket 12 to increase the distance CD from the bicycle sprocket assembly 11 (e.g., the bicycle sprocket 12 or the additional sprocket 14) to the multiple rear sprocket assembly 4 (e.g., the rear sprocket SP11). A distance CD is defined between the chain line CL and a frame center plane FP of the bicycle frame BF. The frame center plane FP is defined at a transverse center of the bicycle frame BF and is perpendicular to the rotational center axis A1.

Figure 2:
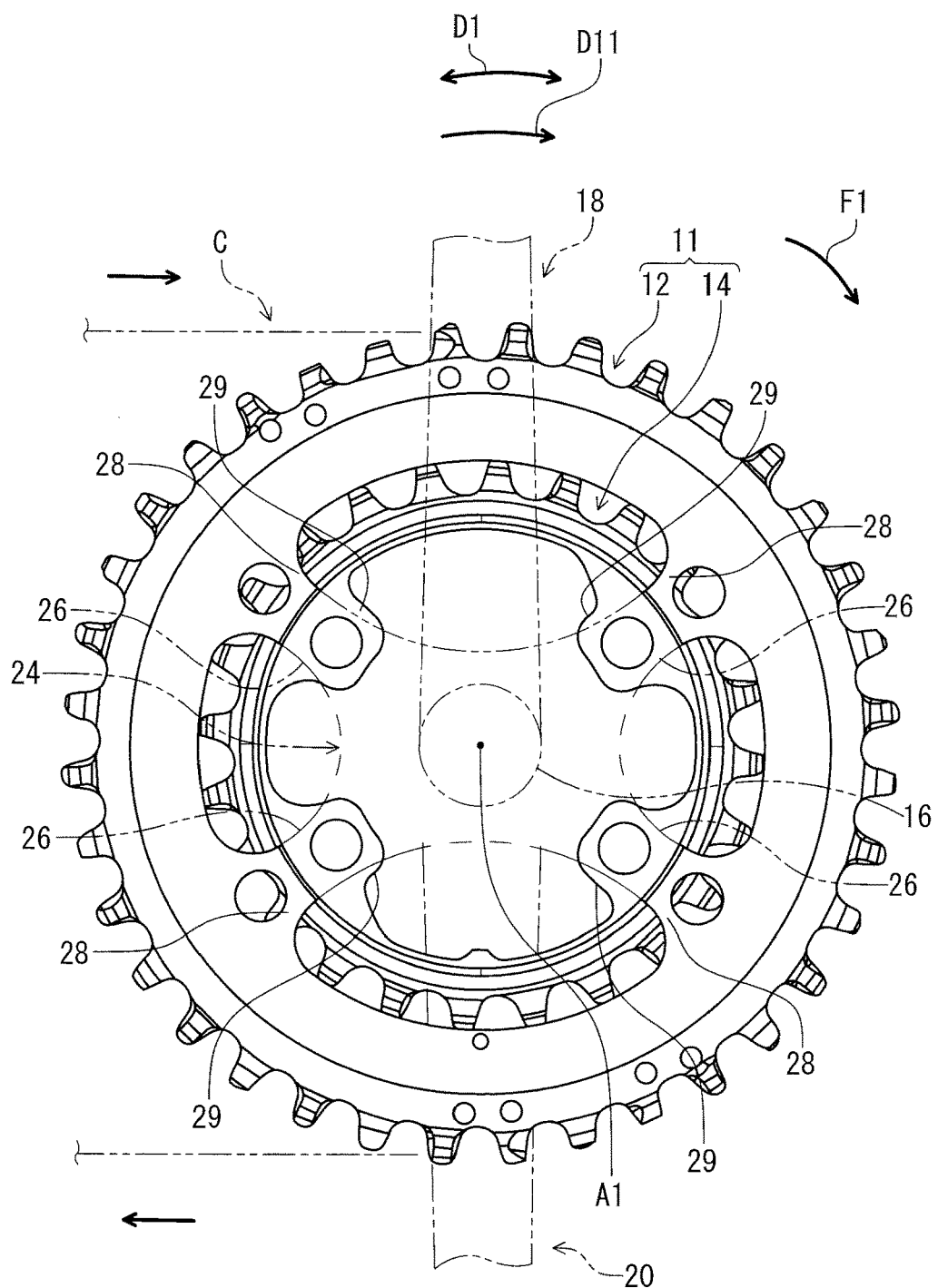
FIG. 2 is a side elevational view of the bicycle crank assembly illustrated in FIG.
Figure 3:
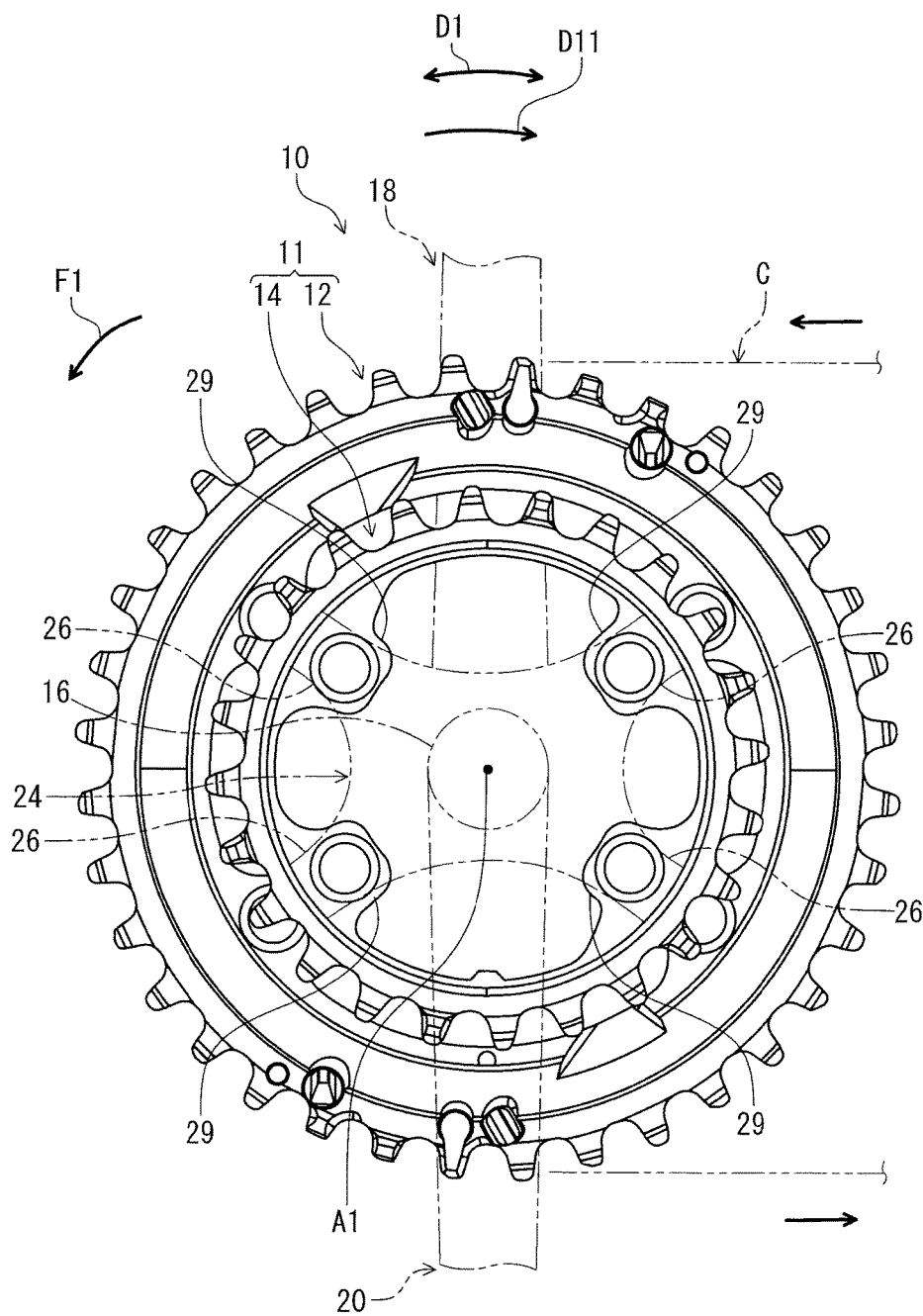
FIG. 3 is another side elevational view of the bicycle crank assembly illustrated in FIG. 1.

As seen in FIGS. 2 and 3, the bicycle sprocket is rotated about the rotational center axis A1 in a driving rotational direction D11 during pedaling. The driving rotational direction D11 is defined along a circumferential direction D1 defined about the rotational center axis A1. The bicycle sprocket 12 and the additional sprocket 14 are engaged with the bicycle chain C to transmit a rotational driving force F1 to the bicycle chain C. The bicycle chain C is shifted between the additional sprocket 14 and the bicycle sprocket 12 by a front derailleur (not shown). In this embodiment, the bicycle sprocket 12 is a front sprocket. However, the structure of the bicycle sprocket 12 can be at least partly applied to a rear sprocket.

The bicycle sprocket 12 is coupled to the crank arm 18 to integrally rotate with the crank arm 18 about the rotational center axis A1. The additional sprocket 14 is coupled to the crank arm 18 to integrally rotate with the crank arm 18 about the rotational center axis A1. In this embodiment, the bicycle crank assembly 10 includes a sprocket mounting member 24. The sprocket mounting member 24 is mounted on the crank arm 18 to be rotatable integrally with the crank arm 18 about the rotational center axis A1. The bicycle sprocket 12 and the additional sprocket 14 are coupled to the sprocket mounting member 24. The sprocket mounting member 24 includes crank connecting arms 26. The bicycle sprocket 12 comprises first crank attachment portions 28. The additional sprocket 14 comprises second crank attachment portions 29. The crank connecting arms 26 are respectively fastened to the second crank attachment portions 29 with fasteners such as bolts (not shown). The first crank attachment portions 28 are fastened to the sprocket mounting member 24 with fasteners such as bolts (not shown).

In this embodiment, the sprocket mounting member 24 is integrally provided with the crank arm 18 as a one-piece unitary member. However, the sprocket mounting member 24 can be a separate member from the crank arm 18. Furthermore, the sprocket mounting member 24 can be omitted from the bicycle crank assembly 10. In such an embodiment, the additional sprocket 14 and the bicycle sprocket 12 can be directly coupled to the crank arm 18 and the crank axle 16. The sprocket mounting member 24 can be integrally provided with one of the bicycle sprocket 12, the additional sprocket 14, and the crank axle 16.

Figure 4:
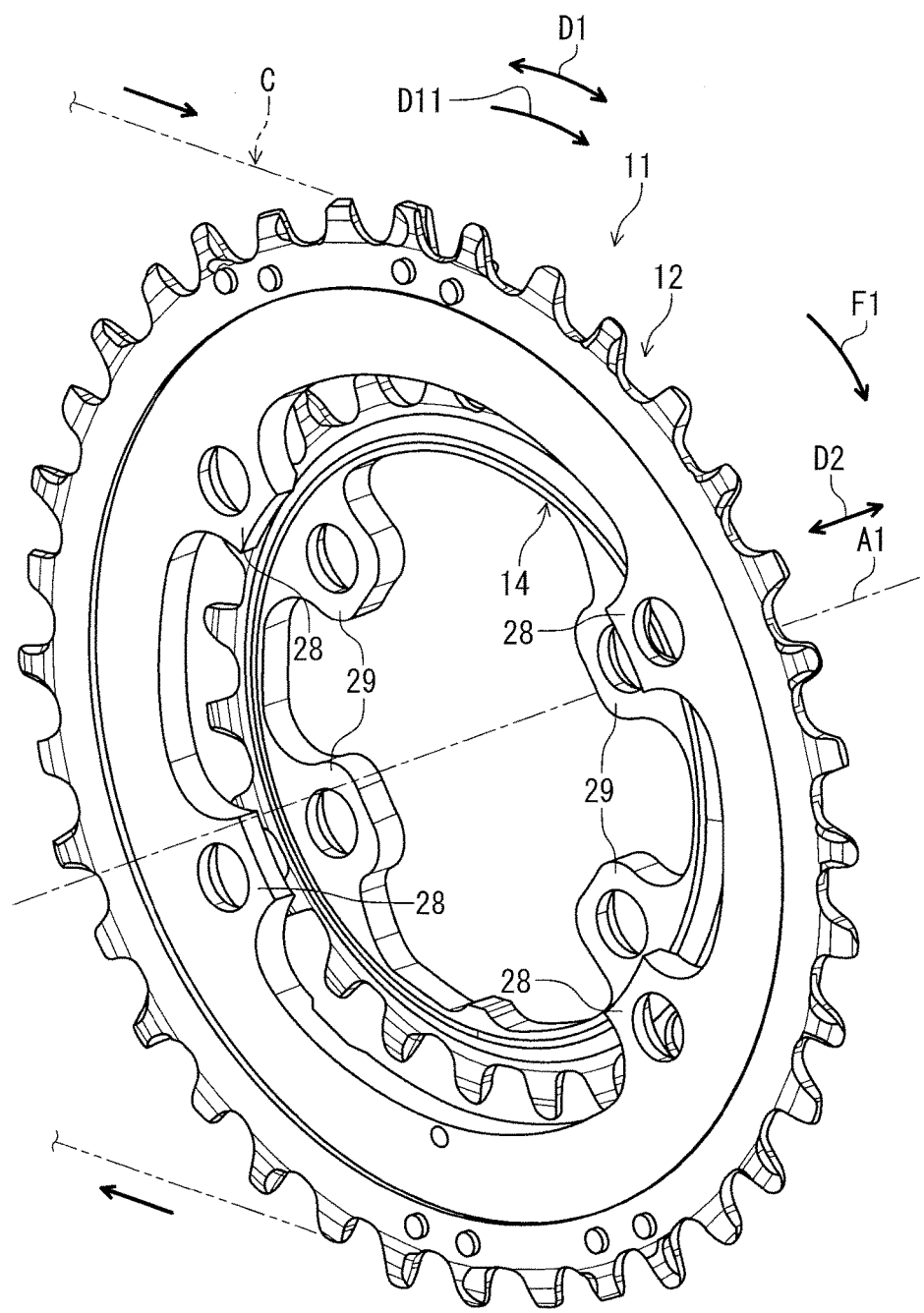
FIG. 4 is a perspective view of a bicycle sprocket assembly of the bicycle crank assembly illustrated in FIG. 1.
Figure 5:
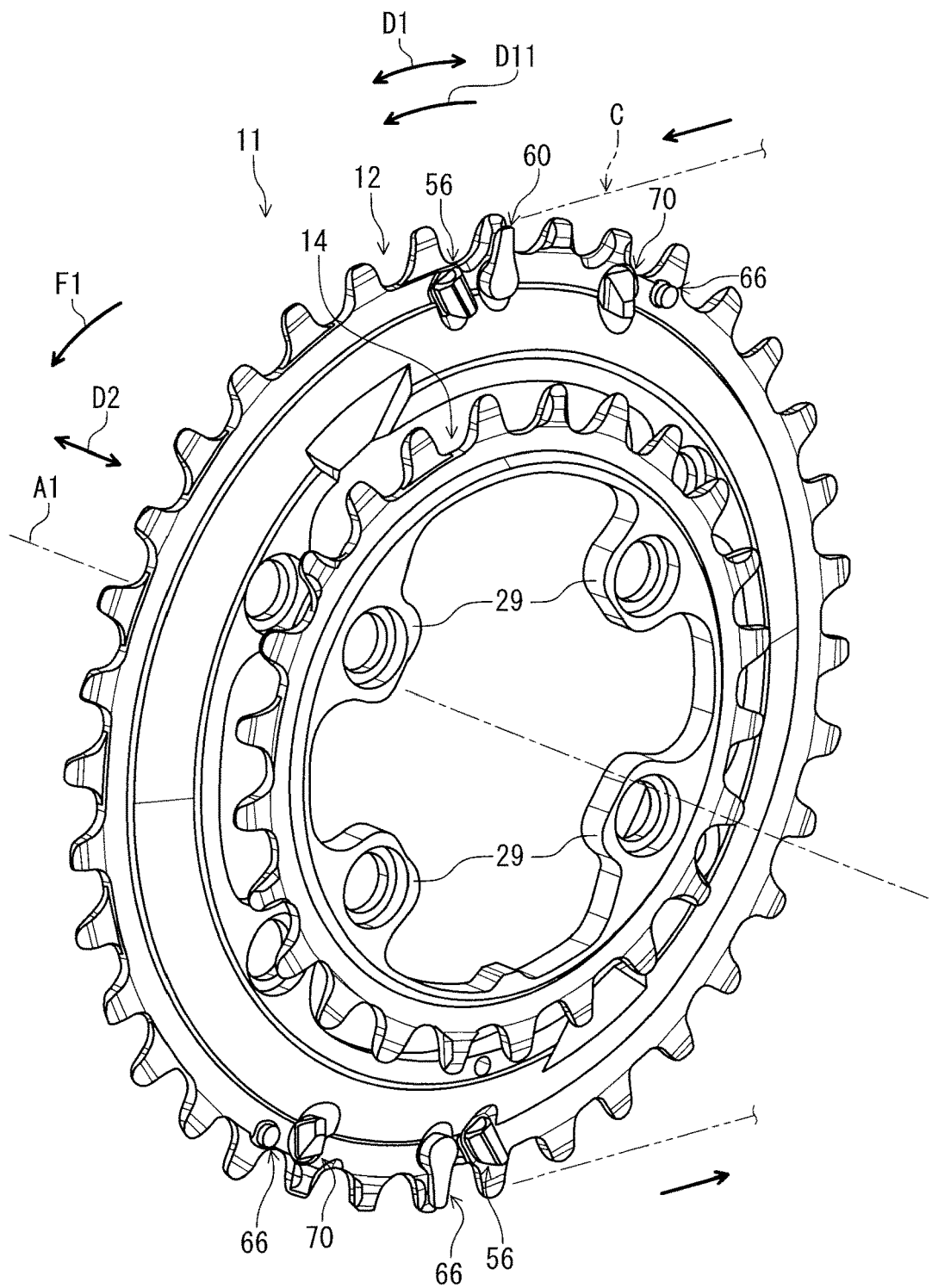
FIG. 5 is another perspective view of the bicycle sprocket assembly of the bicycle crank assembly illustrated in FIG. 1.

As seen in FIGS. 4 and 5, the additional sprocket 14 is provided to be spaced apart from the bicycle sprocket 12 in the axial direction D2. Specifically, the additional sprocket 14 is adjacent to the bicycle sprocket 12 in the axial direction D2 without another sprocket between the bicycle sprocket 12 and the additional sprocket 14 in the axial direction D2. The bicycle crank assembly 10 includes the bicycle sprocket 12 and the additional sprocket 14. However, the bicycle crank assembly 10 can include at least three sprockets. The additional sprocket 14 is adjacent to the bicycle sprocket 12 in an axial direction D2 parallel to the rotational center axis A1 without another sprocket between the additional sprocket 14 and the bicycle sprocket 12.

Figure 6:
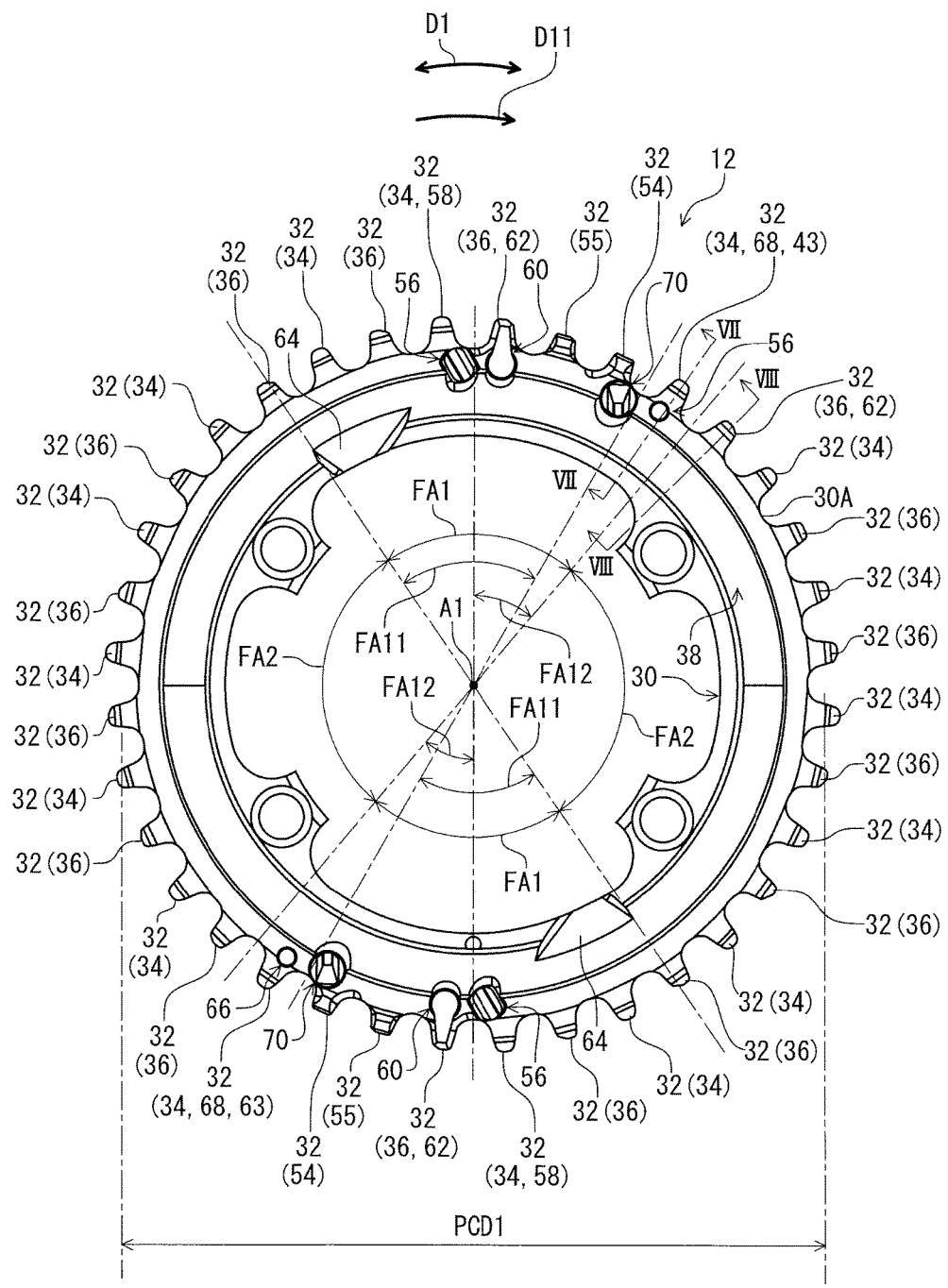
FIG. 6 is a side elevational view of a bicycle sprocket of the bicycle sprocket assembly illustrated in FIG. 4.

As seen in FIG. 6, the bicycle sprocket (a larger sprocket, a first sprocket) 12 comprises a sprocket body (a larger sprocket body, a first sprocket body) 30 and sprocket teeth (first chain-driving teeth, first sprocket teeth) 32. The sprocket teeth 32 are provided on an outer periphery 30A of the sprocket body 30. The sprocket teeth 32 include at least one first tooth (at least one first offset tooth) 34 and at least one second tooth (at least one second offset tooth) 36. The at least one first tooth 34 is provided on the outer periphery 30A of the sprocket body 30 to engage with an opposed pair of outer link plates C1 of the bicycle chain C. The at least one second tooth 36 is provided on the outer periphery 30A of the sprocket body 30 to engage with an opposed pair of inner link plates C2 of the bicycle chain C. In this embodiment, the at least one first tooth 34 includes first teeth 34 provided on the outer periphery 30A of the sprocket body 30 to engage with the opposed pair of outer link plates C1 of the bicycle chain C. The at least one second tooth 36 includes second teeth 36 provided on the outer periphery 30A of the sprocket body 30 to engage with the opposed pair of inner link plates C2 of the bicycle chain C. The first teeth 34 and the second teeth 36 are alternatingly arranged in the circumferential direction D1 defined about the rotational center axis A1.

Figure 7:
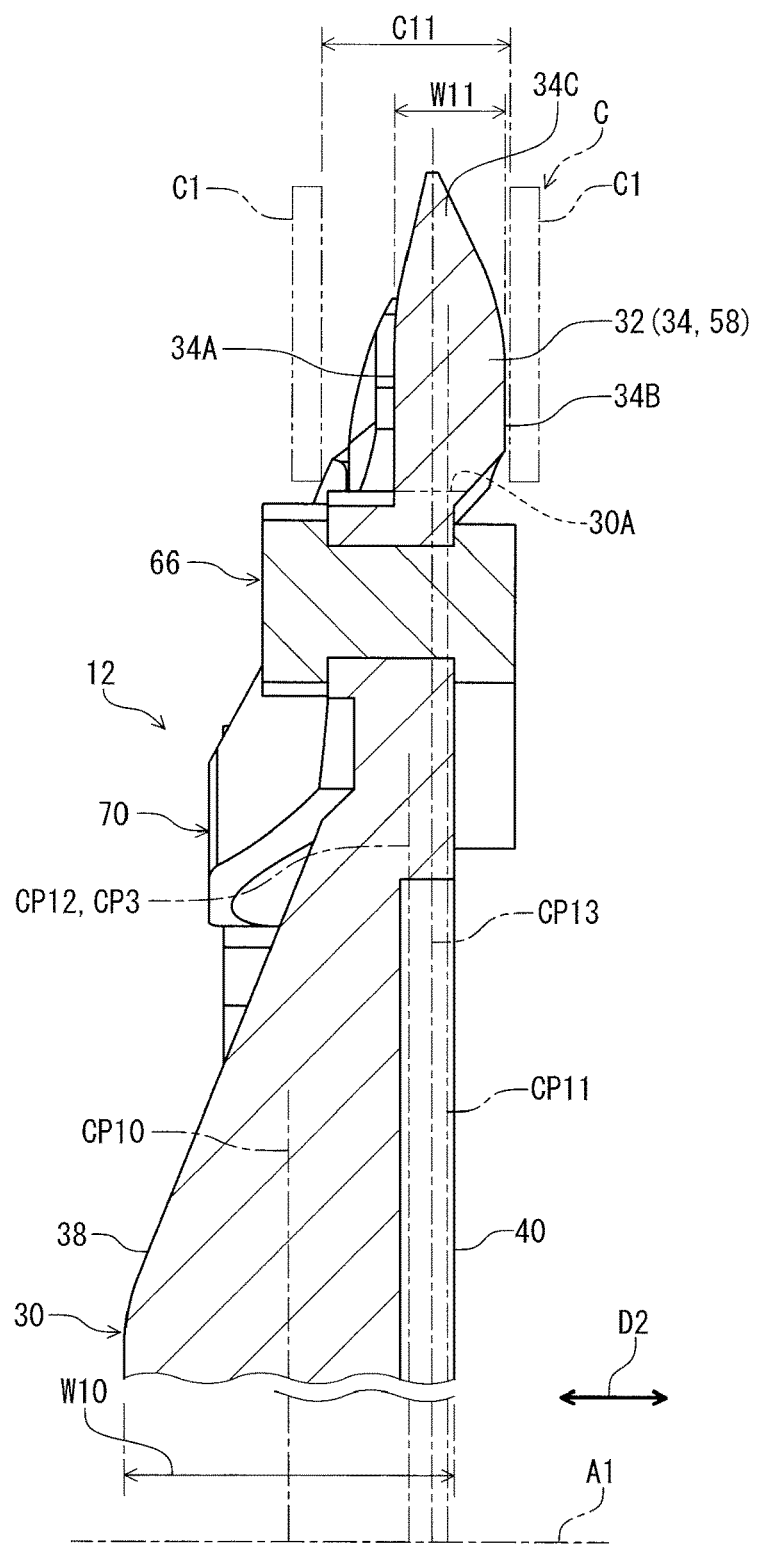
FIG. 7 is a cross-sectional view of the bicycle sprocket taken along line VII-VII of FIG. 6.

In this embodiment, as seen in FIG. 7, the bicycle sprocket 12 comprises a first axial surface 38 and a first reverse axial surface 40. The first axial surface 38 faces toward the additional sprocket 14 in the axial direction D2 parallel to the rotational center axis A1. The first reverse axial surface 40 faces in the axial direction D2 and is provided on a reverse side of the first axial surface 38 in the axial direction D2. The sprocket body 30 has a first body maximum width W10 defined between the first axial surface 38 and the first reverse axial surface 40 in the axial direction D2. The sprocket body 30 has a first reference center plane (a sprocket body center plane) CP10 defined to bisect the first body maximum width W10 in the axial direction D2. The first reference center plane CP10 is perpendicular to the rotational center axis A1.

As seen in FIG. 7, the at least one first tooth 34 has a first maximum axial width (a first maximum width, a first chain-engagement axial width) W11 defined in the axial direction D2 parallel to the rotational center axis A1 of the bicycle sprocket 12. In this embodiment, the first tooth 34 includes a first surface 34A and a first chain-engagement surface 34B. The first surface 34A faces in the axial direction D2. The first chain-engagement surface 34B faces in the axial direction D2 and is provided on a reverse side of the first surface 34A in the axial direction D2. The first chain-engagement surface 34B is contactable with the bicycle chain C (e.g., the outer link plate C1). The first maximum axial width W11 is defined between the first surface 34A and the first chain-engagement surface 34B in the axial direction D2.

The at least one first tooth 34 includes a first tooth center plane (a first-offset-tooth center plane) CP11 defined to bisect the first maximum axial width W11. The first tooth center plane CP11 is perpendicular to the rotational center axis A1. The first tooth center plane CP11 is offset from the first reference center plane CP10 in the axial direction D2. However, the first tooth center plane CP11 can coincide with the first reference center plane CP10 in the axial direction D2.

The at least one first tooth 34 includes a first tooth-tip 34C having a first-tip center plane CP13. The first-tip center plane CP13 is perpendicular to the rotational center axis A1. The first-tip center plane CP13 is offset from the first reference center plane CP10 and the first tooth center plane CP11 in the axial direction D2. The first-tip center plane CP13 is offset from the first tooth center plane CP11 toward the additional sprocket 14 in the axial direction D2. However, the first-tip center plane CP13 can coincide with at least one of the first reference center plane CP10 and the first tooth center plane CP11 in the axial direction D2. The first-tip center plane CP13 can be offset from the first tooth center plane CP11 away from the additional sprocket 14 in the axial direction D2. The first tooth 34 has an asymmetrical shape with respect to the first tooth center plane CP11 in the axial direction D2. However, the first tooth 34 can have a symmetrical shape with respect to the first tooth center plane CP11 in the axial direction D2.

Figure 8:
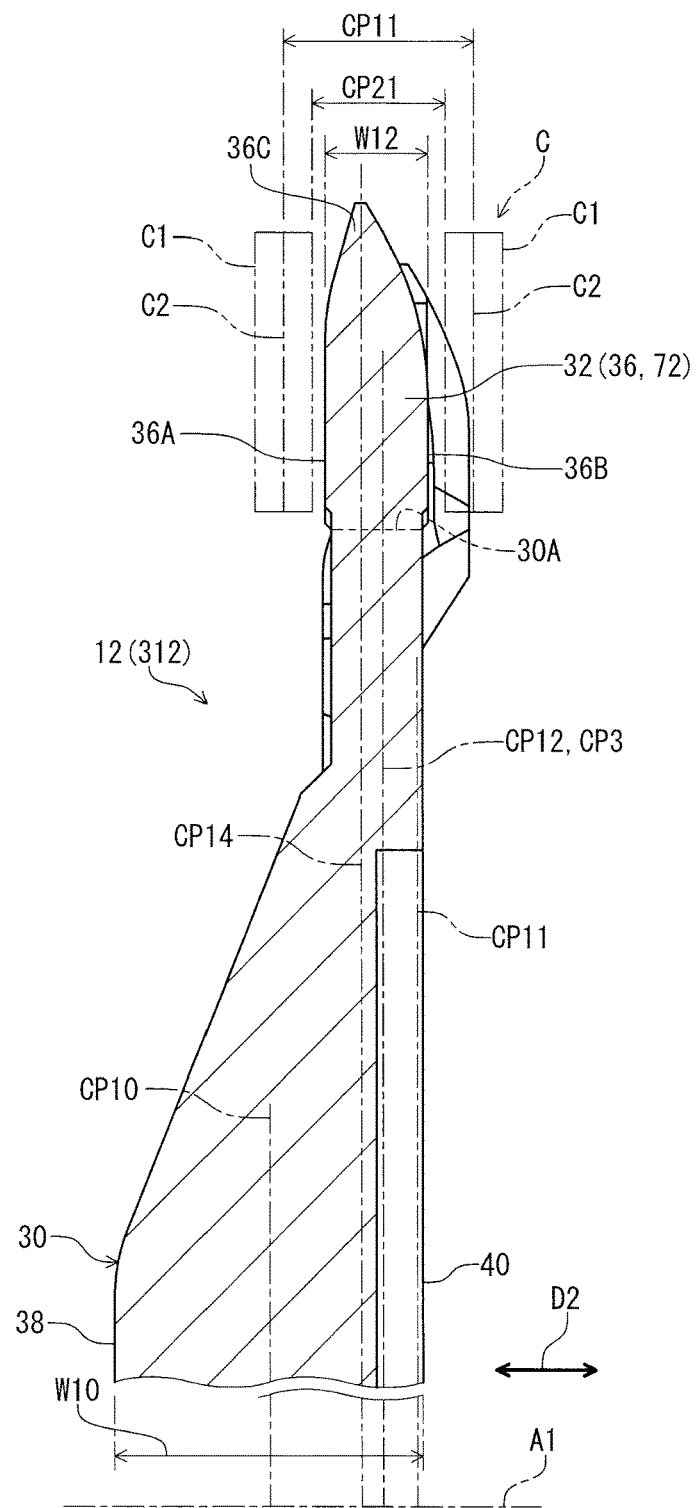
FIG. 8 is a cross-sectional view of the bicycle sprocket taken along line VIII-VIII of FIG. 6.

As seen in FIG. 8, the at least one second tooth 36 has a second maximum axial width (a second maximum width, a second chain-engagement axial width) W12 defined in the axial direction D2. In this embodiment, the second tooth 36 includes a second chain-engagement surface 36A and a second additional chain-engagement surface 36B. The second chain-engagement surface 36A faces in the axial direction D2 and is contactable with the bicycle chain C (e.g., the inner link plate C2). The second additional chain-engagement surface 36B faces in the axial direction D2 and is provided on a reverse side of the second chain-engagement surface 36A in the axial direction D2. The second additional chain-engagement surface 36B is contactable with the bicycle chain C (e.g., the inner link plate C2). The second maximum axial width W12 is defined between the second chain-engagement surface 36A and the second additional chain-engagement surface 36B in the axial direction D2.

The at least one second tooth 36 includes a second tooth center plane (a second-offset-tooth center plane) CP12 defined to bisect the second maximum axial width W12. The second tooth center plane CP12 is perpendicular to the rotational center axis A1. The second tooth center plane CP12 is offset from the first tooth center plane CP11 in the axial direction D2. In this embodiment, the first tooth center plane CP11 of the at least one first tooth 34 is offset from the second tooth center plane CP12 away from the additional sprocket 14 in the axial direction D2. The second-offset tooth center plane CP12 is closer to the additional sprocket 14 than the first-offset-tooth center plane CP11 in the axial direction D2. However, the second tooth center plane CP12 can coincide with the first tooth center plane CP11. The second tooth center plane CP12 is offset from the first reference center plane CP10 away from the additional sprocket 14 in the axial direction D2. However, the second tooth center plane CP12 can coincide with the first reference center plane CP10 in the axial direction D2.

The second tooth 36 includes a second tooth-tip 36C having a second tooth-tip center plane CP14. The second tooth-tip center plane CP14 is perpendicular to the rotational center axis A1. The second tooth-tip center plane CP14 is offset from the first reference center plane CP10 and the second tooth center plane CP12 in the axial direction D2. The second-tip center plane CP14 is offset from the second tooth center plane CP12 toward the additional sprocket 14 in the axial direction D2. However, the second tooth-tip center plane CP14 can coincide with at least one of the first reference center plane CP10 and the second tooth center plane CP12 in the axial direction D2. The second-tip center plane CP14 can be offset from the second tooth center plane CP12 away from the additional sprocket 14 in the axial direction D2. The second tooth 36 has an asymmetrical shape with respect to the second tooth center plane CP12 in the axial direction D2. However, the second tooth 36 can have a symmetrical shape with respect to the second tooth center plane CP12 in the axial direction D2.

In this embodiment, the second maximum axial width W12 is equal to the first maximum axial width W11. The first maximum axial width W11 and the second maximum axial width W12 are smaller than the inner link space C21. However, the second maximum axial width W12 can be different from the first maximum axial width W11.

Figure 9:
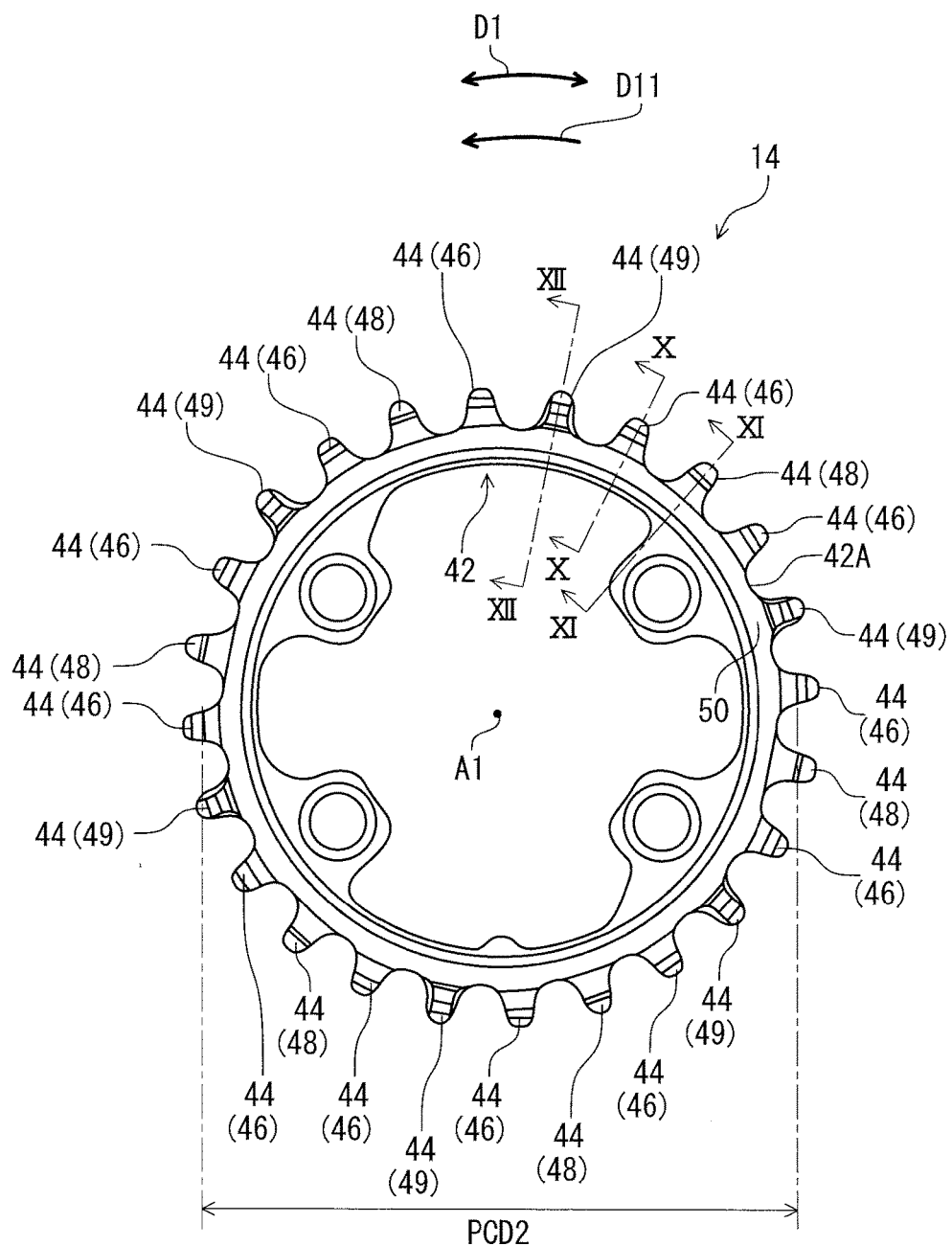
FIG. 9 is a side elevational view of an additional sprocket of the bicycle sprocket assembly illustrated in FIG. 4.

As seen in FIG. 9, the additional sprocket (a smaller sprocket, a second sprocket) 14 includes an additional sprocket body (a smaller sprocket body, a second sprocket body) 42 and additional sprocket teeth (second chain-driving teeth, second sprocket teeth) 44. The additional sprocket teeth 44 are provided on an outer periphery 42A of the additional sprocket body 42. The additional sprocket teeth 44 include at least one third tooth (at least one third offset tooth, at least one third chain-engagement tooth) 46, at least one fourth tooth (at least one fourth offset tooth, at least one fourth chain-engagement tooth) 48, and at least one fifth tooth (at least one fifth offset tooth, at least one fourth chain-engagement tooth) 49. The at least one third tooth 46 is provided on an outer periphery 42A of the additional sprocket body 42 to engage with the opposed pair of inner link plates C2 (FIG. 10) of the bicycle chain C. The at least one fourth tooth 48 is provided on the outer periphery 42A of the additional sprocket body 42 to engage with the opposed pair of outer link plates C1 (FIG. 11) of the bicycle chain C. The at least one fifth tooth 49 provided on the outer periphery 42A of the additional sprocket body 42 to engage with the opposed pair of outer link plates C1 (FIG. 12) of the bicycle chain C.

In this embodiment, the at least one third tooth 46 includes third teeth 46 provided on the outer periphery 42A of the additional sprocket body 42 to engage with the opposed pair of inner link plates C2 (FIG. 10) of the bicycle chain C The at least one fourth tooth 48 includes fourth teeth 48 provided on the outer periphery 42A of the additional sprocket body 42 to engage with the opposed pair of outer link plates C1 (FIG. 11) of the bicycle chain C. The at least one fifth tooth 49 includes fifth teeth 49 provided on the outer periphery 42A of the additional sprocket body 42 to engage with the opposed pair of outer link plates C1 (FIG. 12) of the bicycle chain C. The fourth teeth 48 and the fifth teeth 49 are alternatingly arranged in the circumferential direction D1 of the bicycle sprocket assembly 11. The third teeth 46 are respectively provided between the fourth teeth 48 and the fifth teeth 49 in the circumferential direction D1.

Figure 10:
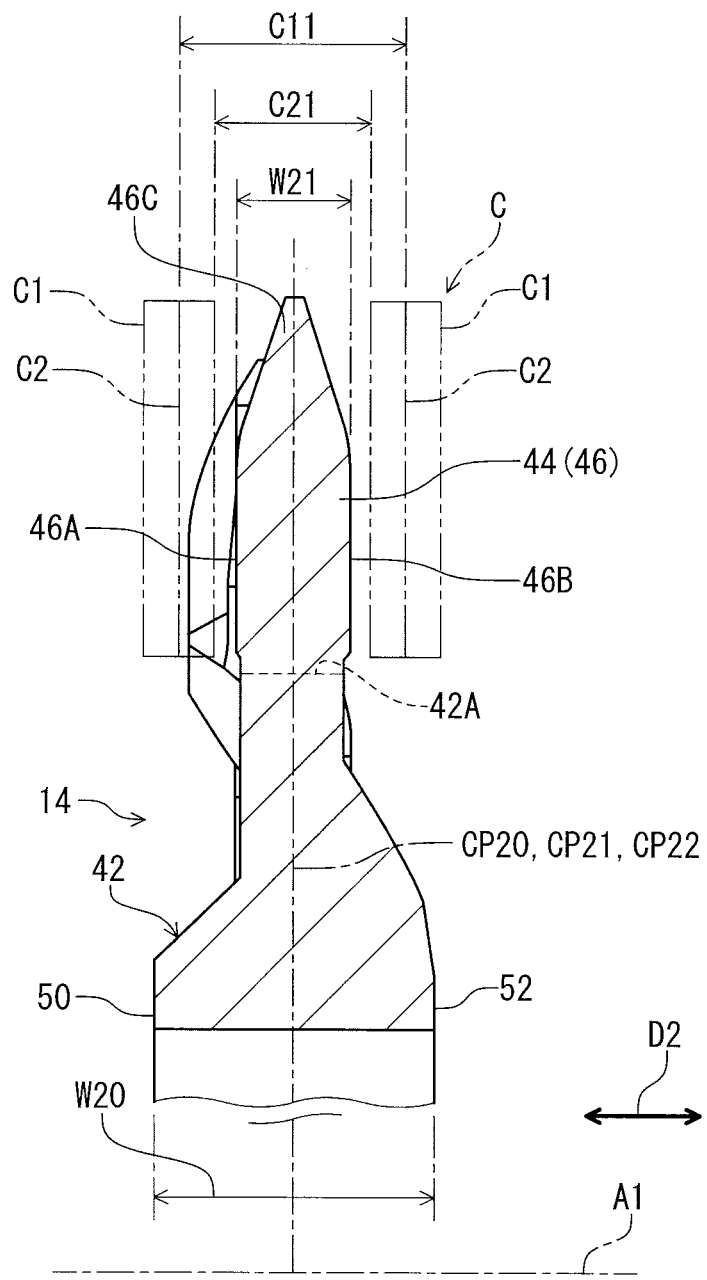
FIG. 10 is a cross-sectional view of the additional sprocket taken along line X-X of FIG. 9.

As seen in FIG. 10, the at least one third tooth 46 has a third maximum axial width (an outer link plate engaging width) W21 defined in the axial direction D2. In this embodiment, the third tooth 46 includes a third chain-engagement surface 46A and a third additional chain-engagement surface 46B. The third chain-engagement surface 46A faces in the axial direction D2 and is contactable with the bicycle chain C (e.g., the inner link plate C2). The third additional chain-engagement surface 46B faces in the axial direction D2 and is provided on a reverse side of the third chain-engagement surface 46A in the axial direction D2. The third additional chain-engagement surface 46B is contactable with the bicycle chain C (e.g., the inner link plate C2). The third maximum axial width W21 is defined between the third chain-engagement surface 46A and the third additional chain-engagement surface 46B in the axial direction D2.

The at least one third tooth 46 has a third tooth center plane (a third-offset-tooth center plane, a second axial center plane) CP21 defined to bisect the third maximum axial width W21. The third tooth center plane CP21 is perpendicular to the rotational center axis A1. The third tooth center plane CP21 coincides with the second reference center plane CP20 in the axial direction D2. However, the third tooth center plane CP21 can be offset from the second reference center plane CP20 in the axial direction D2.

The third tooth 46 includes a third tooth-tip 46C having a third tooth-tip center plane CP22. The third tooth-tip center plane CP22 is perpendicular to the rotational center axis A1. The third tooth-tip center plane CP22 coincides with the second reference center plane CP20 and the third tooth center plane CP21 in the axial direction D2. However, the third tooth-tip center plane CP22 can be offset from at least one of the second reference center plane CP20 and the third tooth center plane CP21 in the axial direction D2. The third tooth 46 has a symmetrical shape with respect to the third tooth center plane CP21 in the axial direction D2. However, the third tooth 46 can have an asymmetrical shape with respect to the third tooth center plane CP21 in the axial direction D2.

Figure 11:
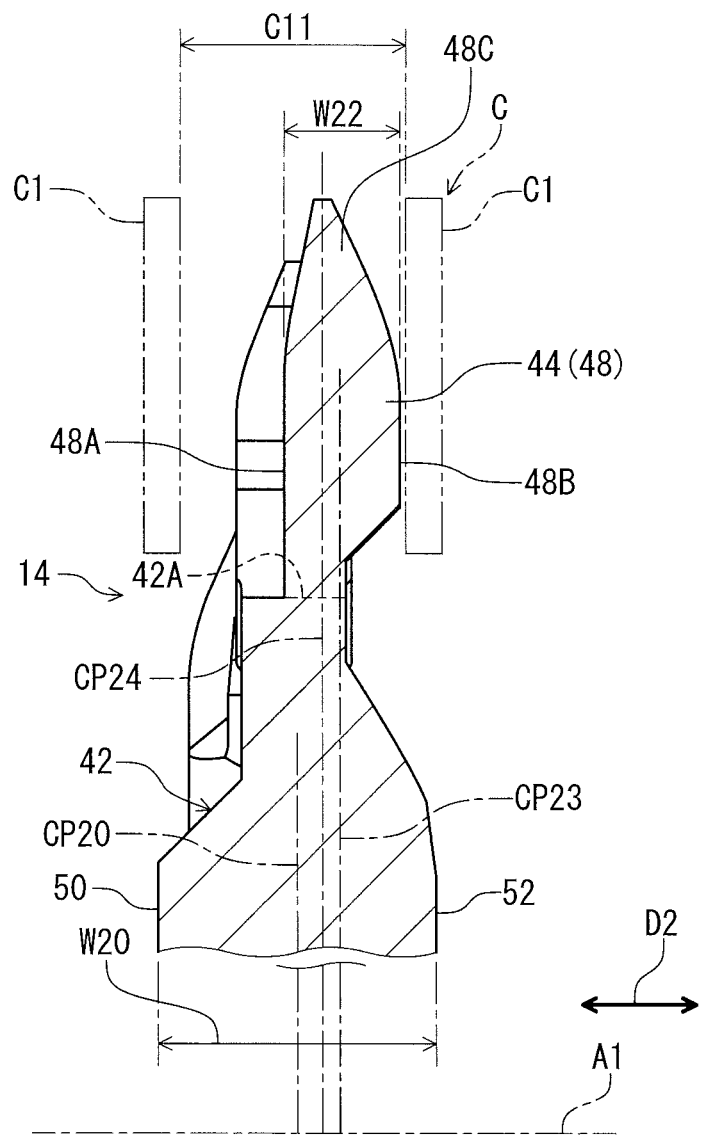
FIG. 11 is a cross-sectional view of the additional sprocket taken along line XI-XI of FIG. 9.

As seen in FIG. 11, the at least one fourth tooth 48 has a fourth maximum axial width (an inner link plate engaging width) W22 defined in the axial direction D2. In this embodiment, the fourth tooth 48 includes a fourth surface 48A and a fourth chain-engagement surface 48B. The fourth surface 48A faces in the axial direction D2. The fourth chain-engagement surface 48B faces in the axial direction D2 and is provided on a reverse side of the fourth surface 48A in the axial direction D2. The fourth chain-engagement surface 48B is contactable with the bicycle chain C (e.g., the outer link plate C1). The fourth maximum axial width W22 is defined between the fourth surface 48A and the fourth chain-engagement surface 48B in the axial direction D2.

The at least one fourth tooth 48 has a fourth tooth center plane (a fourth-offset-tooth center plane, a first axial center plane) CP23 defined to bisect the fourth maximum axial width W22. The fourth tooth center plane CP23 is perpendicular to the rotational center axis A1. The fourth tooth center plane CP23 is offset from the third tooth center plane CP21 in the axial direction D2. The fourth tooth center plane CP23 is offset from the second reference center plane CP20 toward the bicycle sprocket 12 in the axial direction D2. However, the fourth tooth center plane CP23 can coincide with the second reference center plane CP20 in the axial direction D2. The fourth tooth center plane CP23 coincides with the third tooth center plane CP21. However, the fourth tooth center plane CP23 can be offset from the third tooth center plane CP21 in the axial direction D2.

The fourth tooth 48 includes a fourth tooth-tip 48C having a fourth tooth-tip center plane CP24. The fourth tooth-tip center plane CP24 is perpendicular to the rotational center axis A1. The fourth tooth-tip center plane CP24 is offset from the second reference center plane CP20 and the fourth tooth center plane CP23 in the axial direction D2. The fourth tooth-tip center plane CP24 is offset from the fourth tooth center plane CP23 away from the bicycle sprocket 12 in the axial direction D2. However, the fourth tooth-tip center plane CP24 can coincide with at least one of the second reference center plane CP20 and the fourth tooth center plane CP23 in the axial direction D2. The fourth tooth 48 has an asymmetrical shape with respect to the fourth tooth center plane CP23 in the axial direction D2. However, the fourth tooth 48 can have a symmetrical shape with respect to the fourth tooth center plane CP23 in the axial direction D2.

Figure 12:
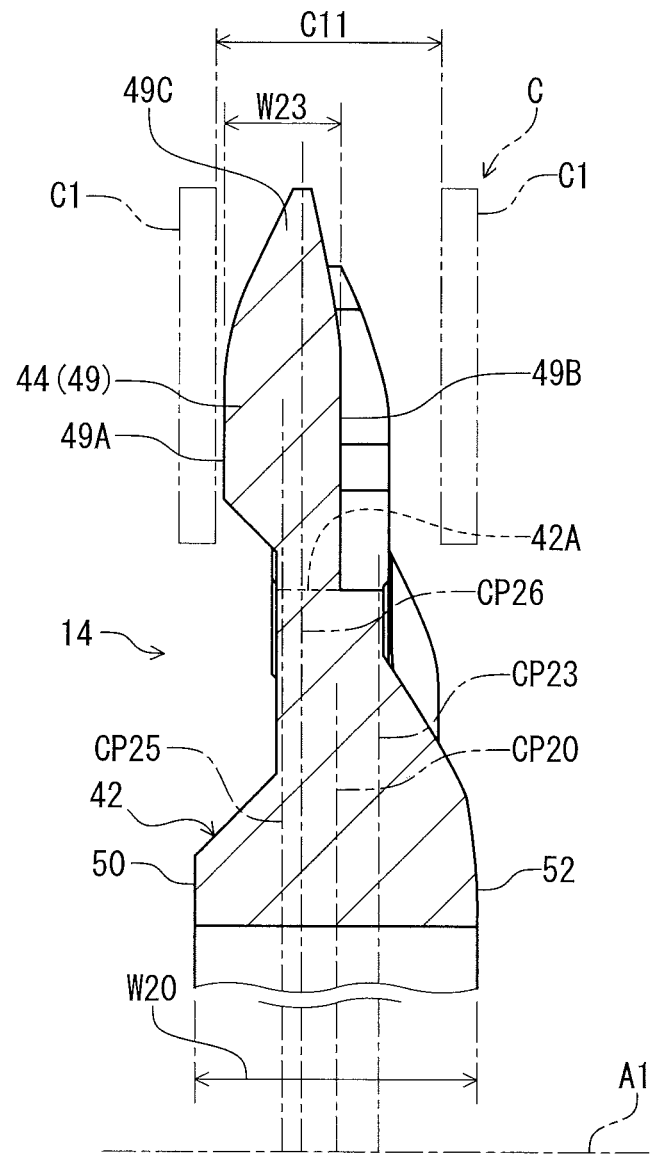
FIG. 12 is a cross-sectional view of the additional sprocket taken along line XII-XII of FIG. 9.

As seen in FIG. 12, the at least one fifth tooth 49 has a fifth maximum axial width (an outer link plate engaging width) W23 defined in the axial direction D2. In this embodiment, the fifth tooth 49 includes a fifth chain-engagement surface 49A and a fifth surface 49B. The fifth chain-engagement surface 49A faces in the axial direction D2 and is contactable with the bicycle chain C (e.g., the outer link plate C1). The fifth surface 49B faces in the axial direction D2 and is provided on a reverse side of the fifth chain-engagement surface 49A in the axial direction D2. The fifth maximum axial width W23 is defined between the fifth chain-engagement surface 49A and the fifth surface 49B in the axial direction D2.

The at least one fifth tooth 49 has a fifth tooth center plane (a fifth-offset-tooth center plane, a first axial center plane) CP25 defined to bisect the fifth maximum axial width W23. The fifth tooth center plane CP25 is perpendicular to the rotational center axis A1 and offset from the third tooth center plane CP21 in the axial direction D2. The fifth-offset-tooth center plane CP25 is offset from the third-offset-tooth center plane CP21 away from the fourth-offset-tooth center plane CP23 in the axial direction D2. The third tooth center plane CP21 is provided between the fourth tooth center plane CP23 and the fifth tooth center plane CP25 in the axial direction D2. The fifth tooth center plane CP25 is offset from the second reference center plane CP20 away from the bicycle sprocket 12 in the axial direction D2. However, the fifth tooth center plane CP25 can coincide with at least one of the second reference center plane CP20, the third tooth center plane CP21, and the fourth tooth center plane CP23 in the axial direction D2.

The fifth tooth 49 includes a fifth tooth-tip 49C having a fifth tooth-tip center plane CP26. The fifth tooth-tip center plane CP26 is perpendicular to the rotational center axis A1. The fifth tooth-tip center plane CP26 is offset from the second reference center plane CP20 and the fifth tooth center plane CP25 in the axial direction D2. The fifth tooth-tip center plane CP26 is offset from the fifth tooth center plane CP25 toward the bicycle sprocket 12 in the axial direction D2. However, the fifth tooth-tip center plane CP26 can coincide with at least one of the second reference center plane CP20 and the fifth tooth center plane CP25 in the axial direction D2. The fifth tooth 49 has an asymmetrical shape with respect to the fifth tooth center plane CP25 in the axial direction D2. However, the fifth tooth 49 can have a symmetrical shape with respect to the fifth tooth center plane CP25 in the axial direction D2.

In this embodiment, as seen in FIGS. 9 to 11, the fourth maximum axial width W22 and the fifth maximum axial width W23 are equal to the third maximum axial width W21. The third maximum axial width W21, the fourth maximum axial width W22, and the fifth maximum axial width W23 are smaller than the inner link space C21. However, at least one of the fourth maximum axial width W22 and the fifth maximum axial width W23 can be different from the third maximum axial width W21.

In this embodiment, as seen in FIGS. 6 and 9, a total number of the sprocket teeth 32 is an even number, and a total number of the additional sprocket teeth 44 is an even number. For example, the total number of the sprocket teeth 32 is thirty-six, and the total number of the additional sprocket teeth 44 is twenty-four. However, a total number of the sprocket teeth 32 is not limited to this embodiment. A total number of the additional sprocket teeth 44 is not limited to this embodiment.

As seen in FIGS. 6 and 9, the bicycle sprocket 12 has a first pitch-circle diameter PCD1. The additional sprocket 14 has a second pitch-circle diameter PCD2 smaller than the first pitch-circle diameter PCD1 of the bicycle sprocket 12. The bicycle sprocket 12 corresponds to top gear of the bicycle sprocket assembly 11, and the additional sprocket 14 corresponds to low gear of the bicycle sprocket assembly 11. The first pitch-circle diameter PCD1 is defined by the sprocket teeth 32. The second pitch-circle diameter PCD2 is defined by the additional sprocket teeth 44. The first pitch-circle diameter PCD1 can be defined based on the centers C31 of the pins C3 (FIG. 34) of the bicycle chain C which is engaged with the sprocket teeth 32. The second pitch-circle diameter PCD2 can be defined based on the centers C31 of the pins C3 (FIG. 28) of the bicycle chain C which is engaged with the additional sprocket teeth 44. The pitch-circle diameter PCD2 of the additional sprocket 14 can be larger than the first pitch-circle diameter PCD1 of the bicycle sprocket 12. However, the second pitch-circle diameter PCD2 can be larger than the first pitch-circle diameter PCD1 of the bicycle sprocket 12. Namely, the bicycle sprocket 12 can correspond to low gear of the bicycle sprocket assembly 11, and the additional sprocket 14 can correspond to top gear of the bicycle sprocket assembly 11.

As seen in FIG. 6, the bicycle sprocket 12 comprises at least one shifting facilitation area FA1 configured to facilitate a shifting operation of the bicycle chain C. In this embodiment, the at least one shifting facilitation area FA1 is configured to facilitate a first shifting operation in which the bicycle chain C is shifted from the additional sprocket 14 adjacent to the bicycle sprocket 12 in the axial direction D2 without another sprocket between the bicycle sprocket 12 and the additional sprocket 14 toward the bicycle sprocket 12. The at least one shifting facilitation area FA1 is configured to facilitate a second shifting operation in which the bicycle chain C is shifted from the bicycle sprocket 12 toward the additional sprocket 14 adjacent to the bicycle sprocket 12 in the axial direction D2 without another sprocket between the bicycle sprocket 12 and the additional sprocket 14.

In this embodiment, the at least one shifting facilitation area FA1 includes shifting facilitation area FA1 to facilitate the shifting operation of the bicycle chain C. Specifically, the shifting facilitation area FA1 facilitates the shifting operation of the bicycle chain C. However, a total number of the shifting facilitation areas FA1 is not limited to this embodiment.

The shifting facilitation area FA1 is a circumferential area defined by elements configured to facilitate at least one of the first shifting operation and the second shifting operation. In this embodiment, the shifting facilitation area FA1 includes a first shifting facilitation area FA11 to facilitate the first shifting operation and a second shifting facilitation area FA12 to facilitate the second shifting operation. The second shifting facilitation area FA12 overlaps with the first shifting facilitation area FA11 and is partly disposed on an upstream side of the first shifting facilitation area FA11 in the driving rotational direction D11. However, a positional relationship between the first shifting facilitation area FA11 and the second shifting facilitation area FA12 is not limited to this embodiment.

As seen in FIG. 6, the bicycle sprocket 12 comprises at least one driving facilitation area FA2. In this embodiment, the at least one driving facilitation area FA2 includes driving facilitation areas FA2. The driving facilitation area FA2 is provided outside the shifting facilitation area FA1 and is provided between the shifting facilitation areas FA1 in the circumferential direction D1. However, a total number of the driving facilitation areas FA2 is not limited to this embodiment.

Figure 13:
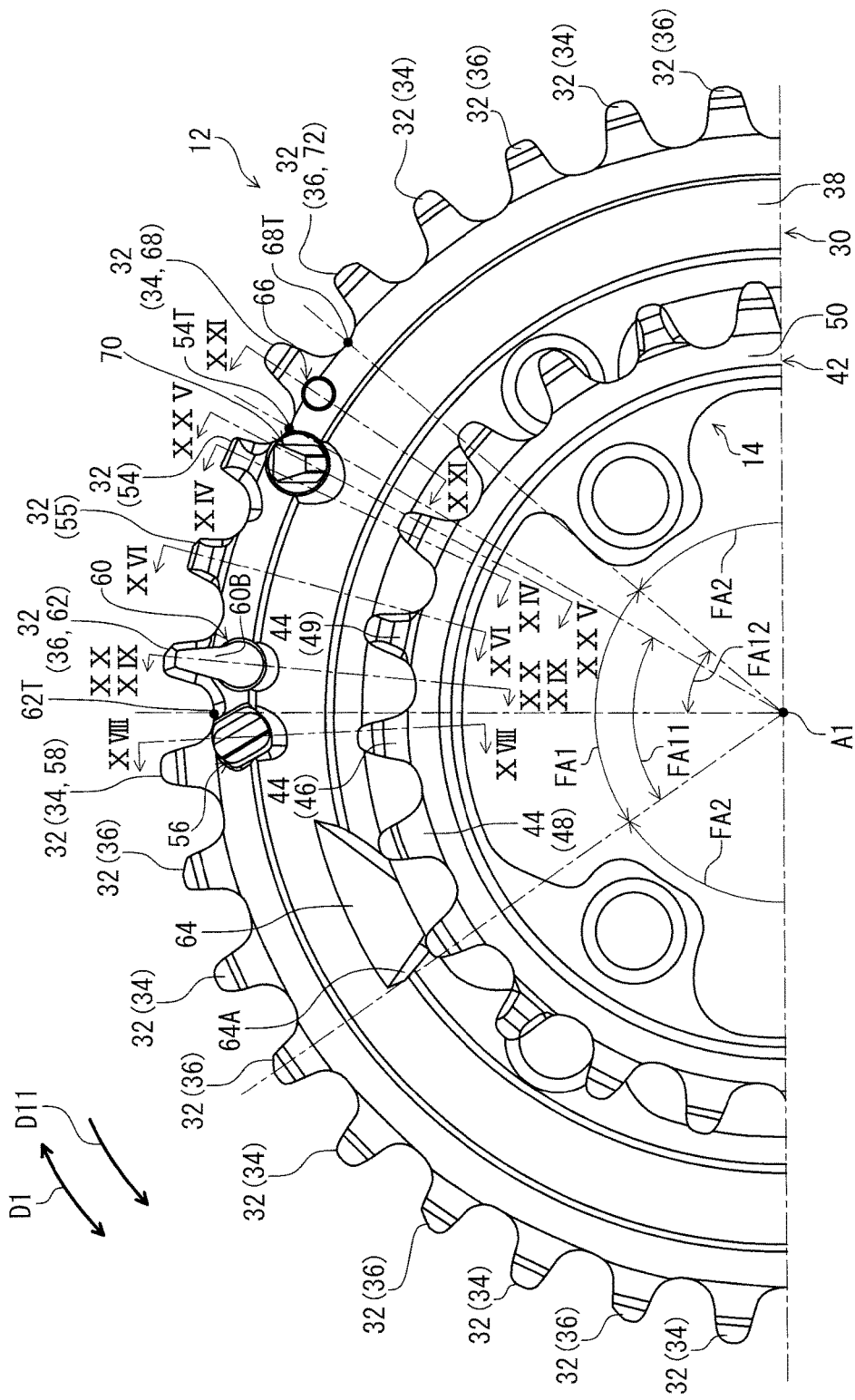
FIG. 13 is a partial side elevational view of the bicycle sprocket assembly illustrated in FIG. 4.
Figure 14:
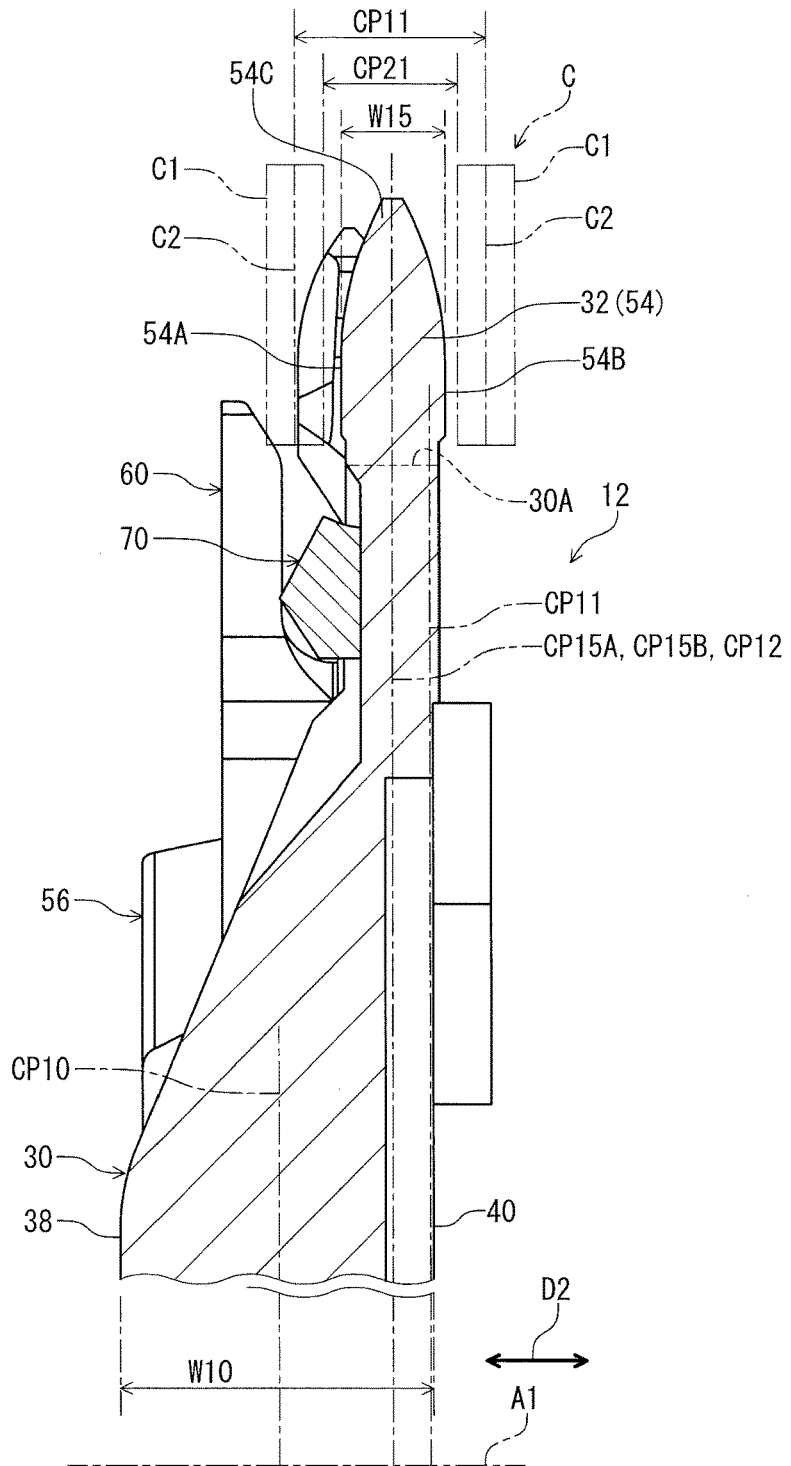
FIG. 14 is a cross-sectional view of the bicycle sprocket taken along line XIV-XIV of FIG. 13.

As seen in FIGS. 13 and 14, the sprocket teeth 32 include a derailing tooth 54 provided on the outer periphery 30A of the sprocket body 30 to first derail the bicycle chain C from the bicycle sprocket 12 in the shifting operation. The derailing tooth 54 first derails the bicycle chain C (e.g., the inner link plates C2) from the bicycle sprocket 12 in the second shifting operation. In this embodiment, as seen in FIG. 6, the sprocket teeth 32 include derailing teeth 54 respectively provided in the shifting facilitation areas FA1 (the second shifting facilitation areas FA12) to first derail the bicycle chain C from the bicycle sprocket 12 in the second shifting operation. Preferably, each of the second shifting facilitation areas FA12 has only one derailing teeth 54. However, a total number of the derailing teeth 54 is not limited to this embodiment.

As seen in FIG. 14, the derailing tooth 54 has a derailing maximum axial width W15 defined in the axial direction D2. In this embodiment, the derailing tooth 54 includes a chain-engagement surface 54A and an additional chain-engagement surface 54B. The chain-engagement surface 54A faces in the axial direction D2 and is contactable with the bicycle chain C (e.g., the inner link plate C2). The additional chain-engagement surface 54B faces in the axial direction D2 and is provided on a reverse side of the chain-engagement surface 54A in the axial direction D2. The additional chain-engagement surface 54B is contactable with the bicycle chain C (e.g., the inner link plate C2). The derailing maximum axial width W15 is defined between the chain-engagement surface 54A and the additional chain-engagement surface 54B in the axial direction D2.

The derailing tooth 54 includes a derailing tooth center plane CP15A defined to bisect the derailing maximum axial width W15. The derailing tooth center plane CP15A is perpendicular to the rotational center axis A1. The derailing tooth center plane CP15A is offset from the first tooth center plane CP11 in the axial direction D2. The derailing tooth center plane CP15A coincides with the second tooth center plane CP12 in the axial direction D2. However, the derailing tooth center plane CP15A can coincide with the first tooth center plane CP11 in the axial direction D2. The derailing tooth center plane CP15A can be offset from the second tooth center plane CP12 in the axial direction D2. Specifically, the derailing tooth center plane CP15A can be disposed between the second tooth center plane CP12 and the first tooth center plane CP11. Further, the derailing tooth center plane CP15A can be offset from the second tooth center plane CP12 toward the additional sprocket 14.

Figure 15:
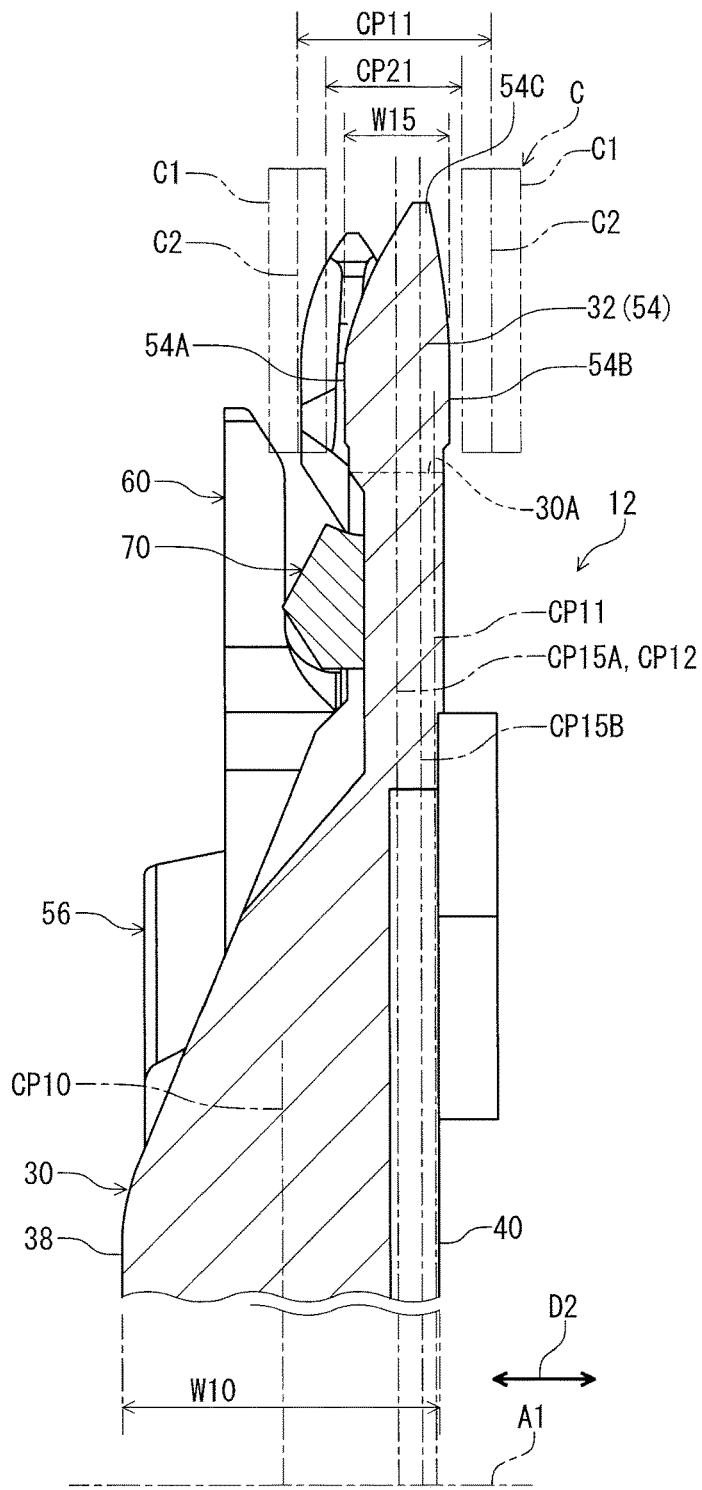
FIG. 15 is a cross-sectional view of a modification of the bicycle sprocket illustrated in FIG. 13.

The derailing tooth 54 includes a derailing tooth-tip 54C having a derailing-tip center plane CP15B perpendicular to the rotational center axis A1. The derailing-tip center plane CP15B coincides with the derailing tooth center plane CP15A in the axial direction D2. As seen in FIG. 15 that illustrates a modified example of the bicycle sprocket 12, however, the derailing-tip center plane CP15B can be offset from the derailing tooth center plane CP15A toward the first tooth center plane CP11 in the axial direction D2. Preferably, the derailing-tip center plane CP15B can be farther from the additional sprocket 14 than the derailing tooth center plane CP15A in the axial direction for easy derailing of the bicycle chain C during the second shifting operation. As seen in FIG. 14, the derailing tooth 54 has a symmetrical shape with respect to the derailing tooth center plane CP15A in the axial direction D2. However, the derailing tooth 54 can have an asymmetrical shape with respect to the derailing tooth center plane CP15A in the axial direction D2 as seen in FIG. 15 for example.

In this embodiment, the derailing maximum axial width W15 is equal to the second maximum axial width W12. The second maximum axial width W12 and the derailing maximum axial width W15 are smaller than the inner link space C21. However, the derailing maximum axial width W15 can be different from the second maximum axial width W12.

Figure 16:
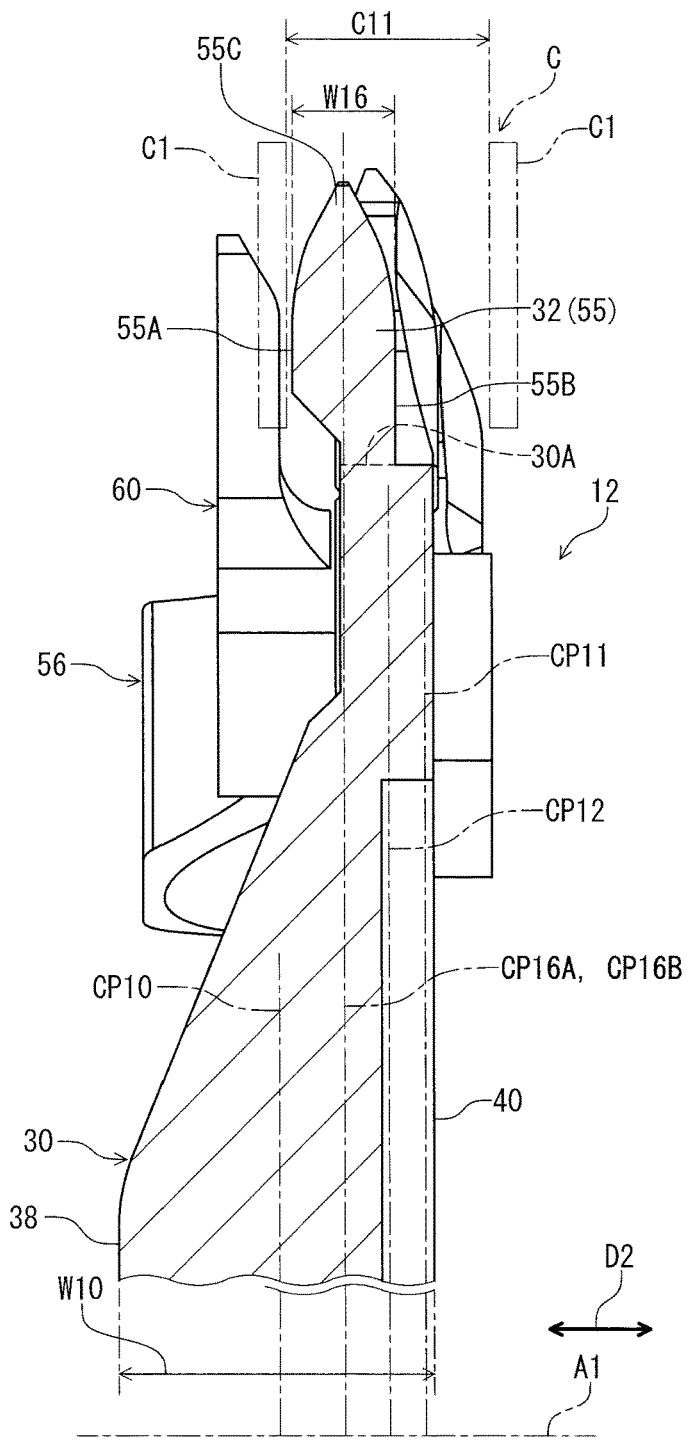
FIG. 16 is a cross-sectional view of the additional sprocket taken along line XVI-XVI of FIG. 13.

As seen in FIGS. 13 and 16, the sprocket teeth 32 include a receiving tooth 55 provided on the outer periphery 30A of the sprocket body 30 to engage with the opposed pair of outer link plates C1 of the bicycle chain C. As seen in FIG. 13, the receiving tooth 55 is provided in the shifting facilitation area FA1 (the first shifting facilitation area FA11) to first receive the bicycle chain C (e.g., the outer link plates C1) in the first shifting operation. The receiving tooth 55 first receives the opposed pair of outer link plates C1 of the bicycle chain C in the first shifting operation. The receiving tooth 55 is provided on a downstream side of the derailing tooth 54 in the driving rotational direction D11 without another tooth between the receiving tooth 55 and the derailing tooth 54. In other words, the receiving tooth 55 is disposed next to the derailing tooth 54 in the driving rotational direction. In this embodiment, as seen in FIG. 6, the at least one receiving tooth 55 includes receiving teeth 55 respectively provided in the shifting facilitation areas FA1 (the first shifting facilitation areas FA11) to first receive the bicycle chain C in the first shifting operation. Preferably, each of the first shifting facilitation areas FA11 has only one receiving teeth 55. However, a total number of the receiving teeth 55 is not limited to this embodiment.

As seen in FIG. 13, the derailing tooth 54 is provided on an upstream side of the receiving tooth 55 in the driving rotational direction D11 in which the bicycle sprocket 12 is rotated about the rotational center axis A1 during pedaling The derailing tooth 54 is adjacent to the receiving tooth 55 without another tooth between the derailing tooth 54 and the receiving tooth 55 in the driving rotational direction D11. However, another tooth can be provided between the derailing tooth 54 and the receiving tooth 55 in the circumferential direction D1.

As seen in FIG. 16, the receiving tooth 55 has a receiving maximum axial width W16 defined in the axial direction D2. The receiving tooth 55 has a receiving maximum axial width W16 defined in the axial direction D2. In this embodiment, the receiving tooth 55 includes a chain-engagement surface 55A and a reverse surface 55B. The chain-engagement surface 55A faces in the axial direction D2 and is contactable with the bicycle chain C (e.g., the outer link plate C1). The reverse surface 55B faces in the axial direction D2 and is provided on a reverse side of the chain-engagement surface 55A in the axial direction D2. The receiving maximum axial width W16 is defined between the chain-engagement surface 55A and the reverse surface 55B in the axial direction D2.

Figure 17:
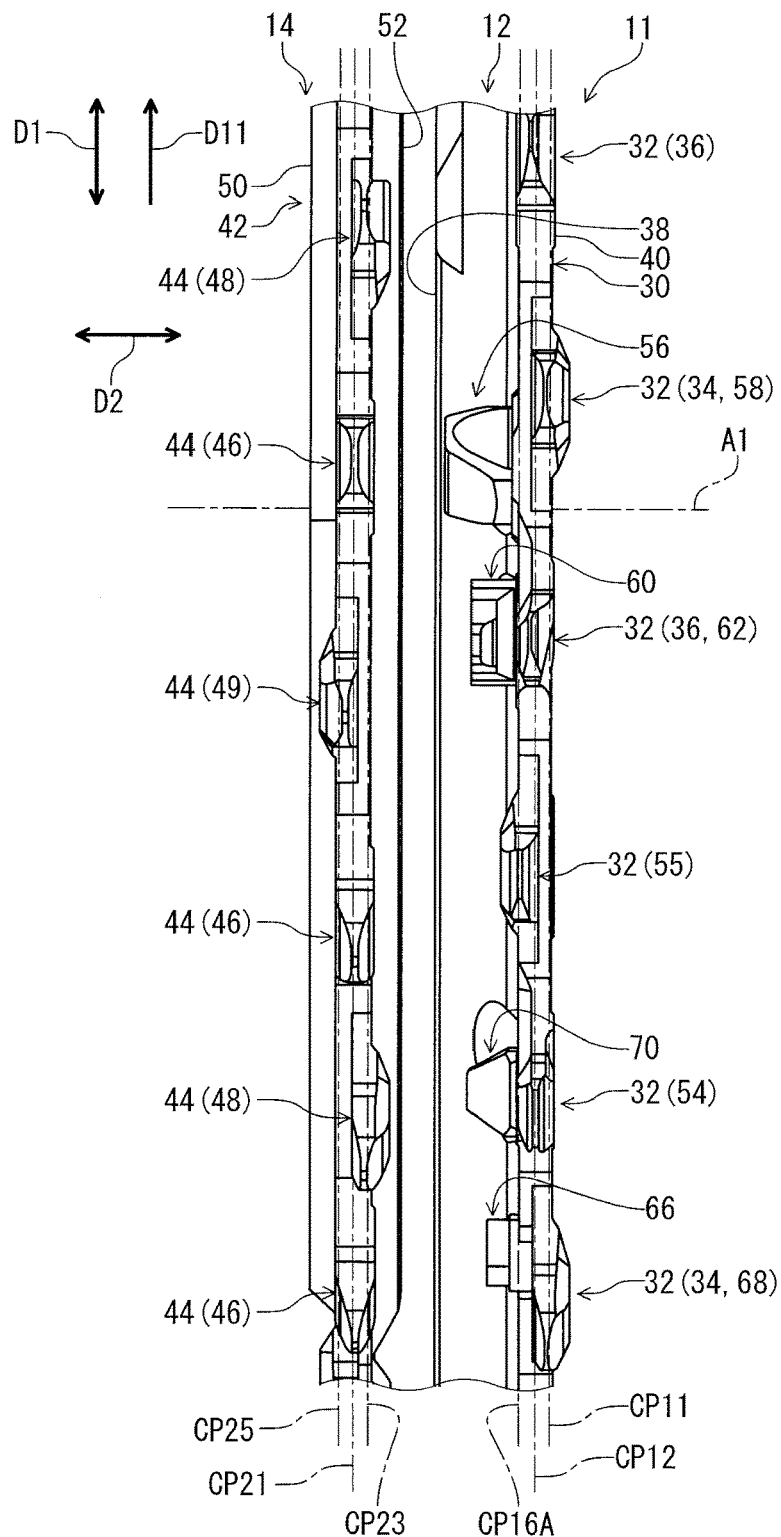
FIG. 17 is a plan view of the bicycle sprocket assembly illustrated in FIG. 4.

The receiving tooth 55 includes a receiving tooth center plane CP16A defined to bisect the receiving maximum axial width W16. The receiving tooth center plane CP16A is perpendicular to the rotational center axis A1. In this embodiment, as seen in FIGS. 16 and 17, the receiving tooth center plane CP16A is offset from the second tooth center plane CP12 away from the first tooth center plane CP11 in the axial direction D2. Preferably, the receiving tooth center plane CP16A is closer to the additional sprocket 14 adjacent to the bicycle sprocket 12 in the axial direction D2 without another sprocket between the bicycle sprocket 12 and the additional sprocket 14 than the second tooth center plane CP12, for easy receiving of the bicycle chain C during the first shifting operation. Furthermore, since the receiving tooth center plane CP16A is offset from the second tooth center plane CP12 toward the additional sprocket 14, it facilitates the bicycle chain to be derailed from the derailing tooth 54 disposed upstream side of the receiving tooth 55 during the second shifting operation. The second tooth center plane CP12 is provided between the first tooth center plane CP11 and the derailing tooth center plane CP16A in the axial direction D2. However, the receiving tooth center plane CP16A can coincide with one of the first tooth center plane CP11 and the second tooth center plane CP12 in the axial direction D2. The receiving tooth center plane CP16A can be offset from the second tooth center plane CP12 to the same side as the first tooth center plane CP11 with respect to the second tooth center plane CP12 in the axial direction D2.

As seen in FIG. 16, the receiving tooth 55 includes a receiving tooth-tip 55C having a receiving-tip center plane CP16B. The receiving-tip center plane CP16B is perpendicular to the rotational center axis A1. The receiving-tip center plane CP16B coincides with the receiving tooth center plane CP16A in the axial direction D2. However, the receiving-tip center plane CP16B can be offset from the receiving tooth center plane CP16A in the axial direction D2. Preferably, the receiving-tip center plane CP16B can be offset from the receiving tooth center plane CP16A toward the additional sprocket 14 in the axial direction D2. The receiving tooth 55 has an asymmetrical shape with respect to the receiving tooth center plane CP16A in the axial direction D2. However, the receiving tooth 55 can have a symmetrical shape with respect to the receiving tooth center plane CP16A in the axial direction D2.

As seen in FIG. 13, the bicycle sprocket 12 further comprises a first shifting facilitation projection 56 provided in the at least one shifting facilitation area FA1 to facilitate the shifting operation. In this embodiment, as seen in FIG. 6, the bicycle sprocket 12 comprises first shifting facilitation projections 56 respectively provided in the shifting facilitation areas FA1 to facilitate the shifting operation. However, a total number of the first shifting facilitation projections 56 is not limited to this embodiment. The first shifting facilitation projection 56 can also be referred to as a shifting facilitation projection 56.

In this embodiment, as seen in FIG. 13, the first shifting facilitation projection 56 is provided in the shifting facilitation area FA1 (the first shifting facilitation area FA11) to facilitate the first shifting operation. The first shifting facilitation projection 56 is configured to engage with the bicycle chain C in the first shifting operation. The first shifting facilitation projection 56 is provided on a downstream side of the derailing tooth 54 and the receiving tooth 55 in the driving rotational direction D11.

The first shifting facilitation projection 56 is at least partly provided closer to the rotational center axis A1 than the first teeth 34. One of the first teeth 34 is at least partly provided closest to the first shifting facilitation projection 56 among the first teeth 34. In this embodiment, the first teeth 34 include a first adjacent tooth 58 closest to the first shifting facilitation projection 56 among the first teeth 34.

Figure 18:
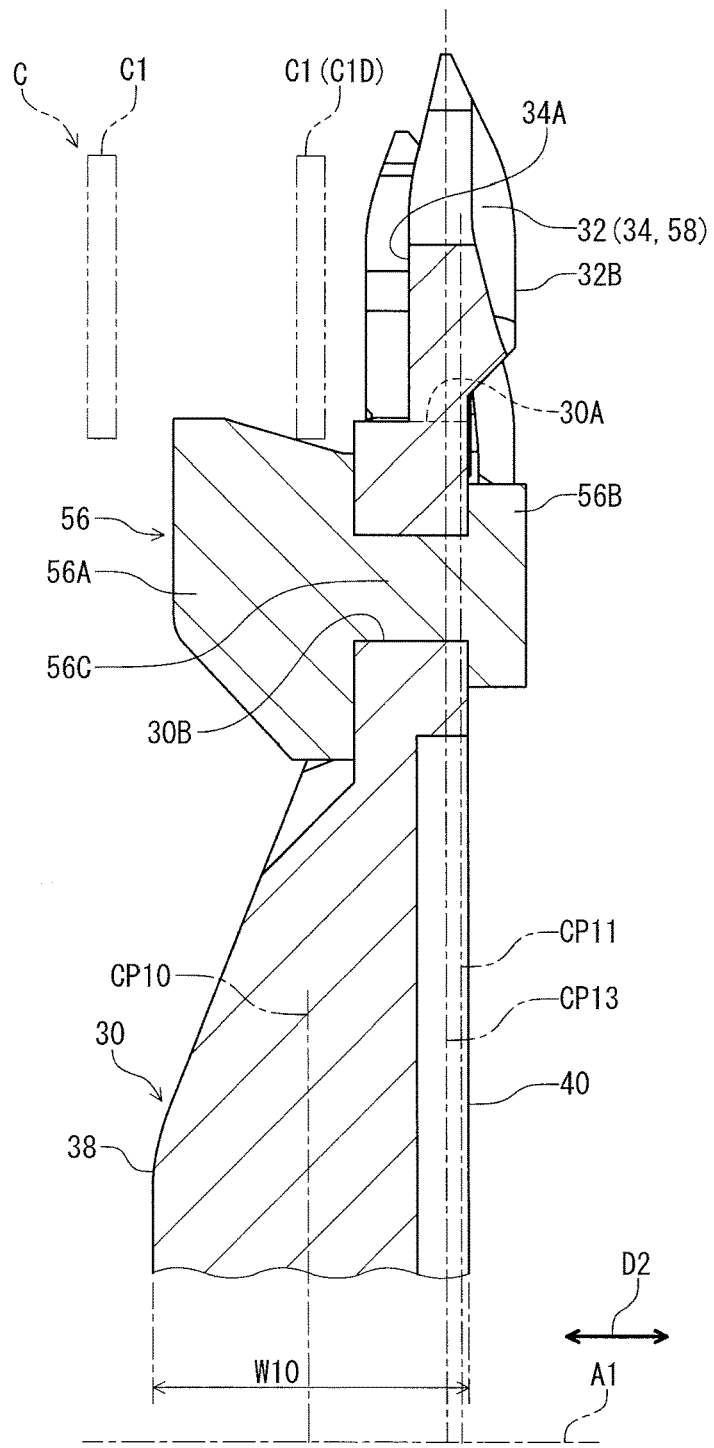
FIG. 18 is a cross-sectional view of the additional sprocket taken along line XVIII-XVIII of FIG. 13.

As seen in FIG. 18, the first shifting facilitation projection 56 projects from the first axial surface 38 in the axial direction D2 to contact the bicycle chain C (e.g., the outer link plate C1) in the first shifting operation. The first shifting facilitation projection 56 is coupled to the sprocket body 30 to contact the bicycle chain C (e.g., the outer link plate C1) in the first shifting operation (e.g., an upshifting operation). In the first shifting operation, the bicycle chain C moved by the front derailleur is engaged with the first shifting facilitation projection 56 to be lifted on the first shifting facilitation projection 56. The first shifting facilitation projection 56 is a separate member from the sprocket body 30 and is secured to the sprocket body 30. However, the first shifting facilitation projection 56 can be integrally provided with the sprocket body 30 as a one-piece unitary member.

In this embodiment, the first shifting facilitation projection 56 includes a contact part 56A, a securing part 56B, and an intermediate part 56C. The contact part 56A is provided on the first axial surface 38 to contact the outer link plate C1. The contact part 56A is provided at one end of the intermediate part 56C. The securing part 56B is provided on the first reverse axial surface 40. The securing part 56B is provided at the other end of the intermediate part 56C. The intermediate part 56C extends through a hole 30B of the sprocket body 30. The contact part 56A has an outer diameter larger than an outer diameter of the intermediate part 56C. The securing part 56B has an outer diameter larger than the outer diameter of the intermediate part 56C. The contact part 56A, the securing part 56B, and the intermediate part 56C provide a rivet. However, the structure of the first shifting facilitation projection 56 is not limited to this embodiment.

As seen in FIG. 13, the bicycle sprocket 12 further comprises an additional shifting facilitation projection 60 provided in the at least one shifting facilitation area FA1 to facilitate the shifting operation. In this embodiment, as seen in FIG. 6, the bicycle sprocket 12 comprises additional shifting facilitation projections 60 respectively provided in the shifting facilitation areas FA1 to facilitate the shifting operation. However, a total number of the additional shifting facilitation projections 60 is not limited to this embodiment.

In this embodiment, as seen in FIG. 13, the additional shifting facilitation projection 60 is provided in the shifting facilitation area FA1 (the first shifting facilitation area FA11) to facilitate the first shifting operation. The additional shifting facilitation projection 60 is configured to engage with the bicycle chain C in the first shifting operation. The additional shifting facilitation projection 60 is provided on an upstream side of the first shifting facilitation projection 56 in the driving rotational direction D11.

The additional shifting facilitation projection 60 is at least partly provided closer to the rotational center axis A1 than the second teeth 36. One of the second teeth 36 is at least partly provided closest to the additional shifting facilitation projection 60 among the second teeth 36. In this embodiment, the second tooth 36 includes a second adjacent tooth 62 closest to the additional shifting facilitation projection 60 among the second tooth 36. The second adjacent tooth 62 is provided on an upstream side of the first adjacent tooth 58 without another tooth between the second adjacent tooth 62 and the first adjacent tooth 58 in the driving rotational direction D11. However, another tooth can be provided between the additional shifting facilitation projection 60 and the first adjacent tooth 58 in the circumferential direction D1.

Figure 19:
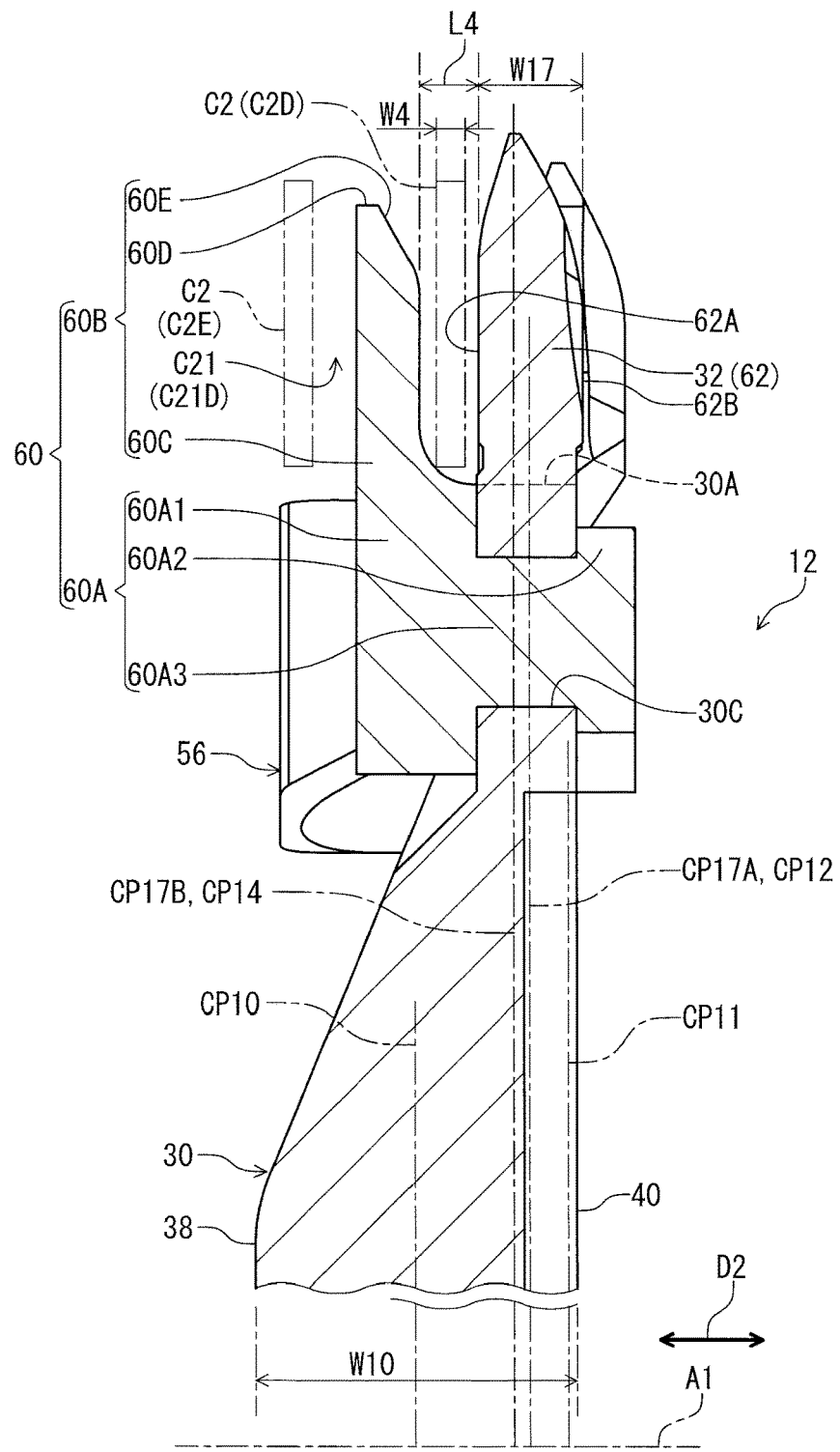
FIG. 19 is a cross-sectional view of the additional sprocket taken along line XIX-XIX of FIG. 13 (first shifting operation).

As seen in FIG. 19, the additional shifting facilitation projection 60 projects from the first axial surface 38 in the axial direction D2 to contact the bicycle chain C (e.g., the inner link plate C2) in the first shifting operation. In the first shifting operation, the bicycle chain C moved by the front derailleur is engaged with the additional shifting facilitation projection 60 to be lifted on the additional shifting facilitation projection 60 after being lifted on the first shifting facilitation projection 56. The additional shifting facilitation projection 60 is a separate member from the sprocket body 30 and is secured to the sprocket body 30. However, the additional shifting facilitation projection 60 can be integrally provided with the sprocket body 30 as a one-piece unitary member.

In this embodiment, the additional shifting facilitation projection 60 is coupled to the sprocket body 30 to contact the inner link plate C2 of the bicycle chain C in the first shifting operation. The additional shifting facilitation projection 60 is partly inserted in the inner link space C21 of the opposed pair of inner link plates C2 in the first shifting operation.

As seen in FIG. 19, the additional shifting facilitation projection 60 includes a coupling body 60A and a protruding part 60B. The coupling body 60A is coupled to the sprocket body 30. The protruding part 60B extends radially outward from the coupling body 60A with respect to the rotational center axis A1. The protruding part 60B is spaced apart from the sprocket body 30 in the axial direction D2 parallel to the rotational center axis A1. In this embodiment, the protruding part 60B is spaced apart from the second tooth 36 (the second adjacent tooth 62) in the axial direction D2. The protruding part 60B is contactable with the bicycle chain C in the first shifting operation.

The coupling body 60A includes a base body 60A1, a securing part 60A2, and an intermediate part 60A3. The base body 60A1 is disposed on the first axial surface 38. The protruding part 60B extends radially outward from the base body 60A1 with respect to the rotational center axis A1. The base body 60A1 is contactable with the inner link plate C2 of the bicycle chain C. The securing part 60A2 is disposed on the first reverse axial surface 40. The intermediate part 60A3 connects the securing part 60A2 to the base body 60A1 and extends through a hole 30C of the sprocket body 30. The base body 60A1 has an outer diameter larger than an outer diameter of the intermediate part 60A3. The securing part 60A2 has an outer diameter larger than the outer diameter of the intermediate part 60A3. The base body 60A1, the securing part 60A2, and the intermediate part 60A3 provide a rivet. However, the structure of the additional shifting facilitation projection 60 is not limited to this embodiment.

As seen in FIG. 19, the additional shifting facilitation projection 60 is disposed to keep a clearance at least one of between the protruding part 60B and the inner link plate C2 in the axial direction D2 and between the second adjacent tooth 62 and the inner link plate C2 in the axial direction D2 during pedaling. A maximum axial distance L4 defined between the protruding part 60B and the second adjacent tooth 62 in the axial direction D2 is larger than an axial width W4 of the inner link plate C2.

The maximum axial distance L4 is in a range of 0.5 mm to 4.0 mm. The maximum axial distance L4 is preferably equal to or larger than 1.0 mm. The maximum axial distance L4 is preferably equal to or smaller than 3.8 mm. The maximum axial distance L4 is preferably in a range of 1.0 mm to 2.0 mm. However, the maximum axial distance L4 can be in a range different from the above ranges.

As seen in FIG. 19, the protruding part 60B includes a radially inner part 60C, a radially outer tip 60D, and an inclined surface 60E. The radially inner part 60C is coupled to the coupling body 60A. The radially outer tip 60D is provided radially outward of the radially inner part 60C with respect to the rotational center axis A1. The inclined surface 60E faces the sprocket body 30 in the axial direction D2. The inclined surface 60E is inclined to gradually approach the sprocket body 30 in the axial direction D2 from the radially outer tip 60D toward the radially inner part 60C. The inclined surface 60E guides the inner link plate C2 of the bicycle chain C toward the second adjacent tooth 62 in the axial direction D2 when the additional shifting facilitation projection 60 comes into engagement with the bicycle chain C.

As seen in FIG. 13, the protruding part 60B is disposed to at least partly overlap with one of the sprocket teeth 32 when viewed from the axial direction D2 parallel to the rotational center axis A1. In this embodiment, the protruding part 60B is disposed to partly overlap with the second adjacent tooth 62 when viewed from the axial direction D2 parallel to the rotational center axis A1.

Figure 20:
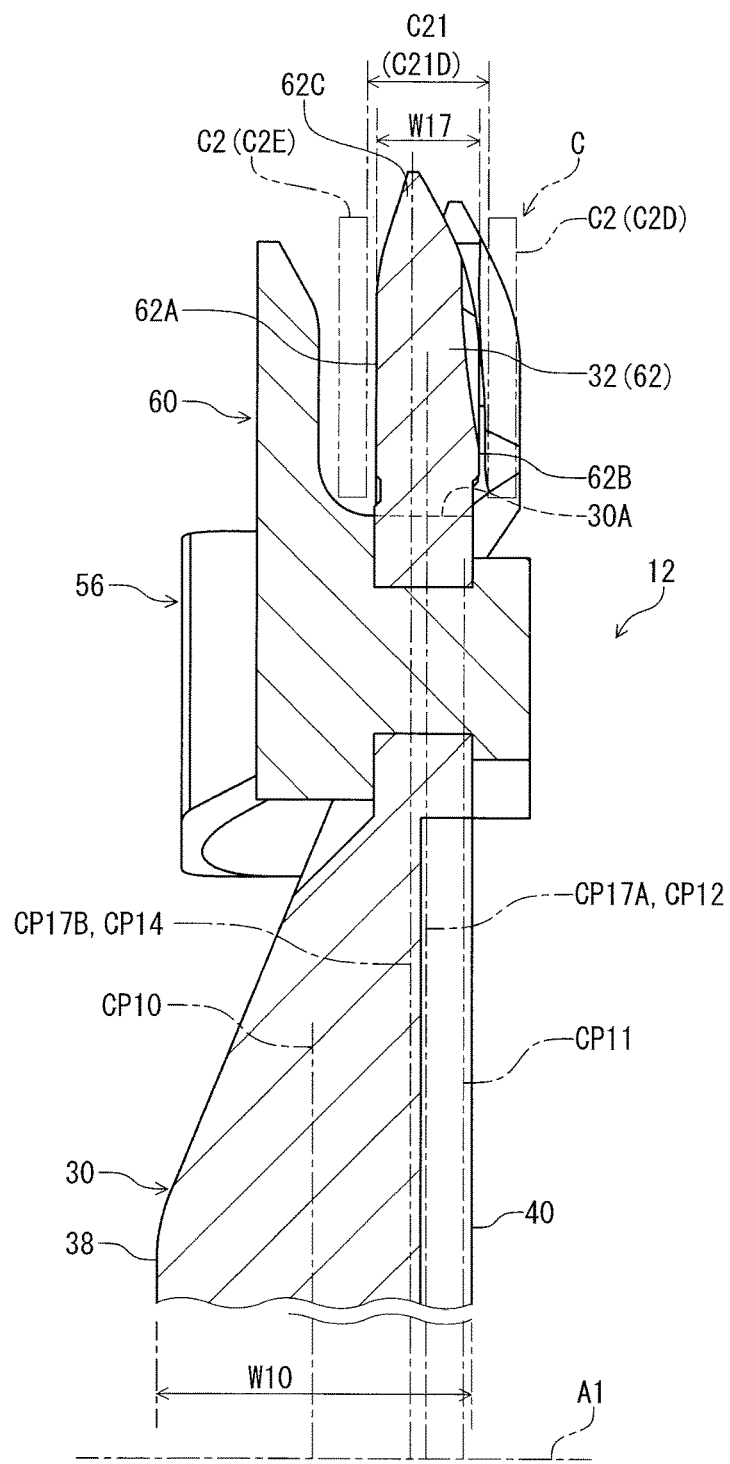
FIG. 20 is a cross-sectional view of the additional sprocket taken along line XIX-XIX of FIG. 13 (second shifting operation).

As seen in FIG. 20, the additional shifting facilitation projection 60 is disposed not to be inserted between the opposed pair of inner link plates C2 of the bicycle chain C in the second shifting operation.

The second adjacent tooth 62 has a maximum axial width W17 defined in the axial direction D2. In this embodiment, the second adjacent tooth 62 includes a chain-engagement surface 62A and an additional chain-engagement surface 62B. The chain-engagement surface 62A faces in the axial direction D2 and is contactable with the bicycle chain C (e.g., the inner link plate C2). The additional chain-engagement surface 62B faces in the axial direction D2 and is provided on a reverse side of the chain-engagement surface 62A in the axial direction D2. The additional chain-engagement surface 62B is contactable with the bicycle chain C (e.g., the inner link plate C2). The maximum axial width W17 is defined between the chain-engagement surface 62A and the additional chain-engagement surface 62B in the axial direction D2.

The second adjacent tooth 62 includes a tooth center plane CP17A defined to bisect the maximum axial width W17. The tooth center plane CP17A is perpendicular to the rotational center axis A1. The tooth center plane CP17A is offset from the first tooth center plane CP11 in the axial direction D2. However, the tooth center plane CP17A can coincide with the first tooth center plane CP11 in the axial direction D2. The tooth center plane CP17A coincides with the second tooth center plane CP12. However, the tooth center plane CP17A can be offset from the second tooth center plane CP12 in the axial direction D2.

The second adjacent tooth 62 includes a tooth-tip 62C having a tooth-tip center plane CP17. The tooth-tip center plane CP17 is perpendicular to the rotational center axis A1. The tooth-tip center plane CP17 is offset from the first tooth center plane CP11 and the tooth center plane CP17A in the axial direction D2. However, the tooth-tip center plane CP17 can coincide with at least one of the first tooth center plane CP11 and the tooth center plane CP17A in the axial direction D2. The second adjacent tooth 62 has an asymmetrical shape with respect to the tooth center plane CP17A in the axial direction D2. However, the second adjacent tooth 62 can have a symmetrical shape with respect to the tooth center plane CP17A in the axial direction D2.

In this embodiment, the maximum axial width W17 is equal to the second maximum axial width W12. The maximum axial width W17 is smaller than the inner link space C21. However, the maximum axial width W17 can be different from the second maximum axial width W12.

As seen in FIG. 13, the sprocket body 30 includes a shifting facilitation recess 64 provided in the shifting facilitation area FA1 to facilitate the first shifting operation. Specifically, the shifting facilitation recess 64 is provided on the first axial surface 38 to reduce interference between the sprocket body 30 and the bicycle chain C in the first shifting operation.

The bicycle sprocket 12 further comprises a second shifting facilitation projection 66 provided in the at least one shifting facilitation area FA1 to facilitate the second shifting operation in which the bicycle chain C is shifted from the bicycle sprocket 12 toward the additional sprocket 14 adjacent to the bicycle sprocket 12 in the axial direction D2 without another sprocket between the bicycle sprocket 12 and the additional sprocket 14. In this embodiment, as seen in FIG. 6, the bicycle sprocket 12 comprises second shifting facilitation projections 66 respectively provided in the shifting facilitation areas FA1 (the second shifting facilitation areas FA12) to facilitate the shifting operation. Preferably, each of the second shifting facilitation areas FA12 has only one second shifting facilitation projection 66. However, a total number of the second shifting facilitation projections 66 is not limited to this embodiment.

In this embodiment, as seen in FIG. 13, the second shifting facilitation projection 66 is provided in the shifting facilitation areas FA1 (the second shifting facilitation area FA12) to facilitate the second shifting operation. The second shifting facilitation projection 66 is configured to engage with the bicycle chain C in the second shifting operation. The second shifting facilitation projection 66 is provided on an upstream side of the derailing tooth 54 in the driving rotational direction D11.

The second shifting facilitation projection 66 is at least partly provided closer to the rotational center axis A1 than the first teeth 34. One of the first teeth 34 is at least partly provided closest to the second shifting facilitation projection 66 among the first teeth 34. In this embodiment, the first teeth 34 include a third adjacent tooth 68 closest to the second shifting facilitation projection 66 among the first teeth 34.

Figure 21:
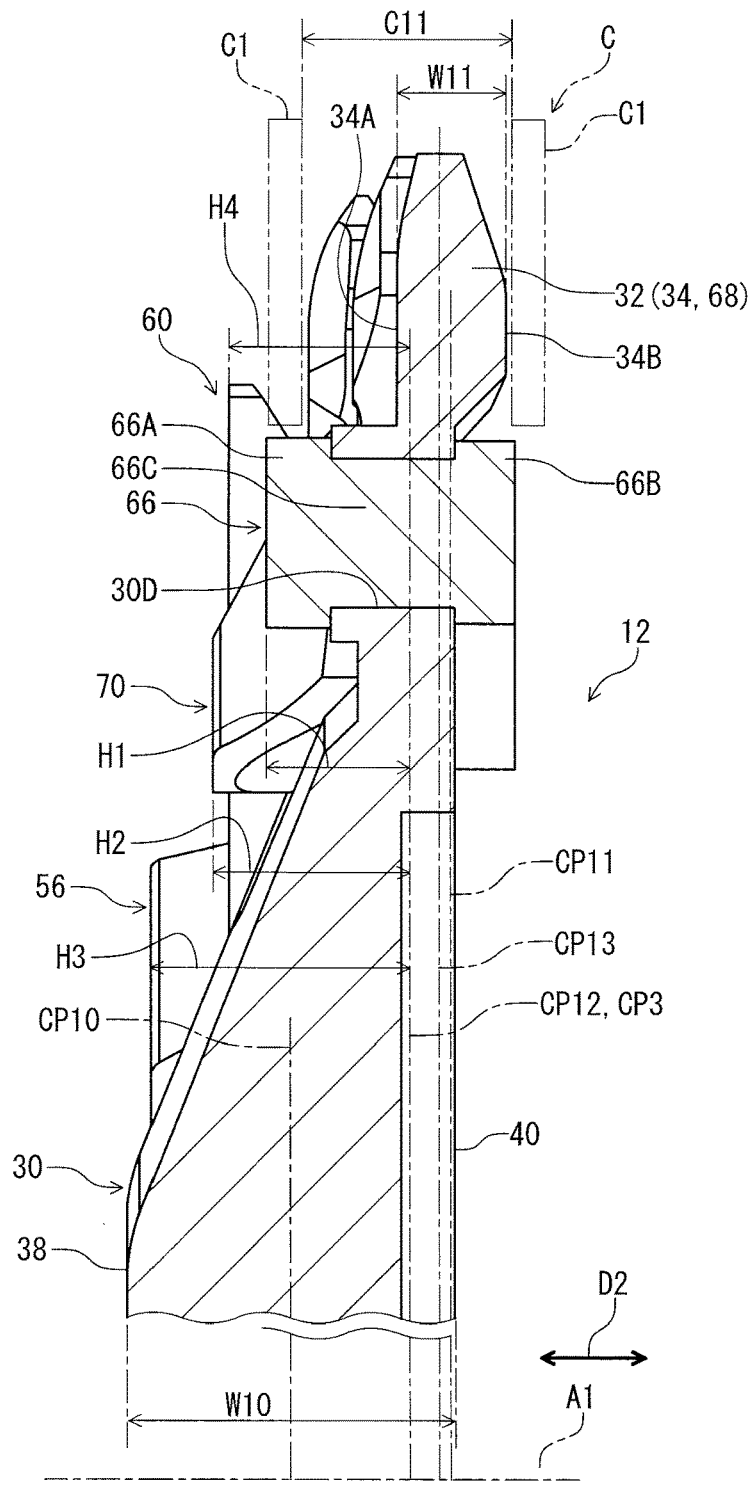
FIG. 21 is a cross-sectional view of the additional sprocket taken along line XXI-XXI of FIG. 13.

As seen in FIG. 21, the second shifting facilitation projection 66 projects from the first axial surface 38 in the axial direction D2 to contact the bicycle chain C (e.g., the outer link plate C1) in the second shifting operation. The second shifting facilitation projection 66 is coupled to the sprocket body 30 to contact the bicycle chain C (e.g., the outer link plate C1) in the second shifting operation. The second shifting facilitation projection 66 is a separate member from the sprocket body 30 and is secured to the sprocket body 30. However, the second shifting facilitation projection 66 can be integrally provided with the sprocket body 30 as a one-piece unitary member.

In this embodiment, the second shifting facilitation projection 66 includes a contact part 66A, a securing part 66B, and an intermediate part 66C. The contact part 66A is provided on the first axial surface 38 to contact the outer link plate C1. The contact part 66A is provided at one end of the intermediate part 66C. The securing part 66B is provided on the first reverse axial surface 40. The securing part 66B is provided at the other end of the intermediate part 66C. The intermediate part 66C extends through a hole 30D of the sprocket body 30. The contact part 66A has an outer diameter larger than an outer diameter of the intermediate part 66C. The securing part 66B has an outer diameter larger than the outer diameter of the intermediate part 66C. The contact part 66A, the securing part 66B, and the intermediate part 66C provide a rivet. However, the structure of the second shifting facilitation projection 66 is not limited to this embodiment.

Figure 22:
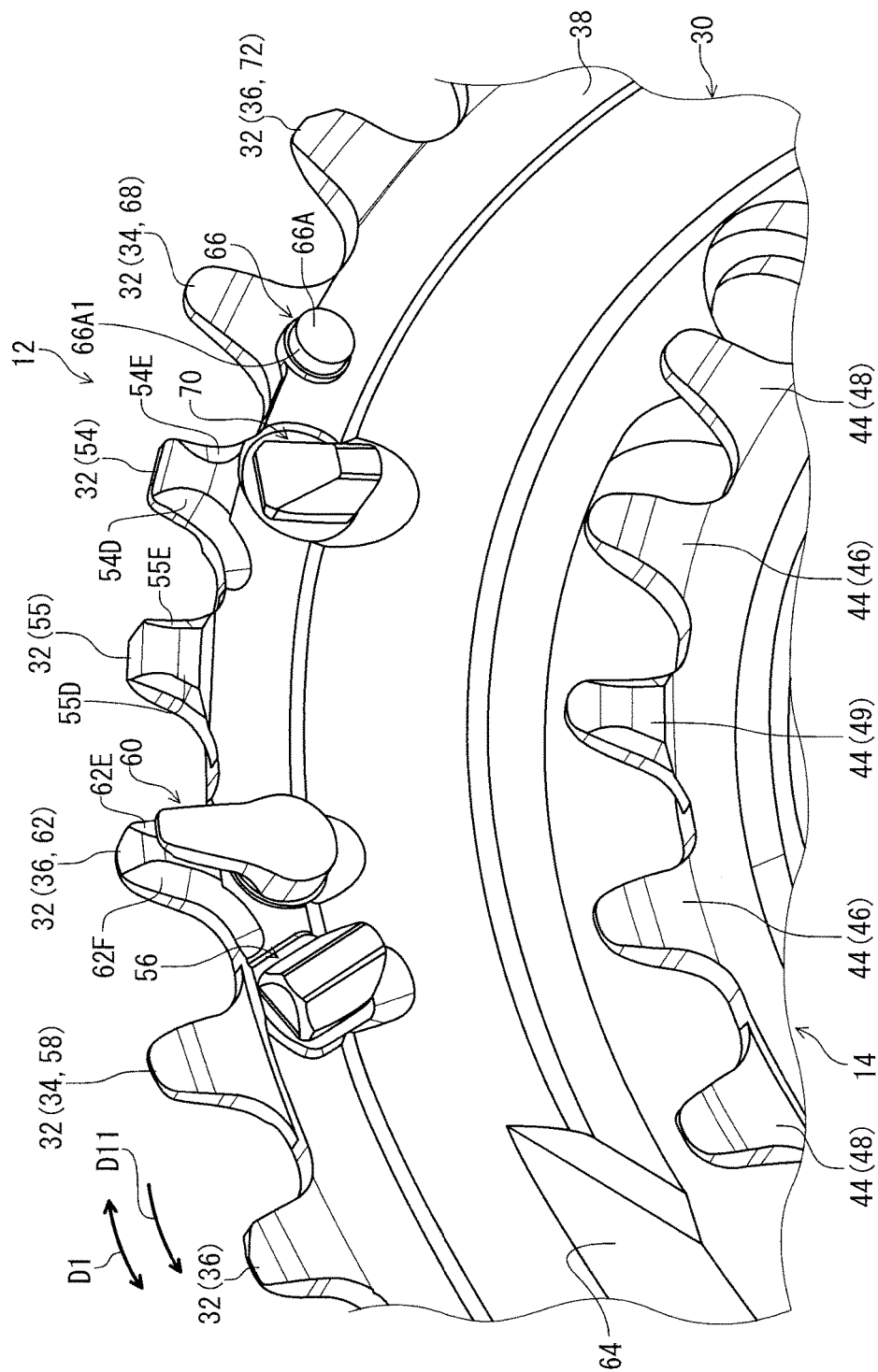
FIG. 22 is a partial perspective view of the bicycle sprocket assembly illustrated in FIG. 4.
Figure 23:
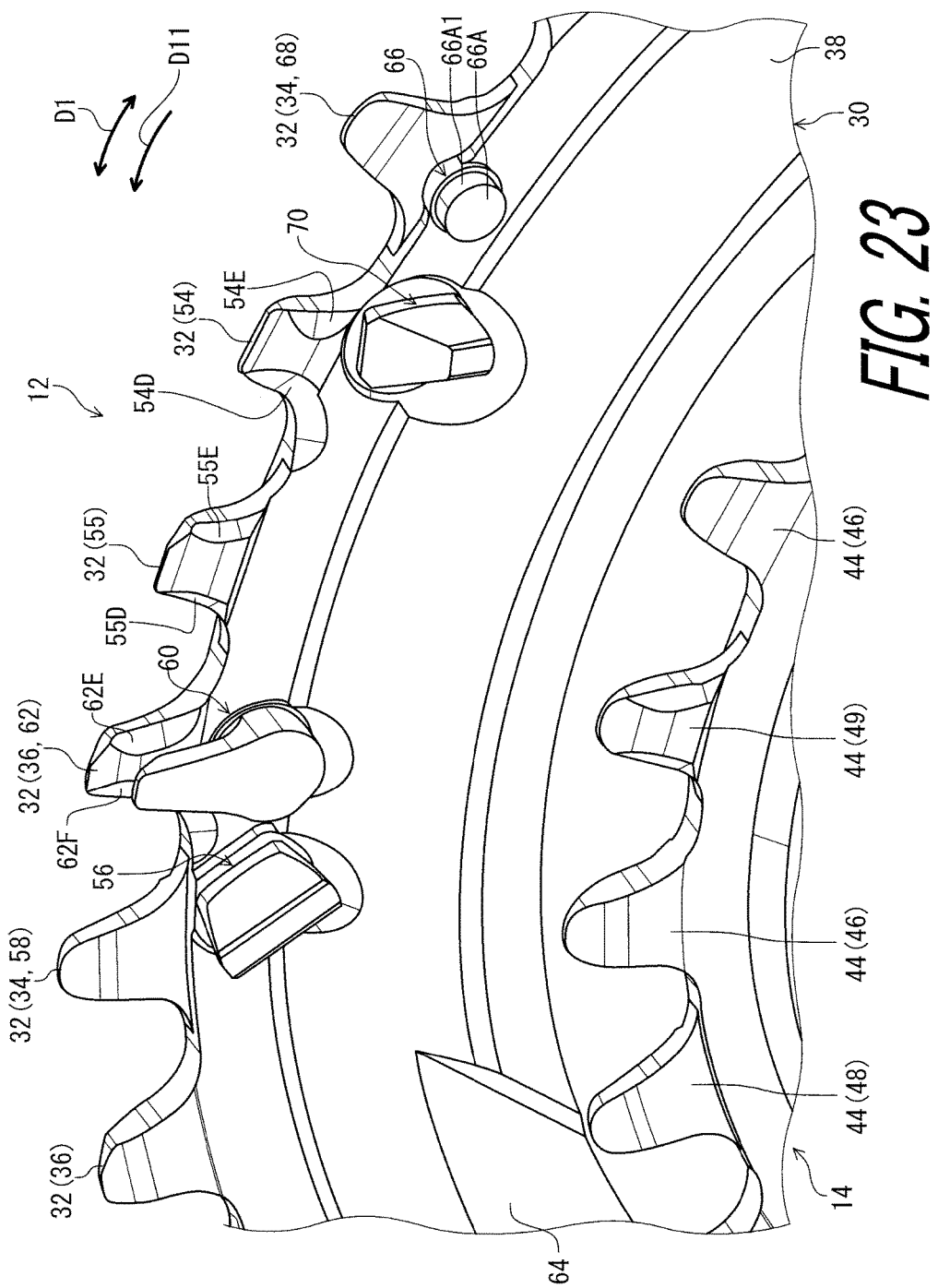
FIG. 23 is another partial perspective view of the bicycle sprocket assembly illustrated in FIG. 4.

As seen in FIGS. 22 and 23, the contact part 66A has a curved surface 66A1 to contact the outer link plate C1 in the second shifting operation. Specifically, the contact part 66A has a columnar shape. The curved surface 66A1 is defined about the contact part 66A and has a circumferential round shape. However, the shape of the contact part 66A is not limited to this embodiment.

As seen in FIG. 13, the bicycle sprocket 12 comprises a bump portion 70 provided on a downstream side of the second shifting facilitation projection 66 in the driving rotational direction D11. In this embodiment, as seen in FIG. 6, the bicycle sprocket 12 comprises bump portions 70 respectively provided on the downstream side of the second shifting facilitation projections 66 in the driving rotational direction D11. However, a total number of the bump portions 70 is not limited to this embodiment.

In this embodiment, as seen in FIG. 13, the bump portion 70 is provided in the shifting facilitation areas FA1 (the first shifting facilitation area FA11) to facilitate the first shifting operation. The bump portion 70 is configured to engage with the bicycle chain C in the first shifting operation. The bump portion 70 is provided on an upstream side of the derailing tooth 54 in the driving rotational direction D11.

The bump portion 70 is configured to restrict engagement of the second shifting facilitation projection 66 with the bicycle chain C in at least one of the first shifting operation and the second shifting operation. In this embodiment, the bump portion 70 is configured to restrict engagement of the second shifting facilitation projection 66 with the bicycle chain C in the first shifting operation. However, the bump portion 70 can be configured to restrict engagement of the second shifting facilitation projection 66 with the bicycle chain C in the second shifting operation.

The bump portion 70 is at least partly provided radially inward of the second shifting facilitation projection 66 with respect to the rotational center axis A1. In this embodiment, the bump portion 70 is partly provided radially inward of the second shifting facilitation projection 66 with respect to the rotational center axis A1. The bump portion 70 is partly provided closer to the rotational center axis A1 than the second shifting facilitation projection 66. However, a positional relationship between the second shifting facilitation projection 66 and the bump portion 70 is not limited to this embodiment.

The bump portion 70 is at least partly provided closer to the rotational center axis A1 than the sprocket teeth 32. One of the sprocket teeth 32 is at least partly provided closest to the bump portion 70 among the sprocket teeth 32. In this embodiment, the derailing tooth 54 is at least partly provided closest to the bump portion 70 among the sprocket teeth 32. However, the arrangement of the bump portion 70 is not limited to this embodiment.

As seen in FIG. 8, the sprocket teeth 32 include a reference tooth 72 having a reference tooth center plane CP3 defined to bisect the maximum axial width W12 of the reference tooth 72 in the axial direction D2. In this embodiment, the reference tooth 72 is the second tooth 36. The reference tooth center plane CP3 coincides with the second tooth center plane CP12 of the second tooth 36.

As seen in FIG. 21, the second shifting facilitation projection 66 has a first axial height H1 defined from the reference tooth center plane CP3 in the axial direction D2. The bump portion 70 has a second axial height H2 defined from the reference tooth center plane CP3 in the axial direction D2. The second axial height H2 is larger than the first axial height H1. However, the second axial height H2 can be equal to or smaller than the first axial height H1.

The first shifting facilitation projection 56 has a third axial height H3 defined from the reference tooth center plane CP3 in the axial direction D2. The third axial height H3 is larger than the first axial height H1 and the second axial height H2. However, the third axial height H3 can be equal to or smaller than at least one of the first axial height H1 and the second axial height H2.

The additional shifting facilitation projection 60 has a fourth axial height H4 defined from the reference tooth center plane CP3 in the axial direction D2. The fourth axial height 114 is smaller than the second axial height H2 and the third axial height 113 and is larger than the first axial height Hl. However, the fourth axial height H4 can be equal to or larger than at least one of the second axial height H2 and the third axial height H3. The fourth axial height H4 can be equal to or smaller than the first axial height H1.

Figure 24:
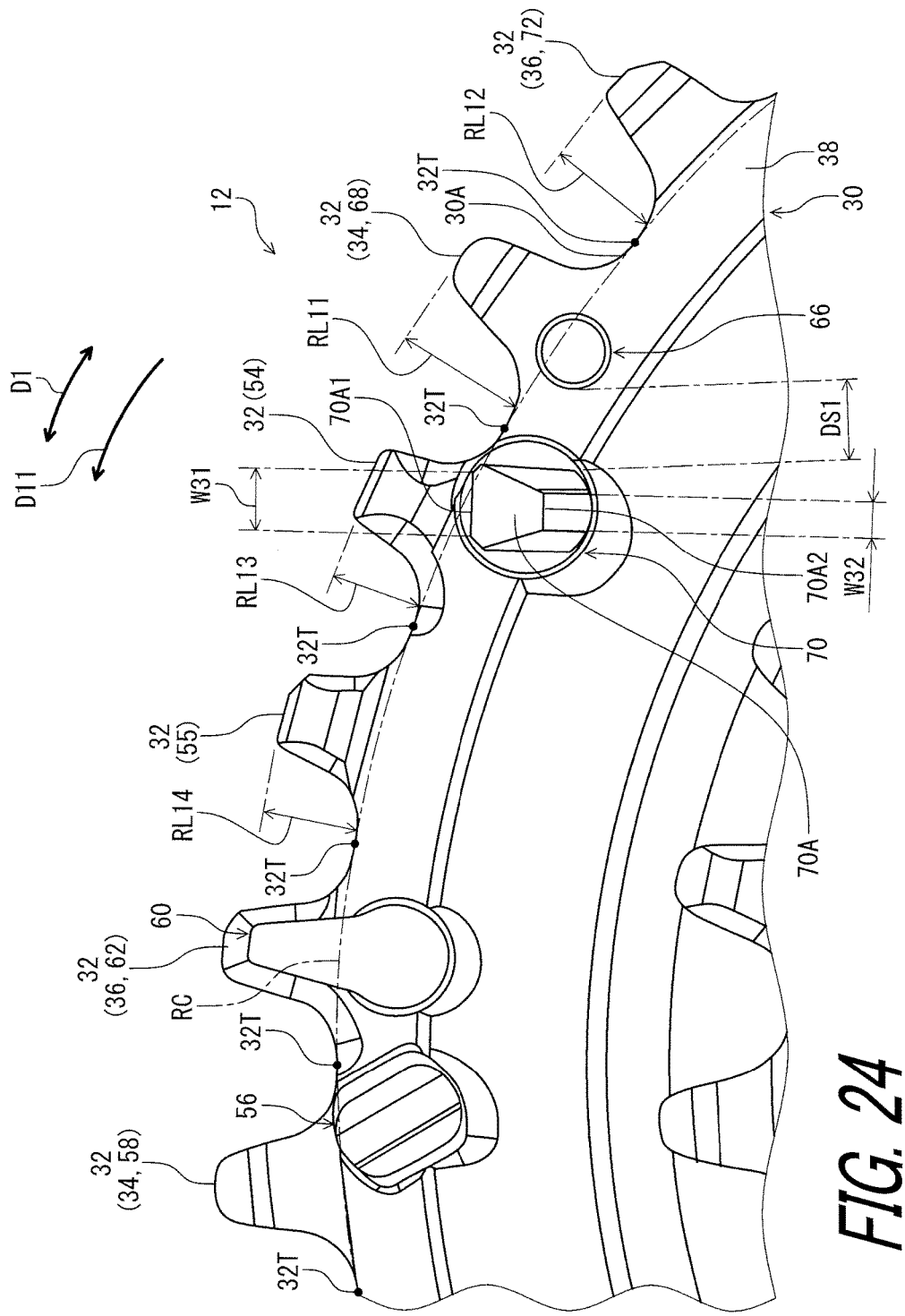
FIG. 24 is a partial side elevational view of the bicycle sprocket assembly illustrated in FIG. 4.
Figure 30:
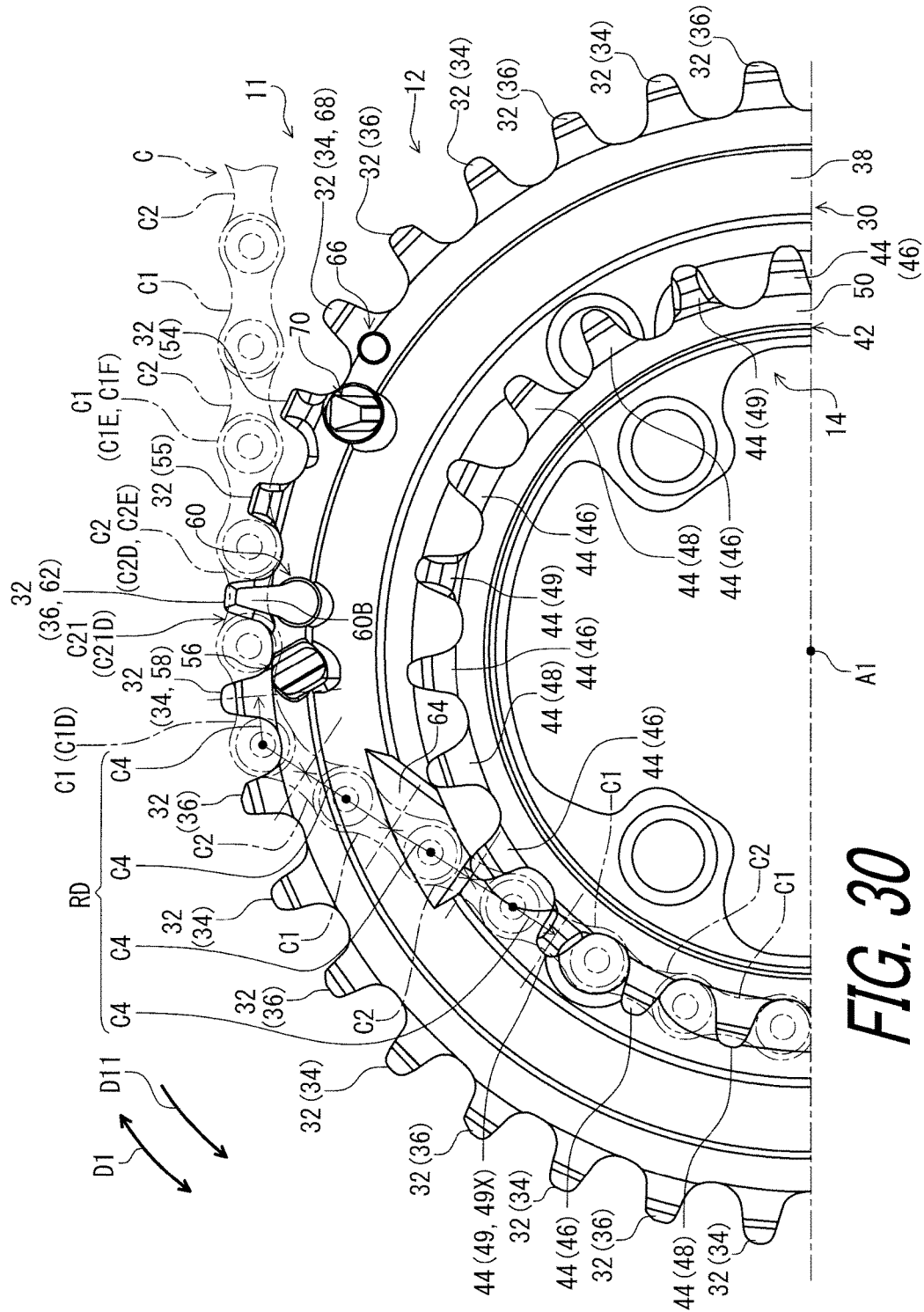
FIG. 30 is a partial side elevational view of the bicycle sprocket assembly illustrated in FIG. 4 with the bicycle chain (first shifting operation).

As seen in FIG. 24, the bump portion 70 is spaced apart from the second shifting facilitation projection 66 by a distance DS1 that is equal to or smaller than two chain pitches. The bump portion 70 is spaced apart from the second shifting facilitation projection 66 by the distance DS1 that is equal to or smaller than one chain pitch C4 (FIG. 30). In this embodiment, the bump portion 70 is spaced apart from the second shifting facilitation projection 66 by the distance DS1 that is substantially equal to one chain pitch C4. The chain pitch C4 is a linear distance defined between neighboring pins C3 (FIG. 30) of the bicycle chain C.

Figure 25:
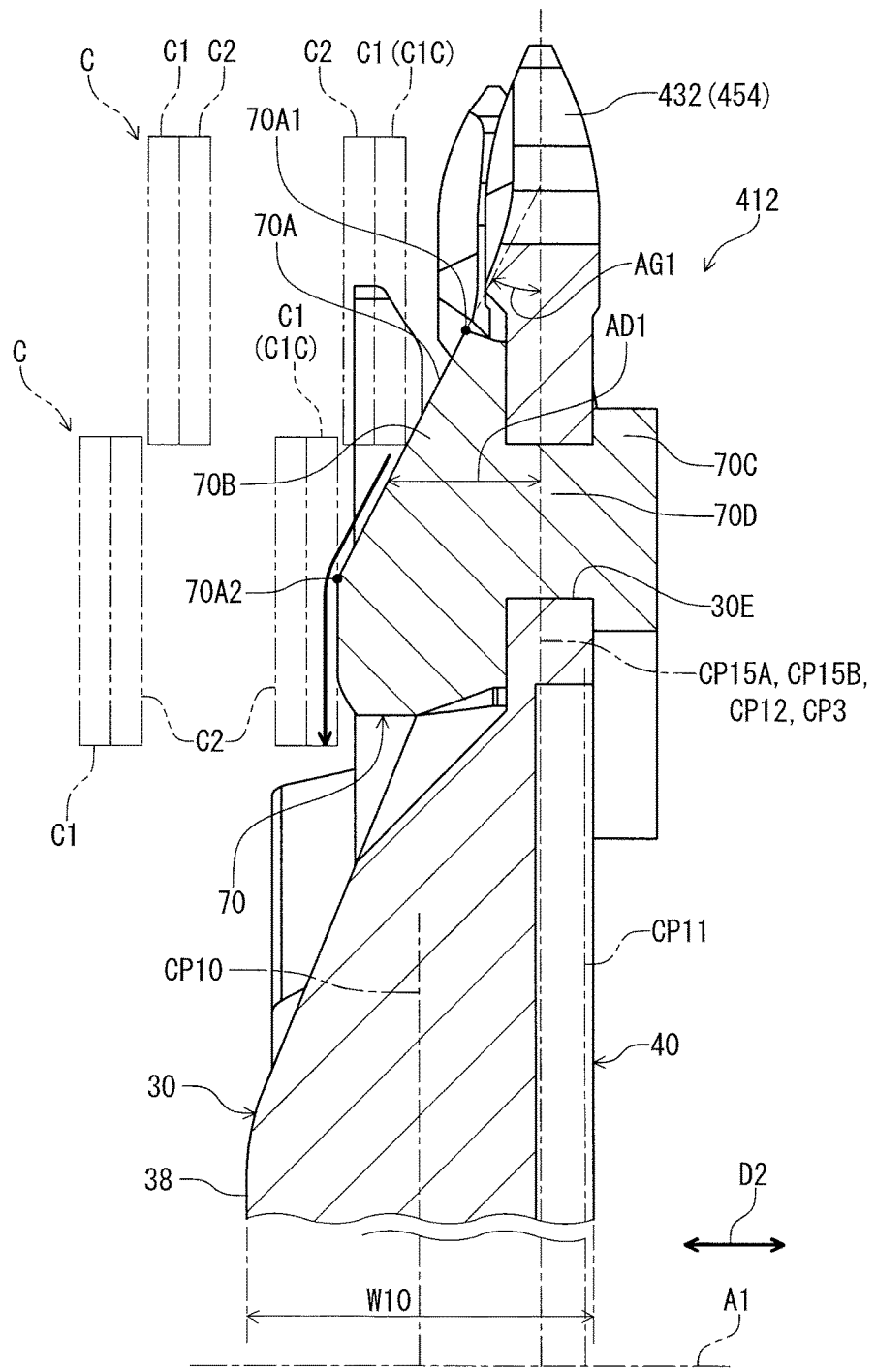
FIG. 25 is a cross-sectional view of the additional sprocket taken along line XXV-XXV of FIG. 13.

As seen in FIG. 25, the bump portion 70 has a contact surface 70A configured to move the bicycle chain C toward the additional sprocket 14. The contact surface 70A is configured to guide the bicycle chain C toward the additional sprocket 14. The contact surface 70A is configured to move the bicycle chain C away from the sprocket body 30 in the axial direction D2. The contact surface 70A is a flat surface and is inclined relative to the reference tooth center plane CP3. The contact surface 70A has a radially outer end 70A1 and a radially inner end 70A2. An axial distance AD1 is defined between the contact surface 70A and the reference tooth center plane CP3 in the axial direction D2. The contact surface 70A is inclined to increase the axial distance AD1 from the radially outer end 70A1 to the radially inner end 70A2.

As seen in FIG. 24, the radially outer end 70A1 is at least partly provided on a downstream side of the radially inner end 70A2 in the driving rotational direction D11. In this embodiment, the radially outer end 70A1 is partly provided on the downstream side of the radially inner end 70A2 in the driving rotational direction D11. However, a positional relationship between the radially outer end 70A1 and the radially inner end 70A2 is not limited to this embodiment. The radially outer end 70A1 has a first width W31. The radially inner end 70A2 has a second width W32 that is smaller than the first width W31. However, the second width W32 can be equal to or larger than the first width W31.

As seen in FIG. 25, an angle AG1 defined between the contact surface 70A and the reference tooth center plane CP3 of the reference tooth 72 is equal to or smaller than 50 degrees. The angle AG1 defined between the contact surface 70A and the reference tooth center plane CP3 of the reference tooth 72 is preferably equal to or smaller than 45 degrees. However, the angle is not limited to this embodiment. The angle AG1 can be equal to or smaller than approximately 50 degrees. The angle AG1 can be equal to or smaller than approximately 45 degrees. The angle AG1 can be larger than 50 degrees.

The bump portion 70 is coupled to the sprocket body 30 to contact the bicycle chain C (e.g., the outer link plate C1) in the second shifting operation. The bump portion 70 is a separate member from the sprocket body 30 and is secured to the sprocket body 30. However, the bump portion 70 can be integrally provided with the sprocket body 30 as a one-piece unitary member.

In this embodiment, the bump portion 70 includes a contact part 70B, a securing part 70C, and an intermediate part 70D. The contact part 70B is provided on the first axial surface 38 to contact the outer link plate C1. The contact part 70B is provided at one end of the intermediate part 70D. The contact part 70B includes the contact surface 70A. The securing part 70C is provided on the first reverse axial surface 40. The securing part 70C is provided at the other end of the intermediate part 70D. The intermediate part 70D extends through a hole 30E of the sprocket body 30. The contact part 70B has an outer diameter larger than an outer diameter of the intermediate part 70D. The securing part 70C has an outer diameter larger than the outer diameter of the intermediate part 70D. The contact part 70B, the securing part 70C, and the intermediate part 70D provide a rivet.

As seen in FIGS. 22 and 23, the contact part 70B has a shape different from a shape of the contact part 66A. However, the structure of the bump portion 70 is not limited to this embodiment.

The derailing tooth 54 includes a first derailing downstream chamfer 54D provided on the first axial surface 38. The first derailing downstream chamfer 54D is provided on a downstream side in the derailing tooth 54 in the driving rotational direction D11. The first derailing downstream chamfer 54D reduces interference between the derailing tooth 54 and the bicycle chain C (e.g., the inner link plate C2) when the derailing tooth 54 first derails the bicycle chain C from the bicycle sprocket 12 in the second shifting operation.

The derailing tooth 54 includes a first derailing upstream chamfer 54E provided on the first axial surface 38. The first derailing upstream chamfer 54E is provided on an upstream side in the derailing tooth 54 in the driving rotational direction D11. The first derailing upstream chamfer 54E reduces interference between the derailing tooth 54 and the bicycle chain C (e.g., the outer link plate C1) when the derailing tooth 54 first derails the bicycle chain C from the bicycle sprocket 12 in the second shifting operation.

Figure 26:
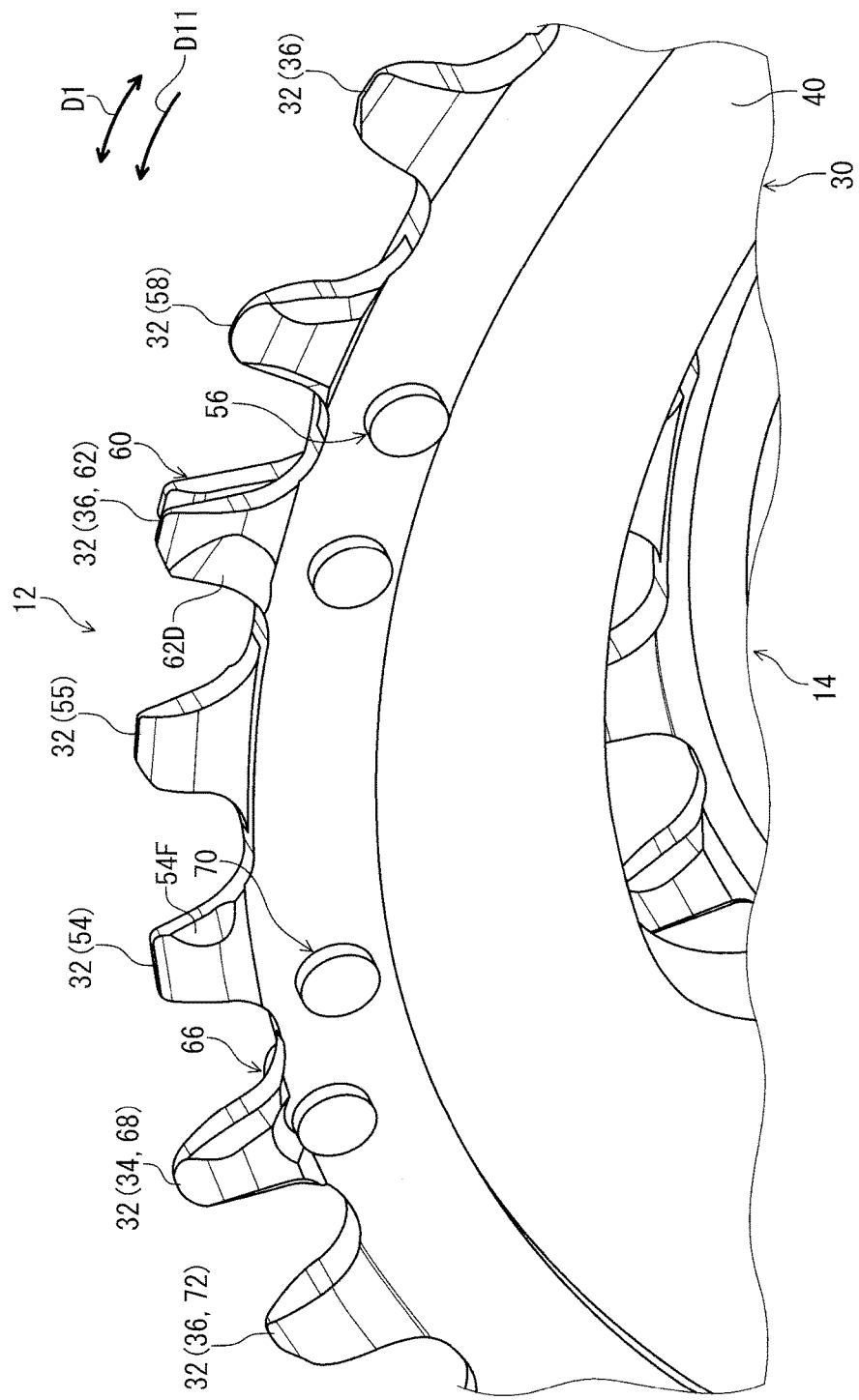
FIG. 26 is a partial perspective view of the bicycle sprocket assembly illustrated in FIG. 4.

As seen in FIG. 26, the derailing tooth 54 includes a first receiving downstream chamfer 54F provided on the first reverse axial surface 40. The first receiving downstream chamfer 54F is provided on a downstream side in the derailing tooth 54 in the driving rotational direction D11. The first receiving downstream chamfer 54F reduces interference between the derailing tooth 54 and the bicycle chain C (e.g., the inner link plate C2) when the receiving tooth 55 first receives the bicycle chain C in the first shifting operation. Namely, the derailing tooth 54 facilitates receipt of the bicycle chain C at the receiving tooth 55 in the first shifting operation.

As seen in FIGS. 22 and 23, the receiving tooth 55 includes a downstream chamfer 55D and an upstream chamfer 55E. The downstream chamfer 55D is provided on the first axial surface 38. The additional downstream chamfer 55E is provided on a downstream side in the receiving tooth 55 in the driving rotational direction D11. The upstream chamfer 55E is provided on the first axial surface 38. The upstream chamfer 55E is provided on an upstream side in the receiving tooth 55 in the driving rotational direction D11.

As seen in FIG. 26, the second adjacent tooth 62 includes a third derailing upstream chamfer 62D provided on the first reverse axial surface 40. The third derailing upstream chamfer 62D is provided on an upstream side in the second adjacent tooth 62 in the driving rotational direction D11. The third derailing upstream chamfer 62D reduces interference between the second adjacent tooth 62 and the bicycle chain C (e.g., the inner link plate C2) when the derailing tooth 54 first derails the bicycle chain C from the bicycle sprocket 12 in the second shifting operation.

As seen in FIGS. 22 and 23, the second adjacent tooth 62 includes a third receiving upstream chamfer 62E and an additional downstream chamfer 62F. The third receiving upstream chamfer 62E is provided on the first axial surface 38. The third receiving upstream chamfer 62E is provided on a downstream side in the second adjacent tooth 62 in the driving rotational direction D11. The third receiving upstream chamfer 62E reduces interference between the second adjacent tooth 62 and the bicycle chain C (e.g., the inner link plate C2) when the receiving tooth 55 first receives the bicycle chain C in the first shifting operation. The additional downstream chamfer 62F is provided on the first axial surface 38. The additional downstream chamfer 62F is provided on a downstream side in the receiving tooth 55 in the driving rotational direction D11.

As seen in FIG. 24, the sprocket teeth 32 include tooth bottoms 32T provided on the outer periphery 30A of the sprocket body 30. The at least one first tooth 34 has a first tooth radial length RL11 defined radially outward from a root circle RT defined by the tooth bottoms 32T. The at least one second tooth 36 has a second tooth radial length RL12 defined radially outward from the root circle RT. In this embodiment, the first tooth radial length RL11 is larger than the second tooth radial length RL12. However, the first tooth radial length RL11 can be equal to or smaller than the second tooth radial length RL12.

The derailing tooth 54 has a derailing tooth radial length RL13 defined radially outward from the root circle RT. The derailing tooth radial length RL13 is smaller than at least one of the first tooth radial length RL11 and the second tooth radial length RL12. In this embodiment, the derailing tooth radial length RL13 is smaller than the first tooth radial length RL11 and the second tooth radial length RL12. However, the derailing tooth radial length RL13 can be equal to or larger than at least one of the first tooth radial length RL11 and the second tooth radial length RL12.

The receiving tooth 55 has a receiving tooth radial length RL14 defined radially outward from the root circle RC. The receiving tooth radial length RL14 is smaller than at least one of the first tooth radial length RL11 and the second tooth radial length RL12. In this embodiment, the receiving tooth radial length RL14 is smaller than the first tooth radial length RL11 and the second tooth radial length RL12. However, the receiving tooth radial length RL14 can be equal to or larger than at least one of the first tooth radial length RL11 and the second tooth radial length RL12. Furthermore, the receiving tooth radial length RL14 is equal to the derailing tooth radial length RL13. However, the receiving tooth radial length RL14 can be different from the derailing tooth radial length RL13.

In this embodiment, as seen in FIG. 13, the shifting facilitation area FA1 is defined from an upstream tooth bottom 68T of the third adjacent tooth 68 to a downstream circumferential end 64A of the shifting facilitation recess 64 in the circumferential direction D1. The first shifting facilitation area FA11 is defined from an upstream tooth bottom 54T of the derailing tooth 54 to the downstream circumferential end 64A of the shifting facilitation recess 64 in the circumferential direction D1. The second shifting facilitation area FA12 is defined from the upstream tooth bottom 68T of the third adjacent tooth 68 to a downstream tooth bottom 62T of the second adjacent tooth 62 in the circumferential direction D1. However, the first shifting facilitation area FA11 and the second shifting facilitation area FA12 are not limited to this embodiment.

The first shifting operation and the second shifting operation will be described in detail below referring to FIGS. 27 to 35.

Figure 27:
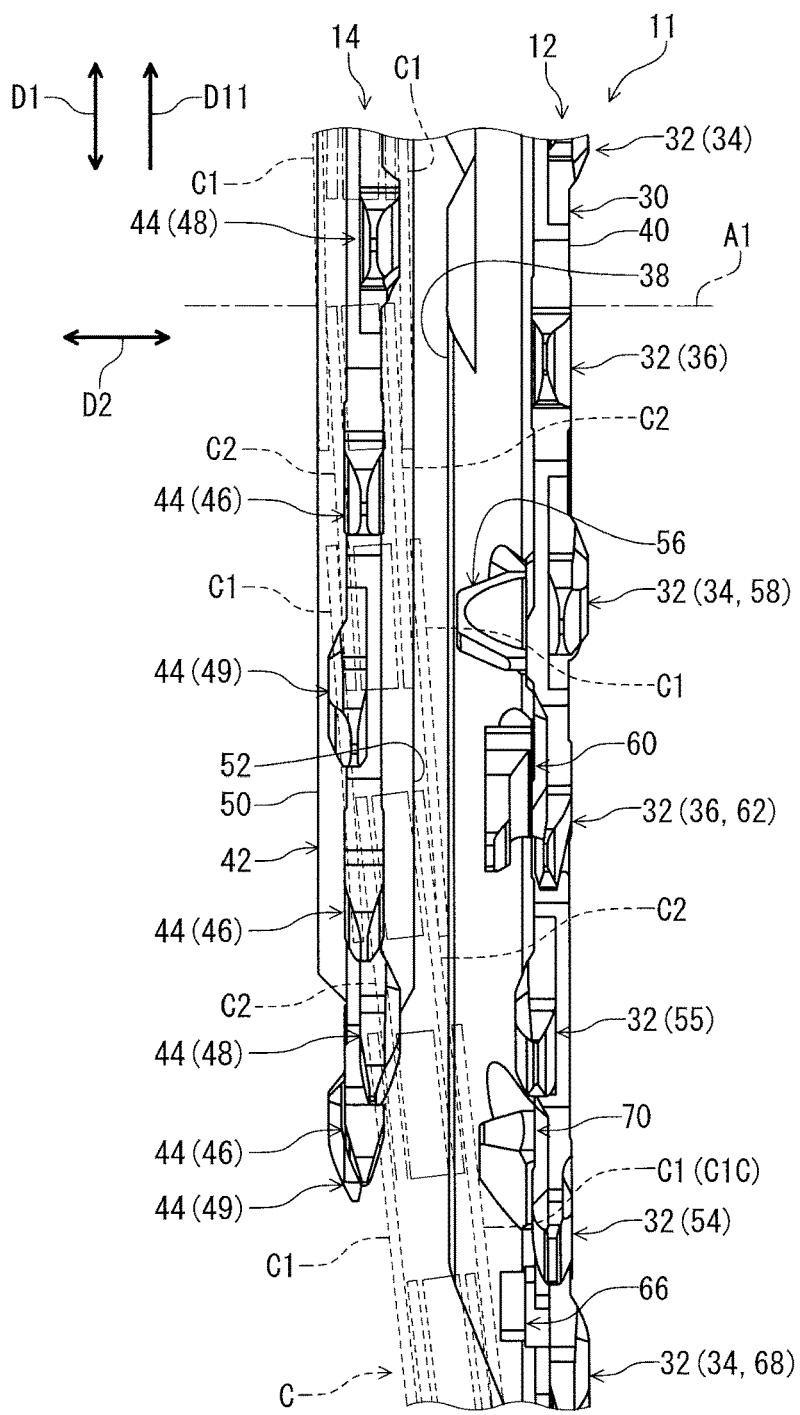
FIG. 27 is a plan view of the bicycle sprocket assembly illustrated in FIG. 4 with a bicycle chain (first shifting operation).
Figure 28:
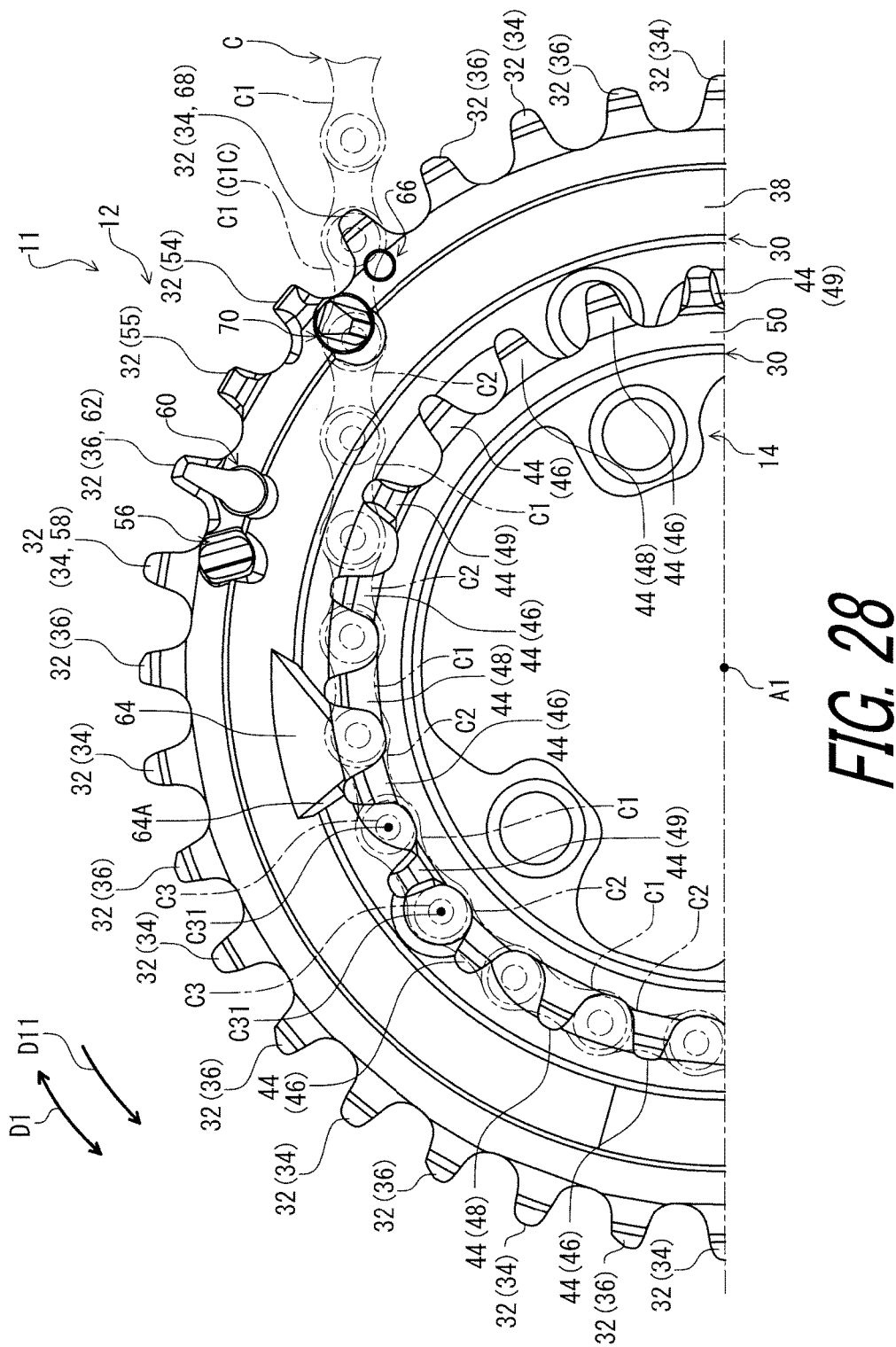
FIG. 28 is a partial side elevational view of the bicycle sprocket assembly illustrated in FIG. 4 with the bicycle chain (first shifting operation).
Figure 29:
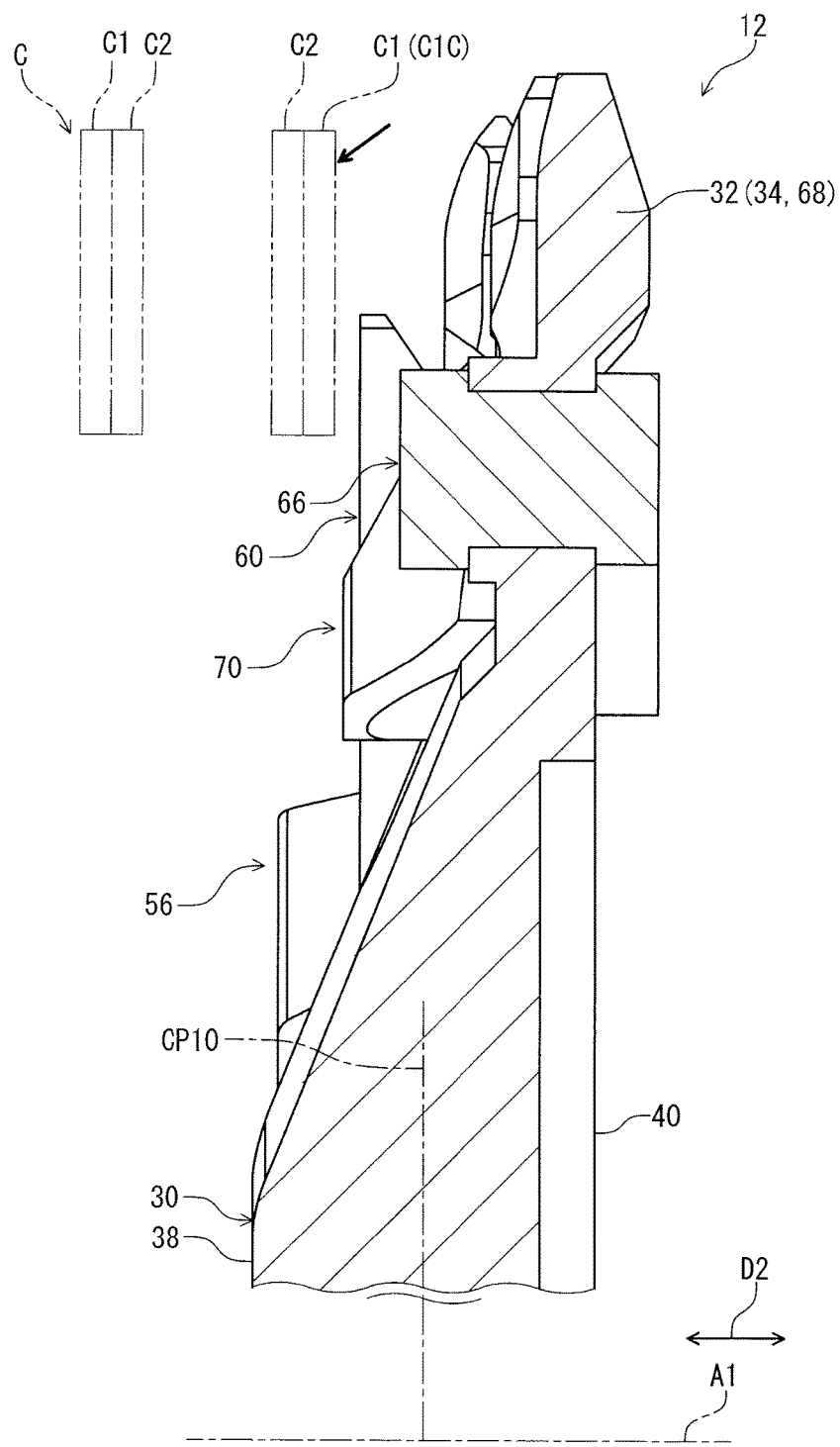
FIG. 29 is a cross-sectional view of the bicycle sprocket assembly illustrated in FIG. 4 with the bicycle chain (first shifting operation).

As seen in FIG. 27, the bicycle chain C is shifted from the additional sprocket 14 toward the bicycle sprocket 12 by the front derailleur (not shown) in the first shifting operation. As seen in FIGS. 25, 27, and 28, the outer link plate C1C of the bicycle chain C contacts the bump portion 70 (the contact surface 70A) when the bicycle chain C is shifted toward the bicycle sprocket 12 in a state where the bicycle chain C is not engaged with the first shifting facilitation projection 56 and the additional shifting facilitation projection 60. As seen in FIGS. 25 and 29, the outer link plate C1C of the bicycle chain C is moved by the contact surface 70A of the bump portion 70 away from the second shifting facilitation projection 66 in the axial direction D2. As seen in FIG. 29, this prevents the bicycle chain C from contacting the shifting facilitation projection 56. Accordingly, as seen in FIG. 30, the bicycle chain C can be certainly engaged with the first shifting facilitation projection 56 and the additional shifting facilitation projection 60 in the first shifting operation without being lifted by the second shifting facilitation projection 66. In this embodiment, one of the at least one fourth tooth 48 and the at least one fifth tooth 49 is spaced apart from the shifting facilitation projection 56 by a reference distance RD corresponding to an even number of chain pitch C4 of the bicycle chain C In this embodiment, the fifth tooth 49X is spaced apart from the shifting facilitation projection 56 by the reference distance RD corresponding to an even number of chain pitch C4 of the bicycle chain C. The reference distance RD corresponds to four chain pitches C4 of the bicycle chain C. The reference distance RD is defined along the bicycle chain C in a state where the bicycle chain C is engaged with the first shifting facilitation projection 56 and the fifth tooth 49X in the first shifting operation.

Figure 31:
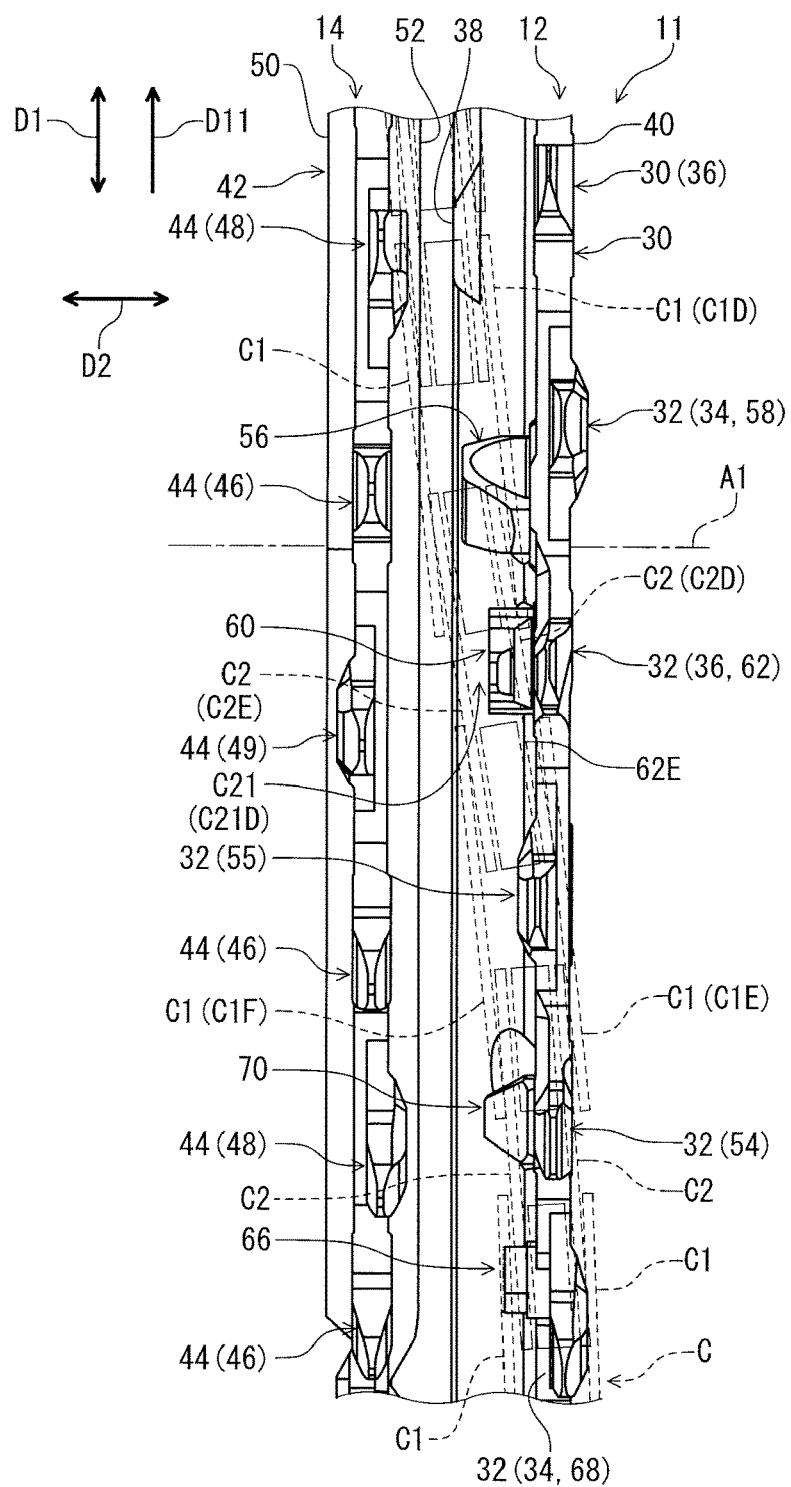
FIG. 31 is a plan view of the bicycle sprocket assembly illustrated in FIG. 4 with the bicycle chain (first shifting operation).

As seen in FIGS. 18, 30, and 31, the outer link plate C1D of the bicycle chain C contacts the first shifting facilitation projection 56 in a state where the bicycle chain C is shifted toward the bicycle sprocket 12 by the front derailleur. The outer link plate CID of the bicycle chain C is upwardly moved by the first shifting facilitation projection 56 in response to the rotation of the bicycle sprocket 12 in a state where the first shifting facilitation projection 56 is in contact with the outer link plate C1D of the bicycle chain C. At this time, as seen in FIG. 19, the inner link plate C2D is guided toward the second adjacent tooth 62 in the axial direction D2 by the inclined surface 60E of the additional shifting facilitation projection 60. Thus, the inner link plate C2D is moved toward the second adjacent tooth 62 in the axial direction D2 by the additional shifting facilitation projection 60, causing the additional shifting facilitation projection 60 to be inserted into the inner link space C21D of the opposed pair of inner link plates C2D and C1E.

In this state, as seen in FIG. 31, the third receiving upstream chamfer 62E facilitates an inclination of the inner link plate C2D of the bicycle chain C relative to the axial direction D2. Thus, the opposed pair of outer link plates C1E and C2F are first received in the first shifting operation by the receiving tooth 55 when the bicycle sprocket 12 further rotates about the rotational center axis A1 in the driving rotational direction D11.

The additional shifting facilitation projection 60 is once disengaged from the inner link plates C2D and C1E when the bicycle sprocket 12 further rotates about the rotational center axis A1 in the driving rotational direction D11. After that, as seen in FIG. 20, the second adjacent tooth 62 is inserted into the inner link space C21D of the opposed pair of inner link plates C2D and C2E. This brings the opposed inner link plates C2D and C2E into engagement with the second adjacent tooth 62.

Figure 32:
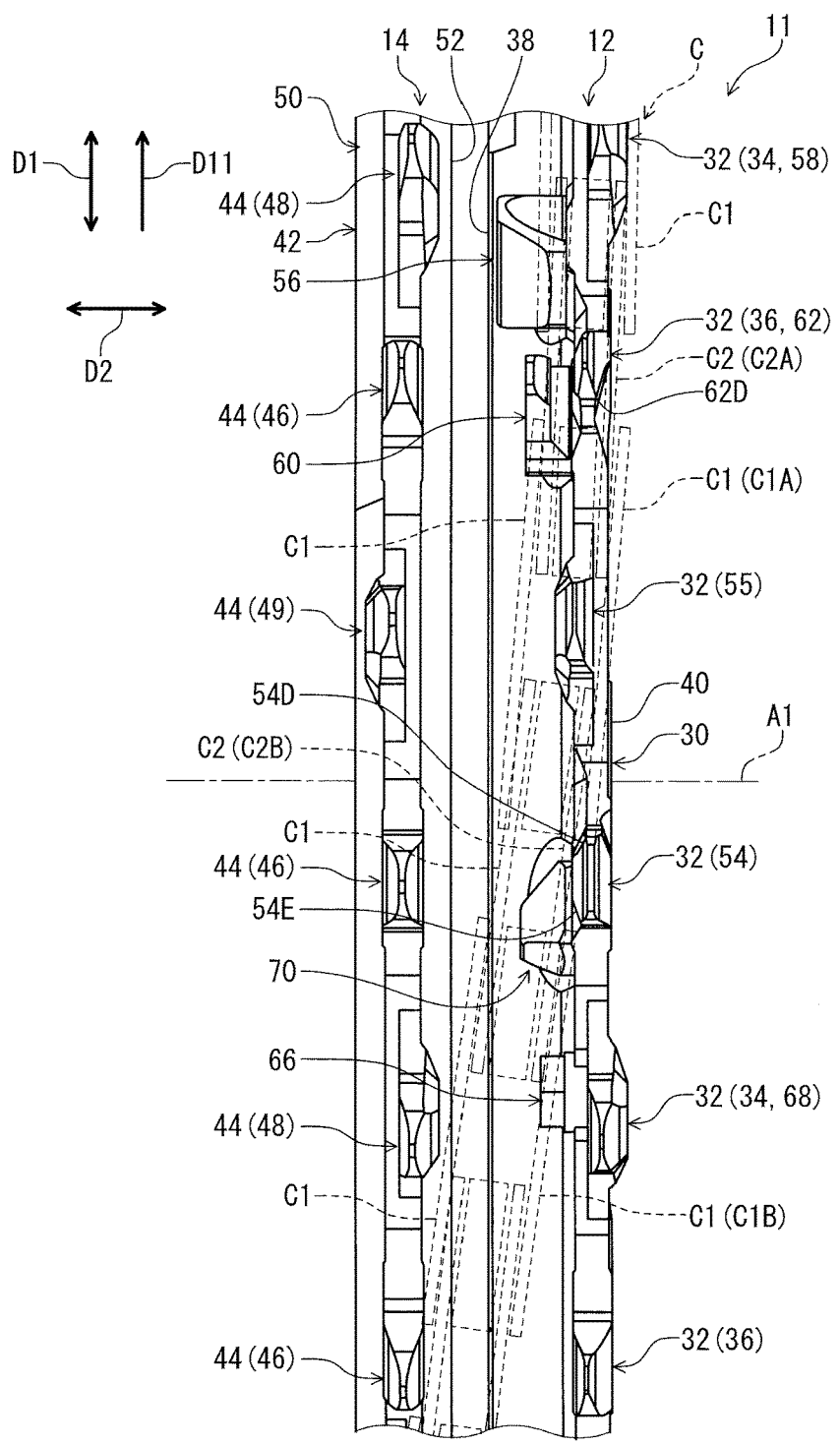
FIG. 32 is a plan view of the bicycle sprocket assembly illustrated in FIG. 4 with the bicycle chain (second shifting operation).

As seen in FIG. 32, the bicycle chain C is shifted from the bicycle sprocket 12 toward the additional sprocket 14 by the front derailleur (not shown) in the second shifting operation. The third derailing upstream chamfer 62D facilitates an inclination of the inner link plate C2A toward the additional sprocket 14 relative to the axial direction D2. The offset position of the receiving tooth 62 facilitates an inclination of the outer link plates C1A toward the additional sprocket 14 relative to the axial direction D2. Furtheiiiiore, the first derailing downstream chamfer 54D guides the inner link plate C2B toward the additional sprocket 14 in the axial direction D2. Thus, the bicycle chain C is first derailed from the bicycle sprocket 12 at the derailing tooth 54 in the second shifting operation.

Figure 33:
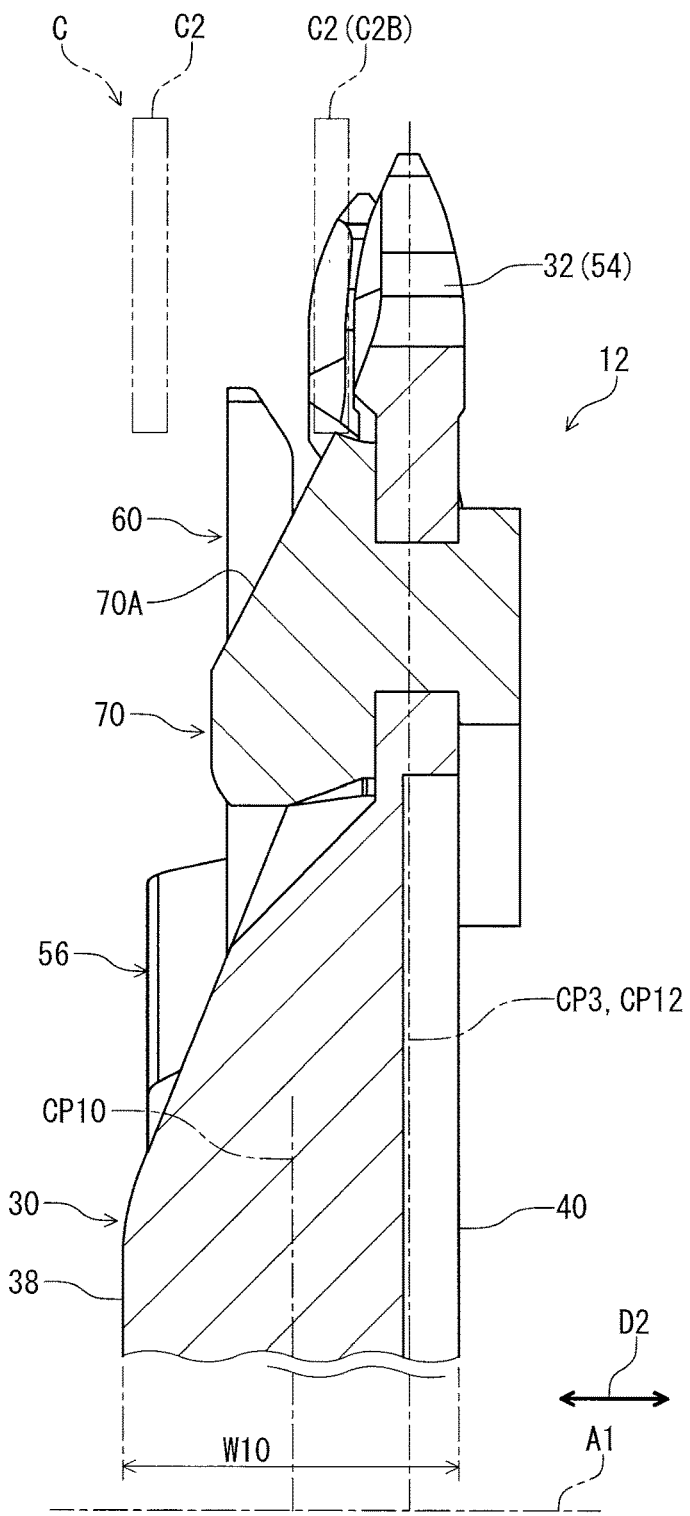
FIG. 33 is a cross-sectional view of the bicycle sprocket assembly illustrated in FIG. 4 with the bicycle chain (second shifting operation).
Figure 34:
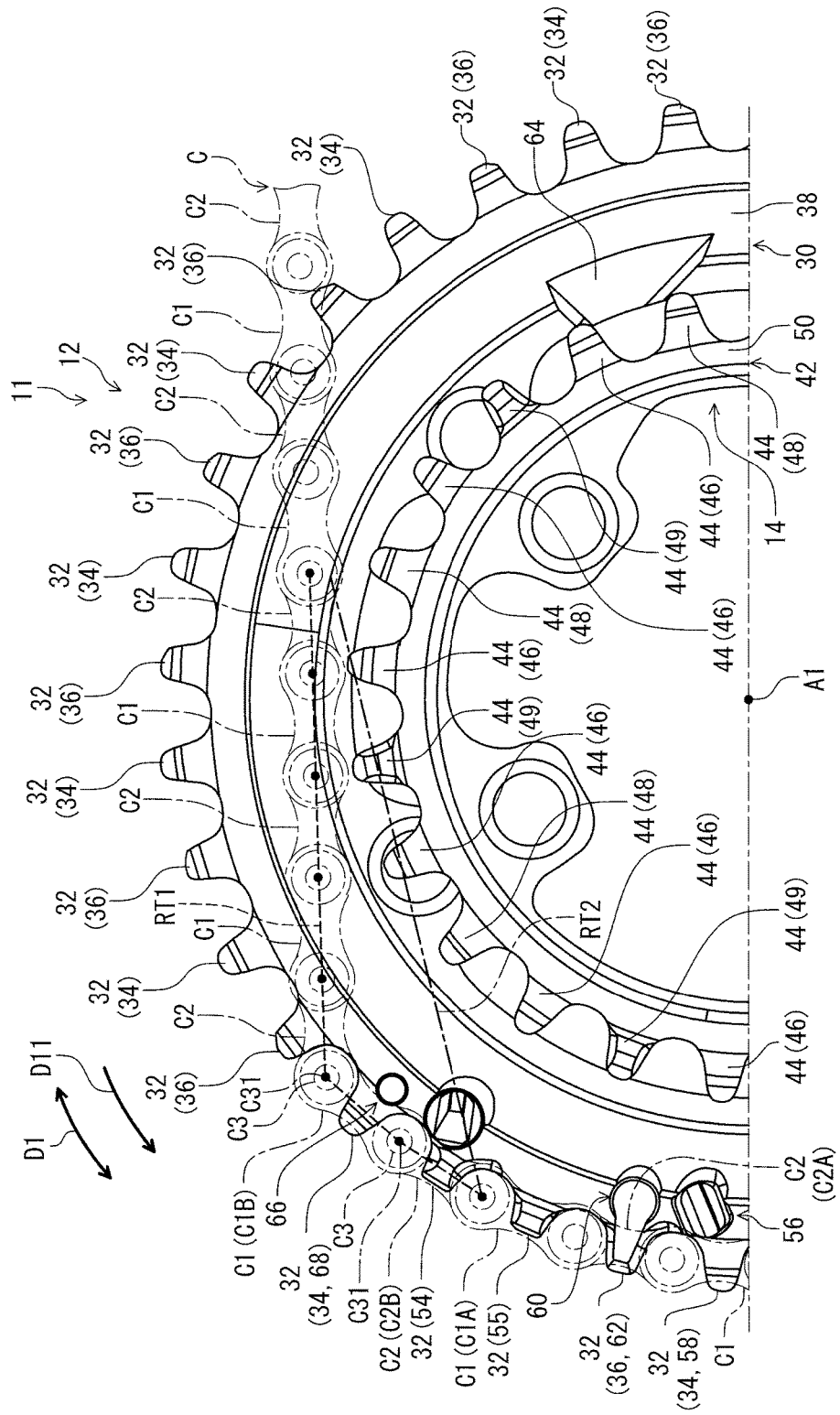
FIG. 34 is a partial side elevational view of the bicycle sprocket assembly illustrated in FIG. 4 with the bicycle chain (second shifting operation).
Figure 35:
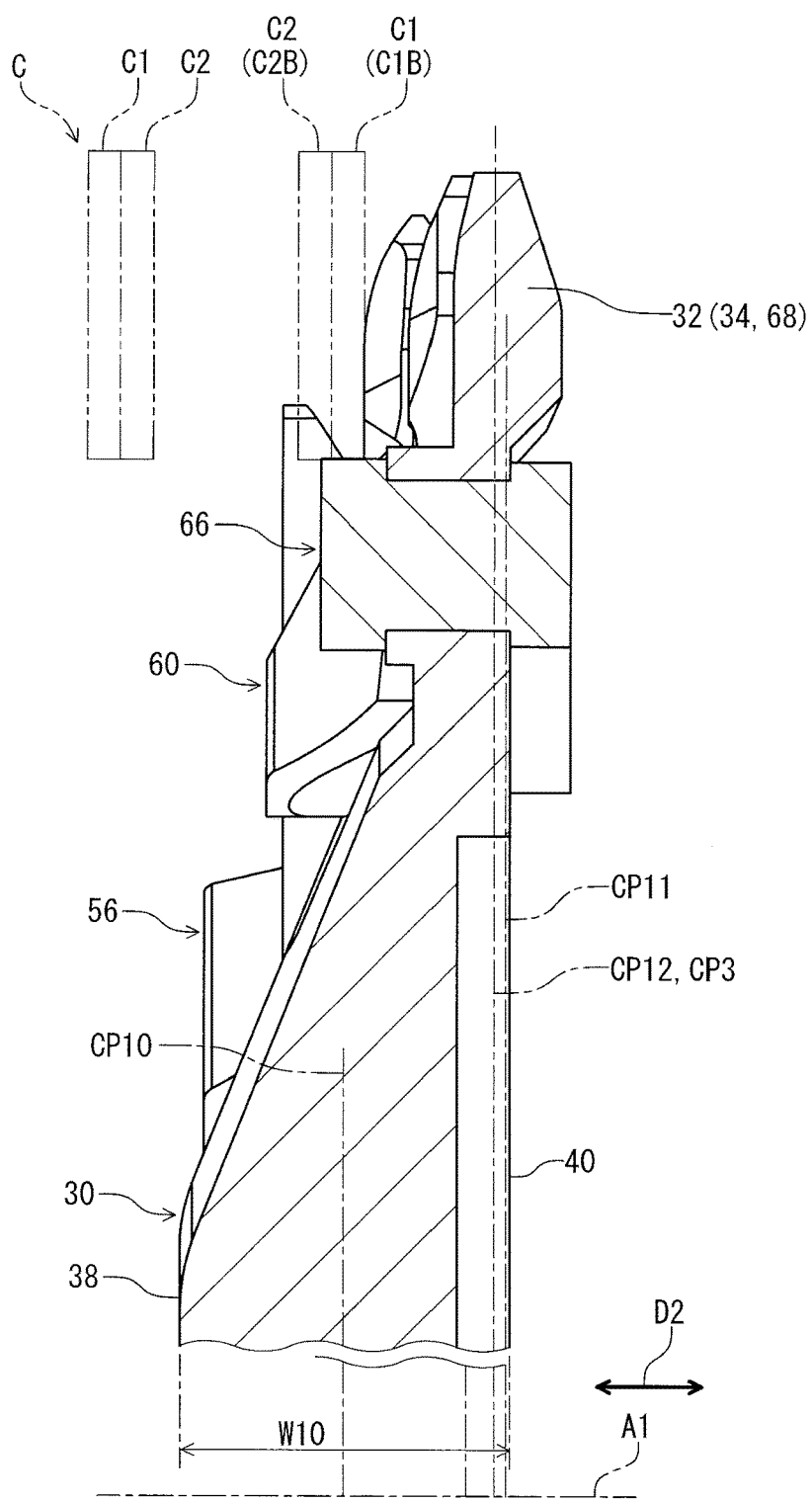
FIG. 35 is a cross-sectional view of the bicycle sprocket assembly illustrated in FIG. 4 with the bicycle chain (second shifting operation).

In the second shifting operation, as seen in FIG. 33, the inner link plate C2B is not guided by the contact surface 70A of the bump portion 70 toward the additional sprocket 14 since the inner link plate C2E is adjacent to or in contact with the derailing tooth 54. This brings the outer link plate C1B into contact with the shifting facilitation projection 56. Thus, as seen in FIGS. 34 and 35, the outer link plate C1B is supported by the shifting facilitation projection 56. In this state, as seen in FIG. 34, the bicycle chain C extends from the shifting facilitation projection 56 on a route RT1 as viewed in the axial direction D2. The route RT1 is different from a route RT2 of the bicycle chain C as viewed in the axial direction D2 in a case where the bicycle sprocket 12 does not include the shifting facilitation projection 56. Specifically, the route RT1 is longer than the route RT2. This easily brings the bicycle chain C into engagement with the additional sprocket teeth 44 of the additional sprocket 14 in the second shifting operation. Accordingly, the shifting facilitation area FA1 facilitates the second shifting operation.

With the bicycle sprocket assembly 11 and the bicycle sprocket 12, the bicycle sprocket 12 comprises the at least one shifting facilitation area FA1 configured to facilitate the shifting operation of the bicycle chain C. This improves chain-shifting performance in the shifting operation. Furthermore, the second tooth center plane CP12 is offset from the first tooth center plane CP11 in the axial direction D2. This improves chain-holding performance of the bicycle sprocket 12. For example, it is possible to improve the chain-holding performance of the bicycle sprocket 12 in a first chain state where the bicycle chain C extends between the bicycle sprocket assembly 11 and the multiple rear sprocket assembly 4 along the first chain line CL1 (FIG. 1). Accordingly, it is possible to improve the chain-holding performance of the bicycle sprocket 12 with improving the chain-shifting performance in the shifting operation.

Second Embodiment

A bicycle sprocket assembly 211 including a bicycle sprocket 212 in accordance with a second embodiment will be described below referring to FIGS. 36 and 37. The bicycle sprocket assembly 211 has the same structure as that of the bicycle sprocket assembly 11 except for an additional shifting facilitation projection. Thus, elements having substantially the same function as those in the first embodiment will be numbered the same here, and will not be described again in detail here for the sake of brevity.

Figure 36:
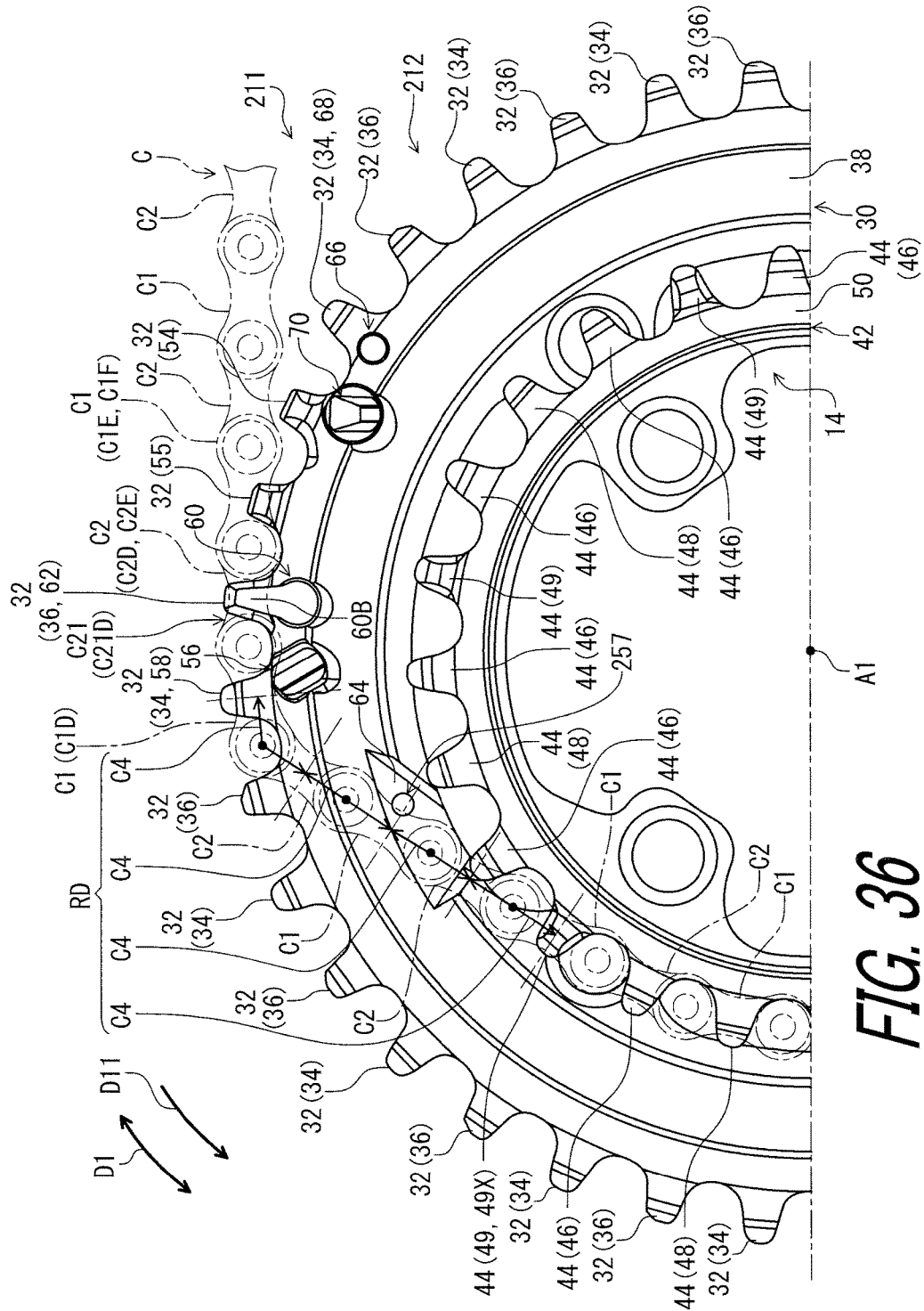
FIG. 36 is a partial side elevational view of a bicycle sprocket assembly in accordance with a second embodiment.
Figure 37:
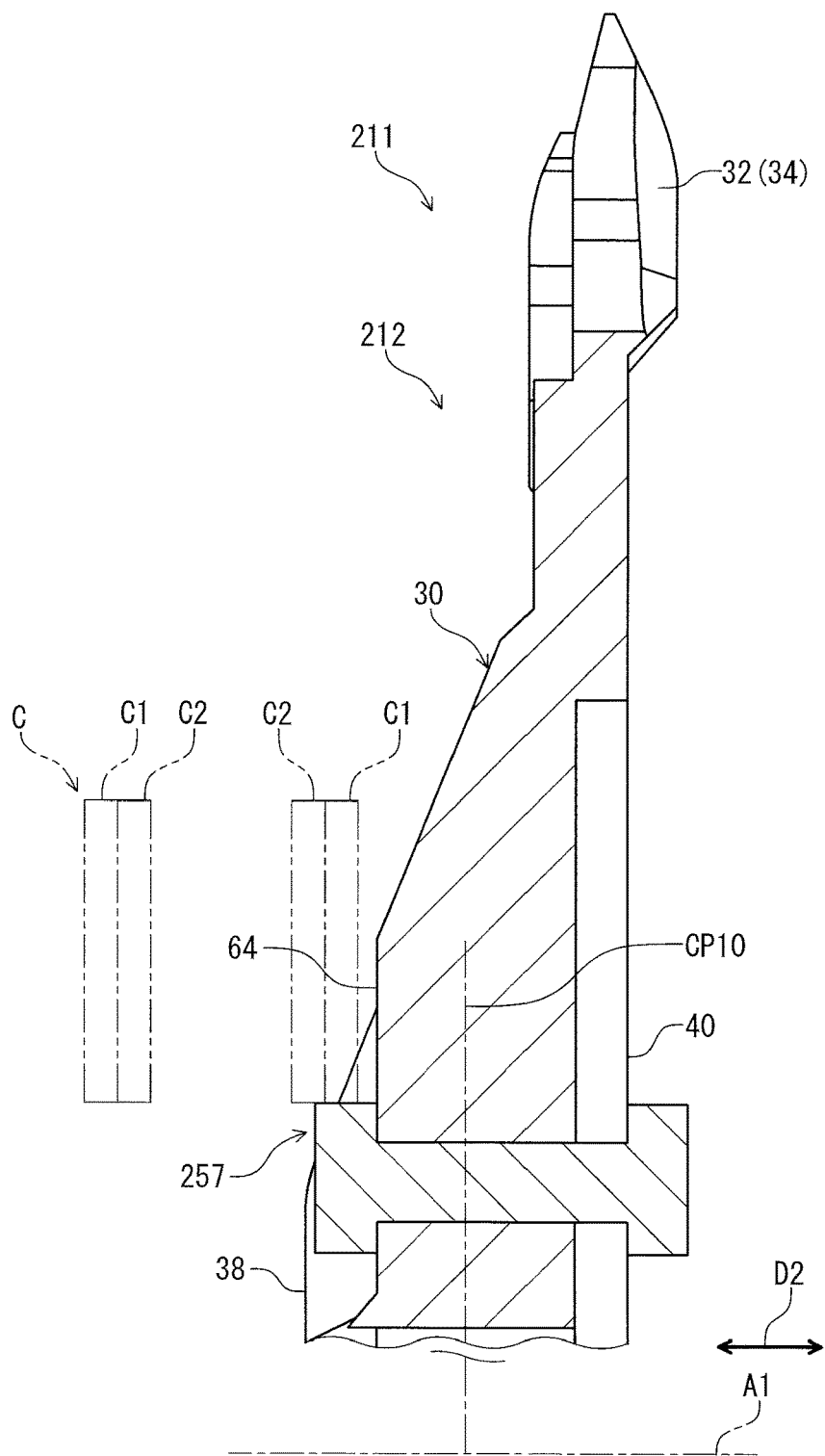
FIG. 37 is a cross-sectional view of the bicycle sprocket assembly illustrated in FIG. 36 (first shifting operation).

As seen in FIGS. 36 and 37, the bicycle sprocket 212 further comprises an additional shifting facilitation projection 257 provided in the at least one shifting facilitation area FA1 to facilitate the shifting operation. In this embodiment, the additional shifting facilitation projection 257 is provided in the first shifting facilitation area FA11 to facilitate the first shifting operation. The additional shifting facilitation projection 257 is configured to engage with the bicycle chain C (e.g., the outer link plate C1) in the first shifting operation. The additional shifting facilitation projection 257 is provided in the shifting facilitation recess 64.

With the bicycle sprocket 212, it is possible to obtain substantially the same effect as that of the bicycle sprocket 12 of the first embodiment.

Third Embodiment

A bicycle sprocket assembly 311 in accordance with a third embodiment will be described below referring to FIGS. 38 to 40. The bicycle sprocket assembly 311 has the same structure as that of the bicycle sprocket assembly 11 except for the additional sprocket teeth 44. Thus, elements having substantially the same function as those in the first embodiment will be numbered the same here, and will not be described again in detail here for the sake of brevity.

Figure 38:
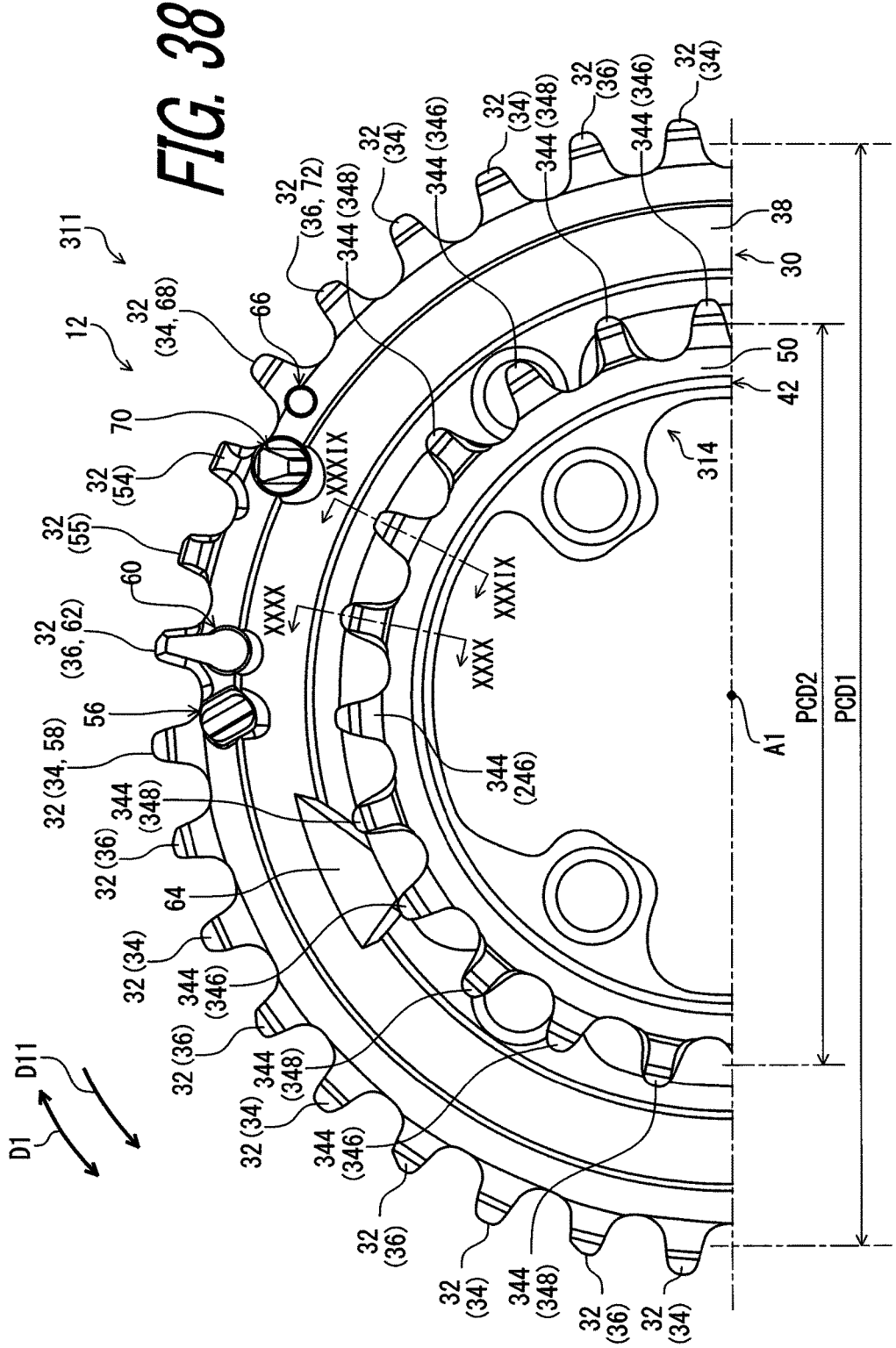
FIG. 38 is a partial side elevational view of a bicycle sprocket assembly in accordance with a third embodiment.

As seen in FIG. 38, the bicycle sprocket assembly 311 comprises the first sprocket 12 and a second sprocket 314.

The first sprocket 12 comprises the first sprocket body 30 and the first sprocket teeth 32 provided on the outer periphery 30A of the first sprocket body 30. The first sprocket teeth 32 include the at least one first chain-engagement tooth 34 and the at least one second chain-engagement tooth 36. As seen in FIG. 8, the second axial center plane CP12 of the at least one second chain-engagement tooth 36 is offset from the first tooth center plane CP11 of the at least one first chain-engagement tooth 34 in the axial direction D2.

As seen in FIG. 38, the second sprocket 314 has substantially the same structure as that of the additional sprocket 14 of the first embodiment. In this embodiment, the second sprocket 314 comprises the second sprocket body 42 and the second sprocket teeth 344 provided on the outer periphery 42A of the second sprocket body 42. The second sprocket teeth 344 include at least one third chain-engagement tooth 346 and at least one fourth chain-engagement tooth 348. The at least one third chain-engagement tooth 346 is provided on the outer periphery 42A of the second sprocket body 42 to engage with the opposed pair of inner link plates C2 of the bicycle chain C. The at least one fourth chain-engagement tooth 348 is provided on the outer periphery 42A of the second sprocket body 42 to engage with the opposed pair of outer link plates C1 of the bicycle chain C.

In this embodiment, the at least one third chain-engagement tooth 346 includes third chain-engagement teeth 346 provided on the outer periphery 42A of the second sprocket body 42 to engage with the opposed pair of inner link plates C2 of the bicycle chain C. The at least one fourth chain-engagement tooth 348 includes fourth chain-engagement teeth 348 provided on the outer periphery 42A of the second sprocket body 42 to engage with the opposed pair of inner link plates C2 of the bicycle chain C. The third chain-engagement teeth 346 and the fourth chain-engagement teeth 348 are alternatingly arranged in the circumferential direction D1.

Figure 39:
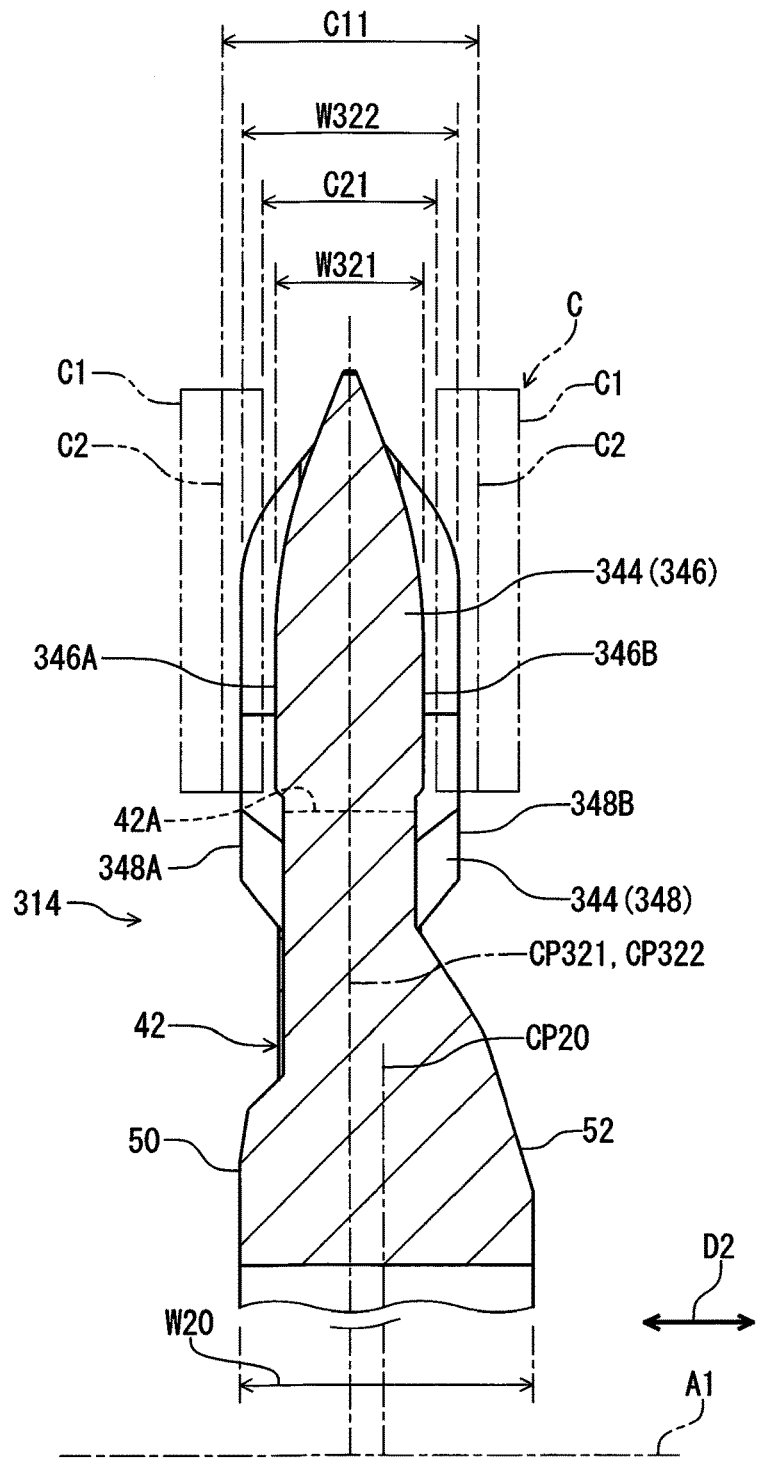
FIG. 39 is a cross-sectional view of the additional sprocket taken along line XXXIX-XXXIX of FIG. 38.

As seen in FIG. 39, the at least one third chain-engagement tooth 346 has an inner link plate engaging width W321 defined in the axial direction D2. In this embodiment, the third tooth 346 includes a third chain-engagement surface 346A and a third additional chain-engagement surface 346B. The third chain-engagement surface 346A faces in the axial direction D2 and is contactable with the bicycle chain C (e.g., the inner link plate C2). The third additional chain-engagement surface 346B faces in the axial direction D2 and is provided on a reverse side of the third chain-engagement surface 346A in the axial direction D2. The third additional chain-engagement surface 346B is contactable with the bicycle chain C (e.g., the inner link plate C2). The inner link plate engaging width W321 is defined between the third chain-engagement surface 346A and the third additional chain-engagement surface 346B in the axial direction D2.

The at least one third tooth 346 has a third tooth center plane CP321 defined to bisect the inner link plate engaging width W321. The third tooth center plane CP321 is perpendicular to the rotational center axis A1. The third tooth center plane CP321 is offset from the second reference center plane CP20 in the axial direction D2. However, the third tooth center plane CP321 can coincide with the second reference center plane CP20 in the axial direction D2.

Figure 40:
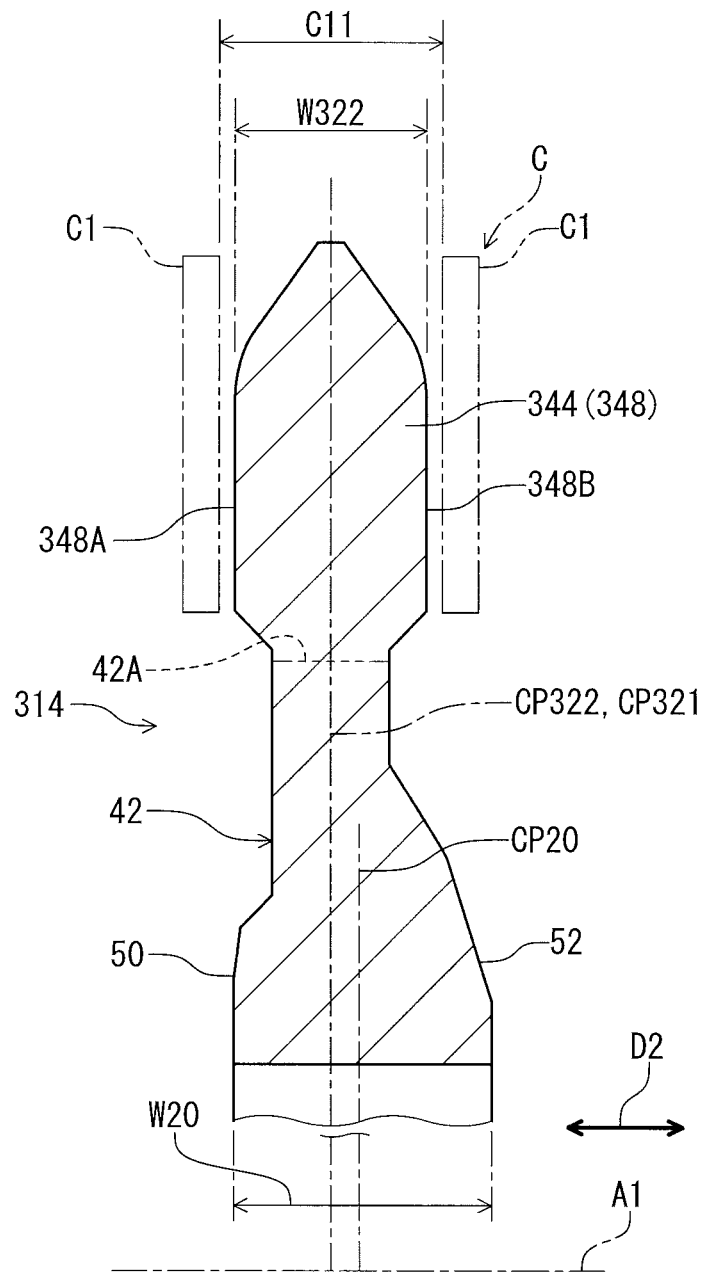
FIG. 40 is a cross-sectional view of the additional sprocket taken along line XXXX-XXXX of FIG. 38.

As seen in FIG. 40, the at least one fourth chain-engagement tooth 348 has an outer link plate engaging width W322 defined in the axial direction D2. In this embodiment, the fourth tooth 348 includes a fourth surface 348A and a fourth chain-engagement surface 348B. The fourth surface 348A faces in the axial direction D2. The fourth chain-engagement surface 348B faces in the axial direction D2 and is provided on a reverse side of the fourth surface 348A in the axial direction D2. The fourth chain-engagement surface 348B is contactable with the bicycle chain C (e.g., the outer link plate C1). The outer link plate engaging width W322 is defined between the fourth surface 348A and the fourth chain-engagement surface 348B in the axial direction D2.

The at least one fourth tooth 348 has a fourth tooth center plane CP322 defined to bisect the outer link plate engaging width W322. The fourth tooth center plane CP322 is perpendicular to the rotational center axis A1. The fourth tooth center plane CP322 is offset from the second reference center plane CP20 in the axial direction D2. However, the fourth tooth center plane CP322 can coincide with the second reference center plane CP20 in the axial direction D2. The fourth tooth center plane CP322 coincides with the third tooth center plane CP21. However, the fourth tooth center plane CP322 can be offset from the third tooth center plane CP21.

As seen in FIG. 39, the inner link plate engaging width W321 is smaller than the outer link plate engaging width W322. The outer link plate engaging width W322 is larger than the inner link space C21 defined between the opposed pair of inner link plates C2 of the bicycle chain C and is smaller than the outer link space C11 defined between the opposed pair of outer link plates C1 of the bicycle chain C. The inner link plate engaging width W321 is smaller than the inner link space C21.

In this embodiment, as seen in FIG. 38, the second pitch-circle diameter PGD2 of the second sprocket 314 is smaller than the first pitch-circle diameter PCD1 of the first sprocket 12. However, the second pitch-circle diameter PCD2 of the second sprocket 314 can be larger than the first pitch-circle diameter PCD1 of the first sprocket 12.

With the bicycle sprocket 312, it is possible to obtain substantially the same effect as that of the bicycle sprocket 12 of the first embodiment.

Modifications

It will be apparent to those skilled in the bicycle field from the present disclosure that axial positions of the teeth 34, 36, 46, 48, and 49 of the above embodiments can be modified if needed and/or desired.

Figure 41:
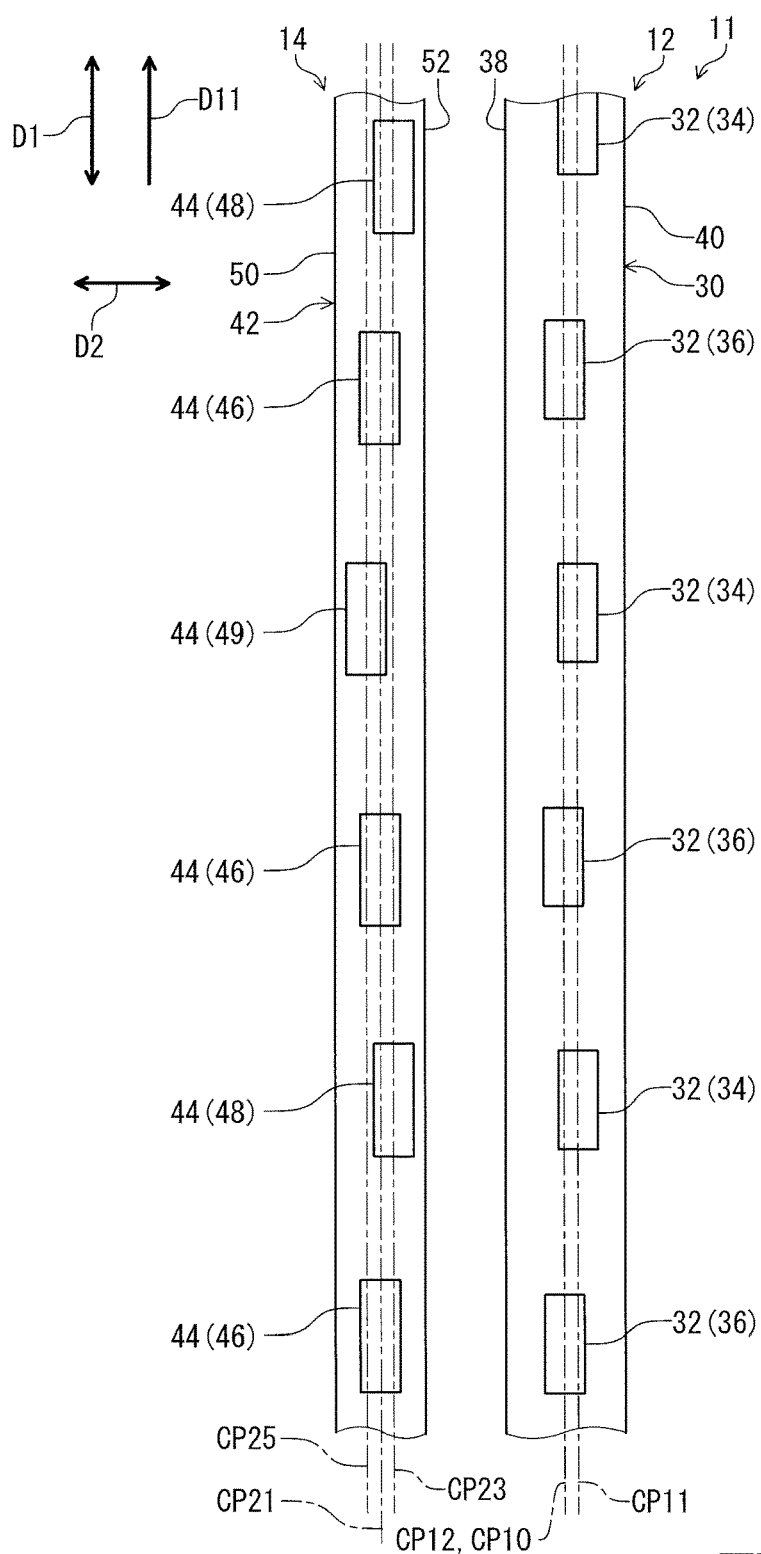
FIG. 41 is a plan view of a bicycle sprocket assembly in accordance with a first modification.

For example, as seen in FIG. 41, the second-offset-tooth center plane CP12 of the second tooth 36 can coincide with the sprocket body center plane CP10 of the larger sprocket body 30.

Figure 42:
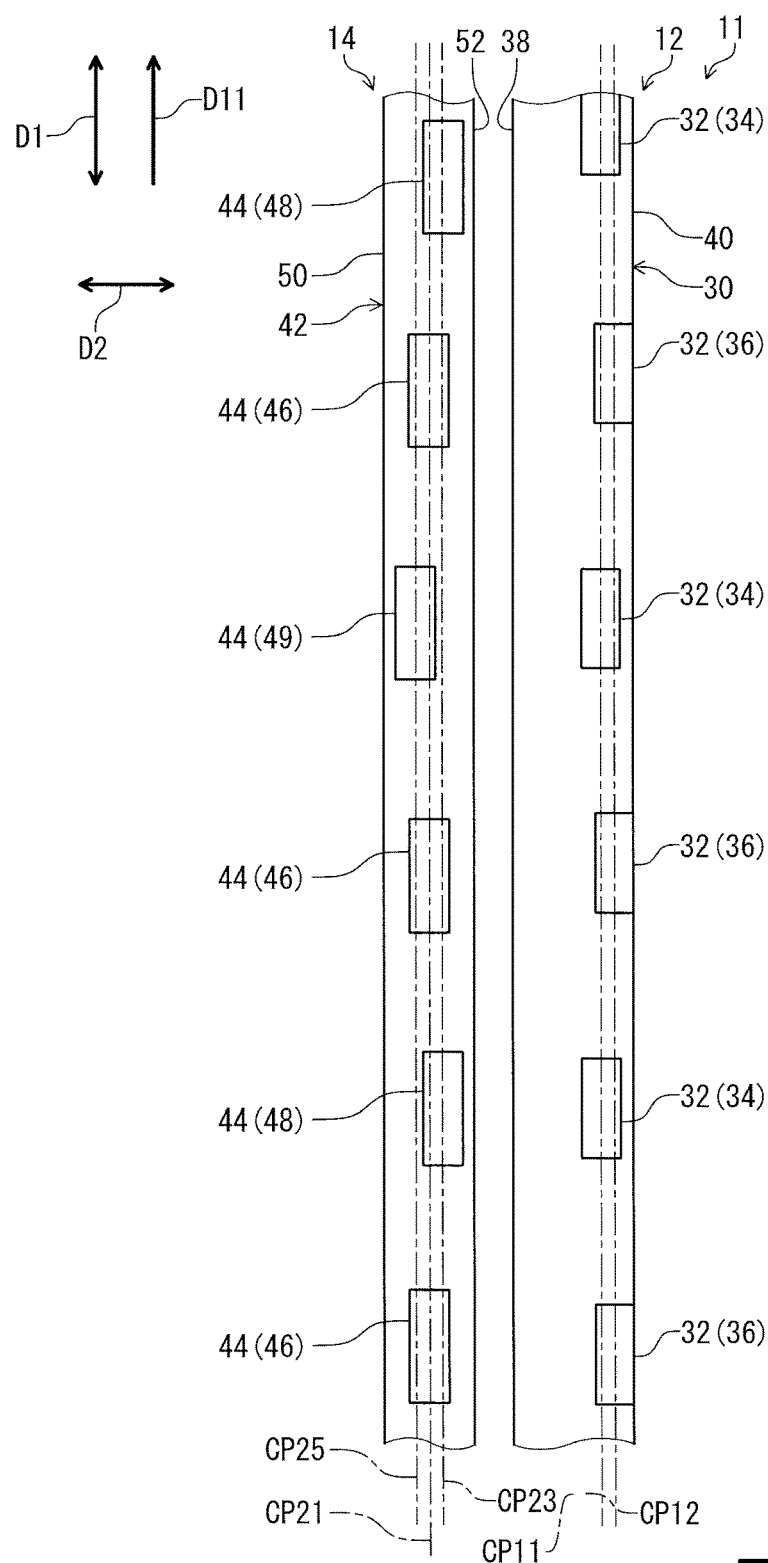
FIG. 42 is a plan view of a bicycle sprocket assembly in accordance with a second modification.

As seen in FIG. 42, the first tooth center plane CP11 of the at least one first tooth 34 can be offset from the second tooth center plane CP12 toward the additional sprocket 14 in the axial direction D2. The first-offset-tooth center plane CP11 can be closer to the smaller sprocket 14 than the second-offset-tooth center plane C12 in the axial direction D2. This improves chain-holding performance of the bicycle sprocket 12. For example, it is possible to improve the chain-holding performance of the bicycle sprocket 12 in a second chain state where the bicycle chain C extends between the bicycle sprocket assembly 11 and the multiple rear sprocket assembly 4 along the second chain line CL2 (FIG. 1).

Figure 43:
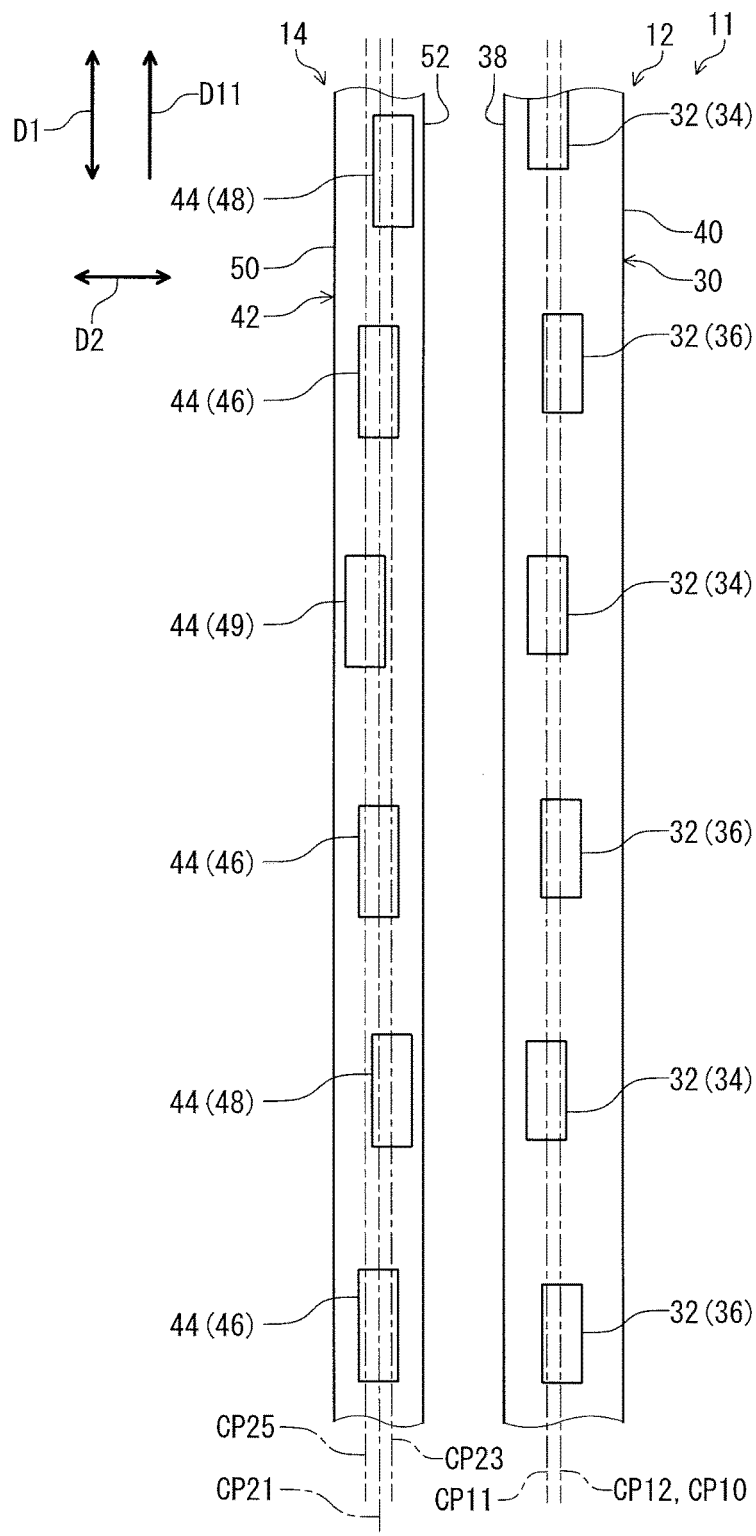
FIG. 43 is a plan view of a bicycle sprocket assembly in accordance with a third modification.

As seen in FIG. 43, the second-offset-tooth center plane CP12 of the second tooth 36 can coincide with the sprocket body center plane CP10 of the larger sprocket body 30 in the modification illustrated in FIG. 42.

Figure 44:
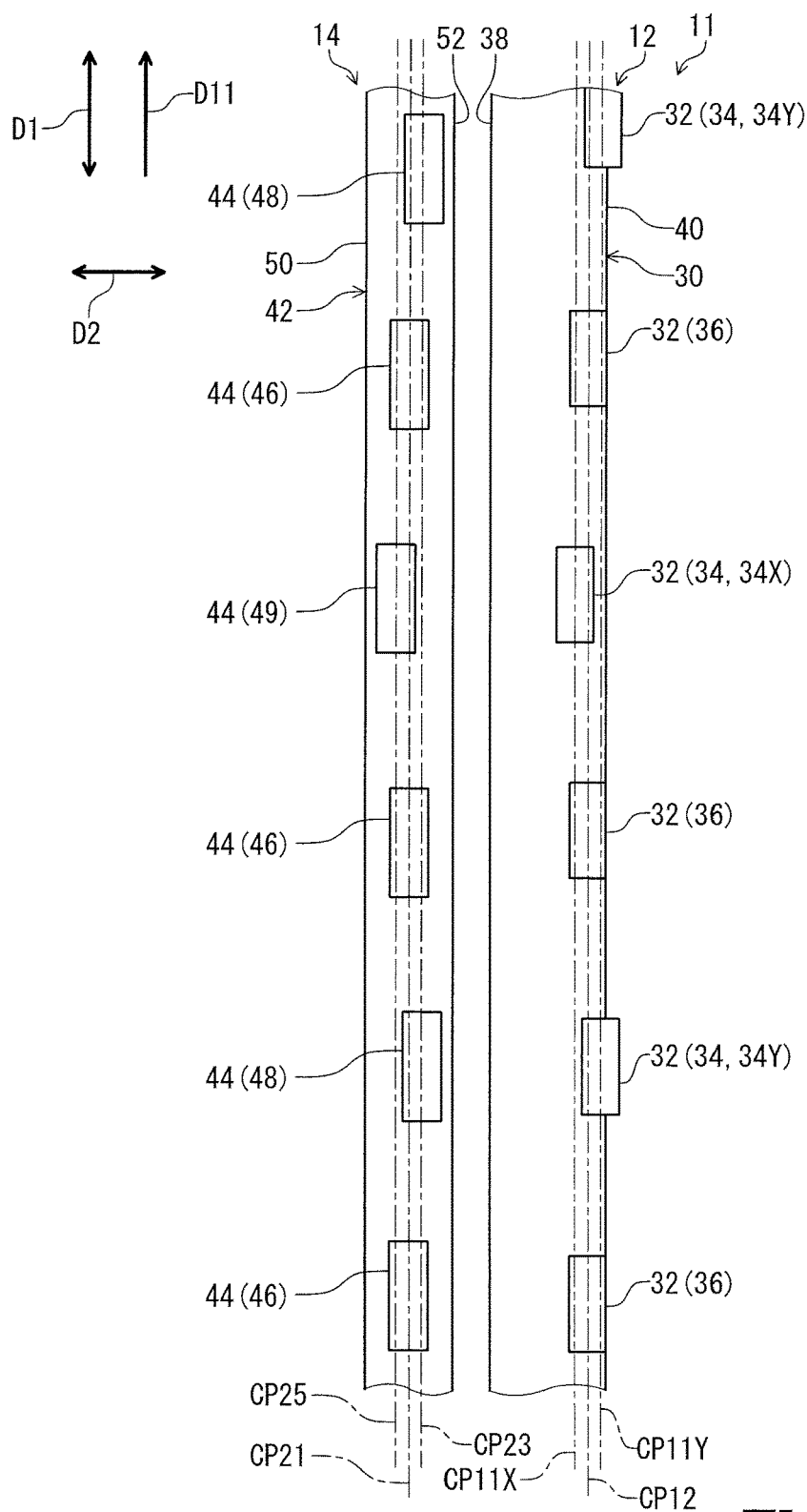
FIG. 44 is a plan view of a bicycle sprocket assembly in accordance with a fourth modification.

As seen in FIG. 44, the first embodiment and the modification of FIG. 42 can be combined with each other. The at least one first tooth 34 includes at least one first inward tooth 34X and at least one first outward tooth 34Y. The at least one first inward tooth 34X is provided on the outer periphery 30A of the sprocket body 30 to engage with the opposed pair of outer link plates C1 of the bicycle chain C. The at least one first outward tooth 34Y is provided on the outer periphery 30A of the sprocket body 30 to engage with the opposed pair of outer link plates C1 of the bicycle chain C. The at least one first inward tooth 34X and the at least one first outward tooth 34Y are alternatingly arranged in the circumferential direction D1 defined about the rotational center axis A1.

In this embodiment, the at least one first inward tooth 34X includes first inward teeth 34X provided on the outer periphery 30A of the sprocket body 30 to engage with the opposed pair of outer link plates C1 of the bicycle chain C. The at least one first outwardtooth 34Y includes first outward teeth 34Y provided on the outer periphery 30A of the sprocket body 30 to engage with the opposed pair of outer link plates C1 of the bicycle chain C. The first inward teeth 34X and the first outward teeth 34Y are alternatingly arranged in the circumferential direction D1. The second teeth 36 are respectively provided between the first inward teeth 34X and the first outward teeth 34Y in the circumferential direction D1.

The at least one first inward tooth 34X has the first tooth center plane CP11X. The at least one first outward tooth 34Y has the first tooth center plane CP11Y. The first tooth center plane CP11X of the at least one first inward tooth 34X is offset from the first tooth center plane CP11Y of the at least one first outward tooth 34Y toward the additional sprocket 14 in the axial direction D2. The first tooth center plane CP11X is offset from the second tooth center plane CP12 toward the additional sprocket 14 in the axial direction D2. The first tooth center plane CP11Y is offset from the second tooth center plane CP12 away from the additional sprocket 14 in the axial direction D2. The second tooth center plane CP12 is provided between the first tooth center planes CP11X and CP11Y in the axial direction D2.

With the first inward tooth 34X and the first inward tooth 34Y, it is possible to improve the chain-holding performance of the bicycle sprocket 12 in both the first chain state and the second chain state (FIG. 1).

Figure 45:
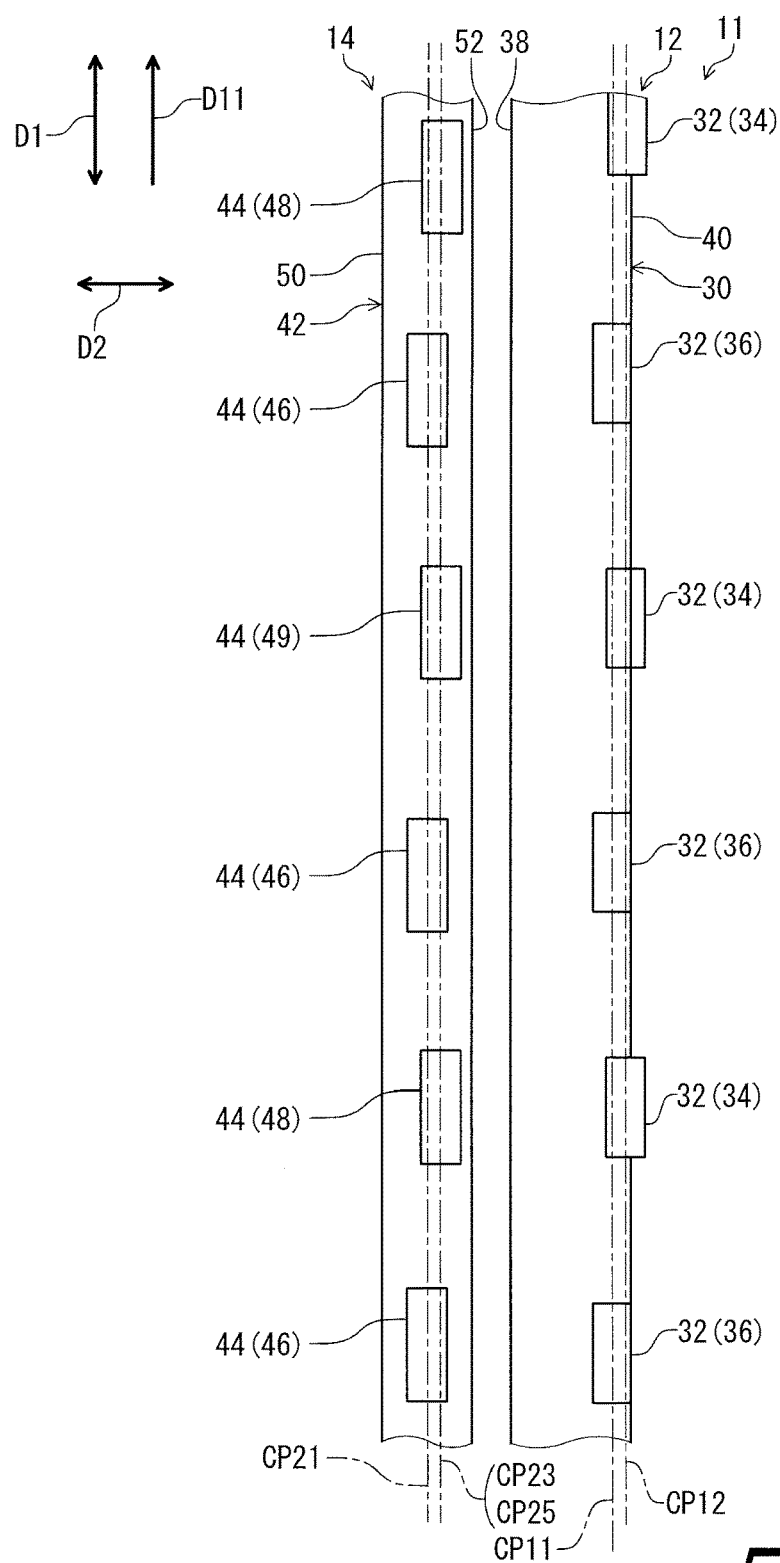
FIG. 45 is a plan view of a bicycle sprocket assembly in accordance with a fifth modification.

Furthermore, as seen in FIG. 45, each of the fourth tooth center plane CP23 and the fifth tooth center plane CP25 can be offset from the third tooth center plane CP21 toward the bicycle sprocket 12 in the axial direction D2. The fourth tooth center plane CP23 can coincide with the fifth tooth center plane CP25 in the axial direction D2.

Figure 46:
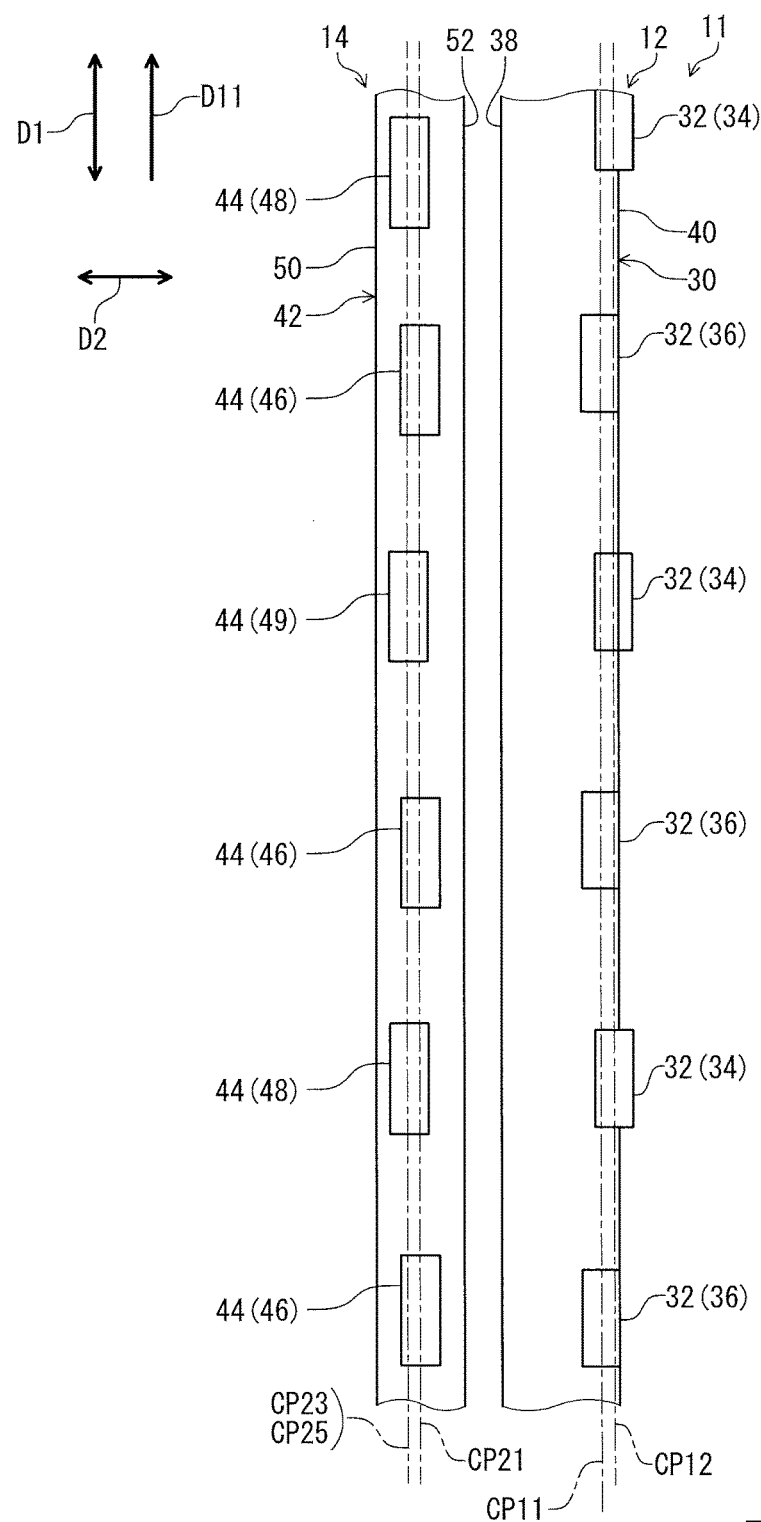
FIG. 46 is a plan view of a bicycle sprocket assembly in accordance with a sixth modification.

As seen in FIG. 46, each of the fourth tooth center plane CP23 and the fifth tooth center plane CP25 can be offset from the third tooth center plane CP21 away from the bicycle sprocket 12 in the axial direction D2. The fourth tooth center plane CP23 can coincide with the fifth tooth center plane CP25 in the axial direction D2.

It will be apparent to those skilled in the bicycle field from the present disclosure that the structures of the bicycle sprockets 12, 212, and 312 of the above embodiments can be combined with each other. For example, the additional shifting facilitation projection 257 of the bicycle sprocket 212 can be applied to the bicycle sprocket 312 of the third embodiment.

Furthermore, the bicycle sprocket assemblies 11, 211, and 311 of the above embodiments can be at least partly applied to the multiple rear sprocket assembly 4 illustrated in FIG. 1. In such a modification, for example, the shifting facilitation area can be defined by a shifting facilitation recess to reduce interference between the bicycle chain C and the sprocket of the multiple rear sprocket assembly 4 in at least one of the first shifting operation and the second shifting operation. At least one sprocket tooth is provided radially adjacent to the shifting facilitation recess and provided radially outward of the shifting facilitation recess. The above embodiments and the above modifications illustrated in FIGS. 36 to 46 can be at least partly applied to the multiple rear sprocket assembly 4.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
a sprocket body;
sprocket teeth provided on an outer periphery of the sprocket body, the sprocket teeth including
at least one first tooth provided on the outer periphery of the sprocket body to engage with an opposed pair of outer link plates of a bicycle chain, the at least one first tooth having a first maximum axial width defined in an axial direction parallel to a rotational center axis of the bicycle sprocket, the at least one first tooth including a first tooth center plane defined to bisect the first maximum axial width, the first tooth center plane being perpendicular to the rotational center axis, and
at least one second tooth provided on the outer periphery of the sprocket body to engage with an opposed pair of inner link plates of the bicycle chain, the at least one second tooth having a second maximum axial width defined in the axial direction, the at least one second tooth including a second tooth center plane defined to bisect the second maximum axial width, the second tooth center plane being perpendicular to the rotational center axis and offset from the first tooth center plane in the axial direction; and at least one shifting facilitation area configured to facilitate a shifting operation of the bicycle chain, wherein
the sprocket teeth include a receiving tooth provided on the outer periphery of the sprocket body to engage with the opposed pair of outer link plates of the bicycle chain,
the sprocket teeth include tooth bottoms provided on the outer periphery of the sprocket body,
the at least one first tooth has a first tooth radial length defined radially outward from a root circle defined by the tooth bottoms,
the at least one second tooth has a second tooth radial length defined radially outward from the root circle,
the receiving tooth has a receiving tooth radial length defined radially outward from the root circle, and
the receiving tooth radial length is smaller than at least one of the first tooth radial length and the second tooth radial length.

2. The bicycle sprocket according to claim 1, wherein
the at least one shifting facilitation area is configured to facilitate a first shifting operation in which the bicycle chain is shifted from an additional sprocket adjacent to the bicycle sprocket in the axial direction without another sprocket between the bicycle sprocket and the additional sprocket toward the bicycle sprocket.

3. The bicycle sprocket according to claim 1, wherein
the at least one shifting facilitation area is configured to facilitate a second shifting operation in which the bicycle chain is shifted from the bicycle sprocket toward an additional sprocket adjacent to the bicycle sprocket in the axial direction without another sprocket between the bicycle sprocket and the additional sprocket.

4. The bicycle sprocket according to claim 1, further comprising
a first shifting facilitation projection provided in the at least one shifting facilitation area to facilitate the shifting operation.

5. The bicycle sprocket according to claim 4, further comprising
an additional shifting facilitation projection provided in the at least one shifting facilitation area to facilitate the shifting operation.

6. The bicycle sprocket according to claim 4, further comprising
a second shifting facilitation projection provided in the at least one shifting facilitation area to facilitate a second shifting operation in which the bicycle chain is shifted from the bicycle sprocket toward an additional sprocket adjacent to the bicycle sprocket in the axial direction without another sprocket between the bicycle sprocket and the additional sprocket.

7. The bicycle sprocket according to claim 1, wherein
the at least one first tooth includes first teeth provided on the outer periphery of the sprocket body to engage with the opposed pair of outer link plates of the bicycle chain.

8. The bicycle sprocket according to claim 1, wherein
the receiving tooth has a receiving maximum axial width defined in the axial direction,
the receiving tooth includes a receiving tooth center plane defined to bisect the receiving maximum axial width, the receiving tooth center plane being perpendicular to the rotational center axis,
the receiving tooth center plane is offset from the second tooth center plane away from the first tooth center plane in the axial direction.

9. The bicycle sprocket according to claim 8, wherein
the receiving tooth center plane is closer to an additional sprocket adjacent to the bicycle sprocket in the axial direction without another sprocket between the bicycle sprocket and the additional sprocket than the second tooth center plane.

10. The bicycle sprocket according to claim 8, wherein
the sprocket teeth include a derailing tooth provided on the outer periphery of the sprocket body to first derail the bicycle chain from the bicycle sprocket in the shifting operation, and
the derailing tooth is provided on an upstream side of the receiving tooth in a driving rotational direction in which the bicycle sprocket is rotated about the rotational center axis during pedaling.

11. The bicycle sprocket according to claim 10, wherein
the derailing tooth is adjacent to the receiving tooth without another tooth between the derailing tooth and the receiving tooth in the driving rotational direction.

12. The bicycle sprocket according to claim 10, wherein
the derailing tooth has a derailing maximum axial width defined in the axial direction,
the derailing tooth includes
a derailing tooth center plane defined to bisect the derailing maximum axial width and perpendicular to the rotational center axis, and
a derailing tooth-tip having a derailing-tip center plane perpendicular to the rotational center axis, and
the derailing-tip center plane is offset from the derailing tooth center plane toward the first tooth center plane in the axial direction.

13. The bicycle sprocket according to claim 10, wherein
the derailing tooth has a derailing tooth radial length defined radially outward from the root circle, and
the derailing tooth radial length is smaller than at least one of the first tooth radial length and the second tooth radial length.

14. The bicycle sprocket according to claim 1, wherein
the at least one second tooth includes second teeth provided on the outer periphery of the sprocket body to engage with the opposed pair of inner link plates of the bicycle chain.

15. A bicycle sprocket assembly comprising:
the bicycle sprocket according to claim 1, the bicycle sprocket having a first pitch-circle diameter; and
an additional sprocket provided to be spaced apart from the bicycle sprocket in the axial direction, the additional sprocket having a second pitch-circle diameter smaller than the first pitch-circle diameter of the bicycle sprocket.

16. The bicycle sprocket assembly according to claim 15, wherein
the first tooth center plane of the at least one first tooth is offset from the second tooth center plane away from the additional sprocket in the axial direction.

17. The bicycle sprocket assembly according to claim 15, wherein
the at least one first tooth includes first teeth provided on the outer periphery of the sprocket body to engage with the opposed pair of outer link plates of the bicycle chain,
the at least one second tooth includes second teeth provided on the outer periphery of the sprocket body to engage with the opposed pair of inner link plates of the bicycle chain, and the first teeth and the second teeth are alternatingly arranged in a circumferential direction defined about the rotational center axis.

18. The bicycle sprocket assembly according to claim 15, wherein
the at least one first tooth includes a first tooth-tip having a first-tip center plane perpendicular to the rotational center axis, and
the first-tip center plane is offset from the first tooth center plane toward the additional sprocket in the axial direction.

19. The bicycle sprocket assembly according to claim 15, wherein
the first tooth center plane of the at least one first tooth is offset from the second tooth center plane toward the additional sprocket in the axial direction.

20. The bicycle sprocket assembly according to claim 15, wherein
the at least one first tooth includes
at least one first inward tooth provided on the outer periphery of the sprocket body to engage with the opposed pair of outer link plates of the bicycle chain, the at least one first inward tooth having the first tooth center plane, and
at least one first outward tooth provided on the outer periphery of the sprocket body to engage with the opposed pair of outer link plates of the bicycle chain, the at least one first outward tooth having the first tooth center plane,
the at least one first inward tooth and the at least one first outward tooth are alternatingly arranged in a circumferential direction defined about the rotational center axis, and
the first tooth center plane of the at least one first inward tooth is offset from the first tooth center plane of the at least one first outward tooth toward the additional sprocket in the axial direction.

21. The bicycle sprocket assembly according to claim 15, wherein
the additional sprocket includes
an additional sprocket body, and
additional sprocket teeth provided on an outer periphery of the additional sprocket body,
the additional sprocket teeth including
at least one third tooth provided on the outer periphery of the additional sprocket body to engage with the opposed pair of inner link plates of the bicycle chain, the at least one third tooth having a third maximum axial width defined in the axial direction, the at least one third tooth having a third tooth center plane defined to bisect the third maximum axial width, the third tooth center plane being perpendicular to the rotational center axis,
at least one fourth tooth provided on the outer periphery of the additional sprocket body to engage with the opposed pair of outer link plates of the bicycle chain, the at least one fourth tooth having a fourth maximum axial width defined in the axial direction, the at least one fourth tooth having a fourth tooth center plane defined to bisect the fourth maximum axial width, the fourth tooth center plane being perpendicular to the rotational center axis and offset from the third tooth center plane in the axial direction, and
at least one fifth tooth provided on the outer periphery of the additional sprocket body to engage with the opposed pair of outer link plates of the bicycle chain, the at least one fifth tooth having a fifth maximum axial width defined in the axial direction, the at least one fifth tooth having a fifth tooth center plane defined to bisect the fifth maximum axial width, the fifth tooth center plane being perpendicular to the rotational center axis and offset from the third tooth center plane in the axial direction.

22. The bicycle sprocket assembly according to claim 21, wherein
the third tooth center plane is provided between the fourth tooth center plane and the fifth tooth center plane in the axial direction.

23. The bicycle sprocket assembly according to claim 22, wherein
the bicycle sprocket further comprises a shifting facilitation projection provided in the at least one shifting facilitation area to facilitate the shifting operation, and
one of the at least one fourth tooth and the at least one fifth tooth is spaced apart from the shifting facilitation projection by a reference distance corresponding to an even number of chain pitch of the bicycle chain.

24. The bicycle sprocket assembly according to claim 23, wherein
the reference distance corresponds to four chain pitches of the bicycle chain.

25. The bicycle sprocket assembly according to claim 22, wherein
the at least one fourth tooth includes fourth teeth provided on the outer periphery of the additional sprocket body to engage with the opposed pair of outer link plates of the bicycle chain,
the at least one fifth tooth includes fifth teeth provided on the outer periphery of the additional sprocket body to engage with the opposed pair of outer link plates of the bicycle chain, and
the fourth teeth and the fifth teeth are alternatingly arranged in a circumferential direction defined about the rotational center axis.

26. The bicycle sprocket assembly according to claim 21, wherein
the at least one third tooth includes third teeth provided on the outer periphery of the additional sprocket body to engage with the opposed pair of inner link plates of the bicycle chain,
the at least one fourth tooth includes fourth teeth provided on the outer periphery of the additional sprocket body to engage with the opposed pair of outer link plates of the bicycle chain,
the at least one fifth tooth includes fifth teeth provided on the outer periphery of the additional sprocket body to engage with the opposed pair of outer link plates of the bicycle chain,
the fourth teeth and the fifth teeth are alternatingly arranged in a circumferential direction defined about the rotational center axis, and
the third teeth are respectively provided between the fourth teeth and the fifth teeth in the circumferential direction.

27. The bicycle sprocket assembly according to claim 26, wherein
each of the fourth tooth center plane and the fifth tooth center plane is offset from the third tooth center plane toward the bicycle sprocket in the axial direction.

28. A bicycle sprocket assembly comprising:
a first sprocket comprising:
  a first sprocket body; and
  first sprocket teeth provided on an outer periphery of the first sprocket body, the first sprocket teeth including
    at least one first chain-engagement tooth provided on the outer periphery of the first sprocket body to engage with an opposed pair of outer link plates of a bicycle chain, the at least one first chain-engagement tooth having a first chain-engagement axial width defined in an axial direction parallel to a rotational center axis of the bicycle sprocket, the at least one first chain-engagement tooth having a first axial center plane defined to bisect the first chain-engagement axial width, the first axial center plane being perpendicular to the rotational center axis, and
    at least one second chain-engagement tooth provided on the outer periphery of the first sprocket body to engage with an opposed pair of inner link plates of the bicycle chain, the at least one second chain-engagement tooth having a second chain-engagement axial width defined in the axial direction, the at least one second chain-engagement tooth having a second axial center plane defined to bisect the second chain-engagement axial width, the second axial center plane being perpendicular to the rotational center axis and offset from the first tooth center plane in the axial direction; and
a second sprocket comprising:
  a second sprocket body; and
  second sprocket teeth provided on an outer periphery of the second sprocket body, the second sprocket teeth including
    at least one third chain-engagement tooth provided on the outer periphery of the second sprocket body to engage with the opposed pair of inner link plates of the bicycle chain, the at least one third chain-engagement tooth having an inner link plate engaging width defined in the axial direction, and
    at least one fourth chain-engagement tooth provided on the outer periphery of the second sprocket body to engage with the opposed pair of outer link plates of the bicycle chain, the at least one fourth chain-engagement tooth having an outer link plate engaging width defined in the axial direction, the inner link plate engaging width being smaller than the outer link plate engaging width, wherein
the first sprocket teeth include a receiving tooth provided on the outer periphery of the first sprocket body to engage with the opposed pair of outer link plates of the bicycle chain,
the first sprocket teeth include tooth bottoms provided on the outer periphery of the first sprocket body,
the at least one first chain-engagement tooth has a first tooth radial length defined radially outward from a root circle defined by the tooth bottoms,
the at least one second chain-engagement tooth has a second tooth radial length defined radially outward from the root circle,
the receiving tooth has a receiving tooth radial length defined radially outward from the root circle, and
the receiving tooth radial length is smaller than at least one of the first tooth radial length and the second tooth radial length.

29. The bicycle sprocket assembly according to claim 28, wherein
the outer link plate engaging width is larger than an inner link space defined between the opposed pair of inner link plates of the bicycle chain and is smaller than an outer link space defined between the opposed pair of outer link plates of the bicycle chain, and
the inner link plate engaging width is smaller than the inner link space.

30. A bicycle sprocket assembly comprising:
a larger sprocket comprising:
  a first pitch-circle diameter;
  a larger sprocket body; and
  first chain-driving teeth provided on an outer periphery of the larger sprocket body, the first chain-driving teeth including
    at least one first offset tooth provided on the outer periphery of the larger sprocket body to engage with an opposed pair of outer link plates of a bicycle chain, the at least one first offset tooth having a first maximum width defined in an axial direction parallel to a rotational center axis of the bicycle sprocket assembly, the at least one first offset tooth including a first-offset-tooth center plane defined to bisect the first maximum width, the first-offset-tooth center plane being perpendicular to the rotational center axis, and
    at least one second offset tooth provided on the outer periphery of the larger sprocket body to engage with an opposed pair of inner link plates of the bicycle chain, the at least one second offset tooth having a second maximum width defined in the axial direction, the at least one second offset tooth including a second-offset-tooth center plane defined to bisect the second maximum width, the second-offset-tooth center plane being perpendicular to the rotational center axis and offset from the first-offset-tooth center plane in the axial direction; and
a smaller sprocket comprising:
  a second pitch-circle diameter smaller than the first pitch-circle diameter;
  a smaller sprocket body; and
  second chain-driving teeth provided on an outer periphery of the smaller sprocket body, the second chain-driving teeth including
    at least one third offset tooth provided on the outer periphery of the smaller sprocket body to engage with the opposed pair of the outer link plates, the at least one third offset tooth having a third maximum width defined in the axial direction, the at least one third offset tooth including a third-offset-tooth center plane defined to bisect the third maximum width, the third-offset-tooth center plane being perpendicular to the rotational center axis,
    at least one fourth offset tooth provided on the outer periphery of the smaller sprocket body to engage with the opposed pair of the inner link plates, the at least one fourth offset tooth having a fourth maximum width defined in the axial direction, the at least one fourth offset tooth including a fourth-offset-tooth center plane defined to bisect the fourth maximum width, the fourth-offset-tooth center plane being perpendicular to the rotational center axis and offset from the third-offset-tooth center plane in the axial direction, and at least one fifth offset tooth provided on the outer periphery of the smaller sprocket body to engage with the opposed pair of the outer link plates, the at least one fifth offset tooth having a fifth maximum width defined in the axial direction, the at least one fifth offset tooth including a fifth-offset-tooth center plane defined to bisect the fifth maximum width, the fifth-offset-tooth center plane being perpendicular to the rotational center axis and offset from the third-offset-tooth center plane away from the fourth-offset-tooth center plane in the axial direction, wherein the larger sprocket including a receiving tooth provided on the outer periphery of the larger sprocket body to engage with the opposed pair of outer link plates of the bicycle chain, the first chain-driving teeth include tooth bottoms provided on the outer periphery of the sprocket body, the at least one first offset tooth has a first tooth radial length defined radially outward from a root circle defined by the tooth bottoms, the at least one second offset tooth has a second tooth radial length defined radially outward from the root circle, the receiving tooth has a receiving tooth radial length defined radially outward from the root circle, and the receiving tooth radial length is smaller than at least one of the first tooth radial length and the second tooth radial length.

31. The bicycle sprocket assembly according to claim 30, wherein
the second-offset-tooth center plane is closer to the smaller sprocket than the first-offset-tooth center plane in the axial direction.

32. The bicycle sprocket assembly according to claim 31, wherein
the larger sprocket body has a sprocket body center plane, and
the second-offset-tooth center plane coincides with the sprocket body center plane.

33. The bicycle sprocket assembly according to claim 30, wherein
the first-offset-tooth center plane is closer to the smaller sprocket than the second-offset-tooth center plane in the axial direction.

34. The bicycle sprocket assembly according to claim 33, wherein
the larger sprocket body has a sprocket body center plane, and
the second-offset-tooth center plane coincides with the sprocket body center plane.

* * * * *